US012001974B2

(12) United States Patent
Percuoco et al.

(10) Patent No.: US 12,001,974 B2
(45) Date of Patent: Jun. 4, 2024

(54) AUGMENTED REALITY SMARTGLASSES FOR USE AT CULTURAL SITES

(71) Applicant: ARTGLASS USA LLC, Richmond, VA (US)

(72) Inventors: Luigi Percuoco, Monza (IT); Antonio Scuderi, Verona (IT)

(*) Notice: Subject to any disclaimer, the term of this patent is extended or adjusted under 35 U.S.C. 154(b) by 0 days.

(21) Appl. No.: 17/396,542

(22) Filed: Aug. 6, 2021

(65) Prior Publication Data

US 2022/0044019 A1    Feb. 10, 2022

Related U.S. Application Data

(62) Division of application No. 15/991,699, filed on May 29, 2018, now Pat. No. 11,087,134.

(Continued)

(30) Foreign Application Priority Data

May 30, 2017 (IT) .......................... 102017000058961

(51) Int. Cl.
*G06Q 10/00* (2023.01)
*G02B 27/01* (2006.01)
(Continued)

(52) U.S. Cl.
CPC ........... *G06Q 10/00* (2013.01); *G02B 27/017* (2013.01); *G06F 3/012* (2013.01); *G06F 18/00* (2023.01);
(Continued)

(58) Field of Classification Search
CPC ...... G06V 20/20; G06V 10/255; G06V 20/36; G02B 27/017; G02B 2027/0178;
(Continued)

(56) References Cited

U.S. PATENT DOCUMENTS 5,808,695 A * 9/1998 Rosser .................. H04N 5/272
                                                       348/580
6,181,371 B1   1/2001 Maguire, Jr.
(Continued)

FOREIGN PATENT DOCUMENTS

CA    2913218 A1   11/2014
CA    2979217 A1    9/2016
(Continued)

OTHER PUBLICATIONS

CN107305571A Machine Translation on Mar. 8, 2021) (Year: 2017).*
(Continued)

*Primary Examiner* — Michael Le
(74) *Attorney, Agent, or Firm* — Aldo Noto; RIMON PC

(57) ABSTRACT

Described augmented reality (AR) systems and devices provide users with enhanced human sensorial perceptions using digital content. More particularly, the system software platform and methodology of smartglasses create an immersive AR experience for visitors of cultural sites using object identification and optical flow tracking. Using graphical user interfaces, the system enables platform administrators to convert disparate cultural site content to coherent AR storytelling experiences called palimpsests or tours. During a learning phase, points of interest are catalogued and images are taken at different angles and under different lighting conditions to create markers. Using geolocation systems, data is loaded on the smartglasses a roomful at a time to increase efficiency. In use, AR content is generated after points of interest markers are matched using similarity and threshold algorithms. Optical flow tracking is used to track user movement and enhance the AR experience.

24 Claims, 28 Drawing Sheets

Related U.S. Application Data

(60) Provisional application No. 62/572,452, filed on Oct. 14, 2017.

(51) Int. Cl.
  *G06F 3/01*      (2006.01)
  *G06F 18/00*     (2023.01)
  *G06Q 10/06*     (2023.01)
  *G06T 7/246*     (2017.01)
  *G06T 7/73*      (2017.01)
  *G06V 20/00*     (2022.01)
  *G06V 20/20*     (2022.01)

(52) U.S. Cl.
  CPC .............. *G06Q 10/06* (2013.01); *G06T 7/246* (2017.01); *G06T 7/73* (2017.01); *G06V 20/20* (2022.01); *G06V 20/36* (2022.01); *G02B 2027/0178* (2013.01); *G06T 2207/10016* (2013.01); *G06T 2207/10024* (2013.01)

(58) Field of Classification Search
  CPC .......... G06F 3/012; G06F 18/00; G06K 9/00; G06Q 10/00; G06Q 10/06; G06T 7/246; G06T 7/73; G06T 2207/10016; G06T 2207/10024
  See application file for complete search history.

(56) References Cited

U.S. PATENT DOCUMENTS

| | | |
|---|---|---|
| 6,611,196 B2 | 8/2003 | Mynatt et al. |
| 7,116,789 B2 | 10/2006 | Layton et al. |
| 7,724,278 B2 | 5/2010 | Maguire, Jr. |
| 7,995,076 B2 | 8/2011 | Emam et al. |
| 8,036,678 B2 | 10/2011 | Goldenberg et al. |
| 8,264,505 B2 | 9/2012 | Bathiche et al. |
| 8,687,021 B2 | 4/2014 | Bathiche et al. |
| 8,769,043 B2 | 7/2014 | Flitcroft |
| RE45,062 E | 8/2014 | Maguire |
| 8,803,917 B2 | 8/2014 | Meehan |
| RE45,114 E | 9/2014 | Maguire |
| 8,914,232 B2 | 12/2014 | Ma et al. |
| 8,963,954 B2 | 2/2015 | Sandberg |
| 9,058,687 B2 | 6/2015 | Kruglick |
| 9,071,709 B2 | 6/2015 | Wither et al. |
| 9,122,707 B2 | 9/2015 | Wither et al. |
| 9,142,038 B2 | 9/2015 | Lotto et al. |
| 9,275,499 B2 | 3/2016 | Adhikari et al. |
| 9,280,852 B2 | 3/2016 | Adhikari et al. |
| 9,285,871 B2 | 3/2016 | Geisner et al. |
| 9,286,711 B2 | 3/2016 | Geisner et al. |
| 9,286,721 B2 | 3/2016 | Adhikari et al. |
| 9,418,292 B2 | 8/2016 | Murphy et al. |
| 9,432,421 B1 | 8/2016 | Mott et al. |
| 9,560,273 B2 | 1/2017 | Meier et al. |
| 9,594,537 B2 | 3/2017 | Sugden et al. |
| 9,607,438 B2 | 3/2017 | Blanchflower et al. |
| 9,619,940 B1 | 4/2017 | Lotto |
| 9,646,418 B1 | 5/2017 | Lotto |
| 9,661,462 B2 | 5/2017 | Koepke |
| 9,678,349 B2 | 6/2017 | Yang |
| 9,685,004 B2 | 6/2017 | Wang et al. |
| 9,720,241 B2 * | 8/2017 | Osterhout .............. G06F 3/013 |
| 9,727,128 B2 | 8/2017 | Nurmi |
| 10,629,001 B2 | 4/2020 | Reddy et al. |
| 2007/0038944 A1* | 2/2007 | Carignano ......... G06Q 30/0241 715/757 |
| 2011/0221656 A1* | 9/2011 | Haddick .................. H04N 5/44 345/156 |
| 2012/0113144 A1 | 5/2012 | Adhikari et al. |
| 2012/0212484 A1 | 8/2012 | Haddick et al. |
| 2013/0016877 A1* | 1/2013 | Feris ......... G06T 7/246 382/103 |
| 2016/0284099 A1 | 9/2016 | Swaminathan et al. |
| 2017/0116783 A1* | 4/2017 | Huang ................ G01C 21/365 |
| 2017/0309073 A1 | 10/2017 | Sangiovanni et al. |
| 2017/0316611 A1 | 11/2017 | Sangiovanni et al. |
| 2017/0337746 A1 | 11/2017 | Sangiovanni et al. |
| 2018/0190026 A1* | 7/2018 | Barnett ............... G06F 3/04842 |

FOREIGN PATENT DOCUMENTS

| | | |
|---|---|---|
| CN | 203086736 U | 7/2013 |
| CN | 103366708 A | 10/2013 |
| CN | 103500452 A | 1/2014 |
| CN | 102194007 B | 12/2014 |
| CN | 104834378 A | 8/2015 |
| CN | 204833154 U | 12/2015 |
| CN | 102770843 B | 1/2016 |
| CN | 105243142 A | 1/2016 |
| CN | 105427209 A | 3/2016 |
| CN | 105468159 A | 4/2016 |
| CN | 103632626 A | 6/2016 |
| CN | 103632626 B | 6/2016 |
| CN | 105930835 A | 6/2016 |
| CN | 205485917 U | 8/2016 |
| CN | 105976277 A | 9/2016 |
| CN | 106357924 A | 1/2017 |
| CN | 106488187 A | 3/2017 |
| CN | 106503810 A | 3/2017 |
| CN | 106780151 A | 5/2017 |
| CN | 206193936 U | 5/2017 |
| CN | 206433091 U | 8/2017 |
| CN | 103221953 B | 9/2017 |
| CN | 206460461 U | 9/2017 |
| CN | 107305571 A | 10/2017 |
| CN | 107305571 A * | 10/2017 |
| CN | 105338483 A | 1/2019 |
| CN | 104769393 A | 2/2019 |
| CN | 106816077 A | 3/2019 |
| DE | 202012006008 | 8/2012 |
| EP | 2795936 A1 | 10/2014 |
| EP | 2327003 B1 | 3/2017 |
| EP | 3195631 A1 | 7/2017 |
| EP | 3238165 A1 | 11/2017 |
| IT | UA20166195 A1 | 9/2014 |
| JP | 5671137 B2 | 2/2015 |
| JP | 5728775 B2 | 6/2015 |
| JP | 5766795 B2 | 8/2015 |
| JP | 2013538377 A | 8/2015 |
| JP | 3209857 U | 4/2017 |
| KR | 20070121100 A | 9/2008 |
| KR | 20090071851 A | 7/2009 |
| KR | 20120015036 A | 2/2012 |
| KR | 20120019158 A | 3/2012 |
| KR | 20120036444 A | 4/2012 |
| KR | 20120116564 A | 10/2012 |
| KR | 20130115332 A | 10/2013 |
| KR | 20140080720 A | 7/2014 |
| KR | 20150093902 A | 8/2015 |
| KR | 20160012578 A | 6/2016 |
| KR | 20160087276 A | 7/2016 |
| KR | 20160099753 A | 8/2016 |
| KR | 20160112898 A | 9/2016 |
| KR | 20170042039 A | 4/2017 |
| TW | 201324332 A | 6/2013 |
| TW | 201333753 A | 8/2013 |
| TW | 201631544 A | 9/2016 |
| WO | WO2013011121 A | 1/2013 |
| WO | WO2013057729 A | 4/2013 |

OTHER PUBLICATIONS

Neumann, Ulrich, et al., Natural Feature Tracking for Augmented Reality, IEEE Transactions on Multi Media, vol. 1, No. 1, Mar. 1999 (Year: 1999).*

Rubino, Irene et al., MusA: Using Indoor Positioning and Navagation to Enhance Cultural Experiences in a Museum, Sensors 2013, 13, 17445-17471; doi:10.3390/s131217445.

Chen, Jing et al., Sensor-Aware Recognition and Tracking for Wide-Area AugmentedReality on Mobile Phones, Sensors 2015, 15, 31092-31107; doi:10.3390/s151229847.

(56) References Cited

OTHER PUBLICATIONS

Benitez-Guerrero, Edgard et al. Context-Aware Mobile Collaborative Systems: Conceptual Modeling and Case Study, Sensors 2012, 12, 13491-13507; doi:10.3390/s121013491.
Clinical Trial, Clinicaltrials.gov NCT02456987; https://clinicaltrials.gov/ct2/show/NCT02456987 (Archived by WebCite at http://www.webcitation.org/6iFIMRNh3).
PCTIB2018000641—ISR and Written Opinion mailed Nov. 26, 2018.
Alletto, Stefano et al., Exploring Architectural Details Through a Wearable Egocentric Vision Device, Sensors 2016, 16, 237; doi:10.3390/s16020237.
Havlik, Denis et al., From Sensor to Observation Web with environmental Enablers in the Future Internet, Sensors 2011, 11, 3874-3907; doi:10.3390/s110403874.
Neumann, Ulrich, et al., Natural Feature Tracking for Augmented Reality, IEEE Transactions on MultiMedia, vol. 1, No. 1, Mar. 1999.

\* cited by examiner

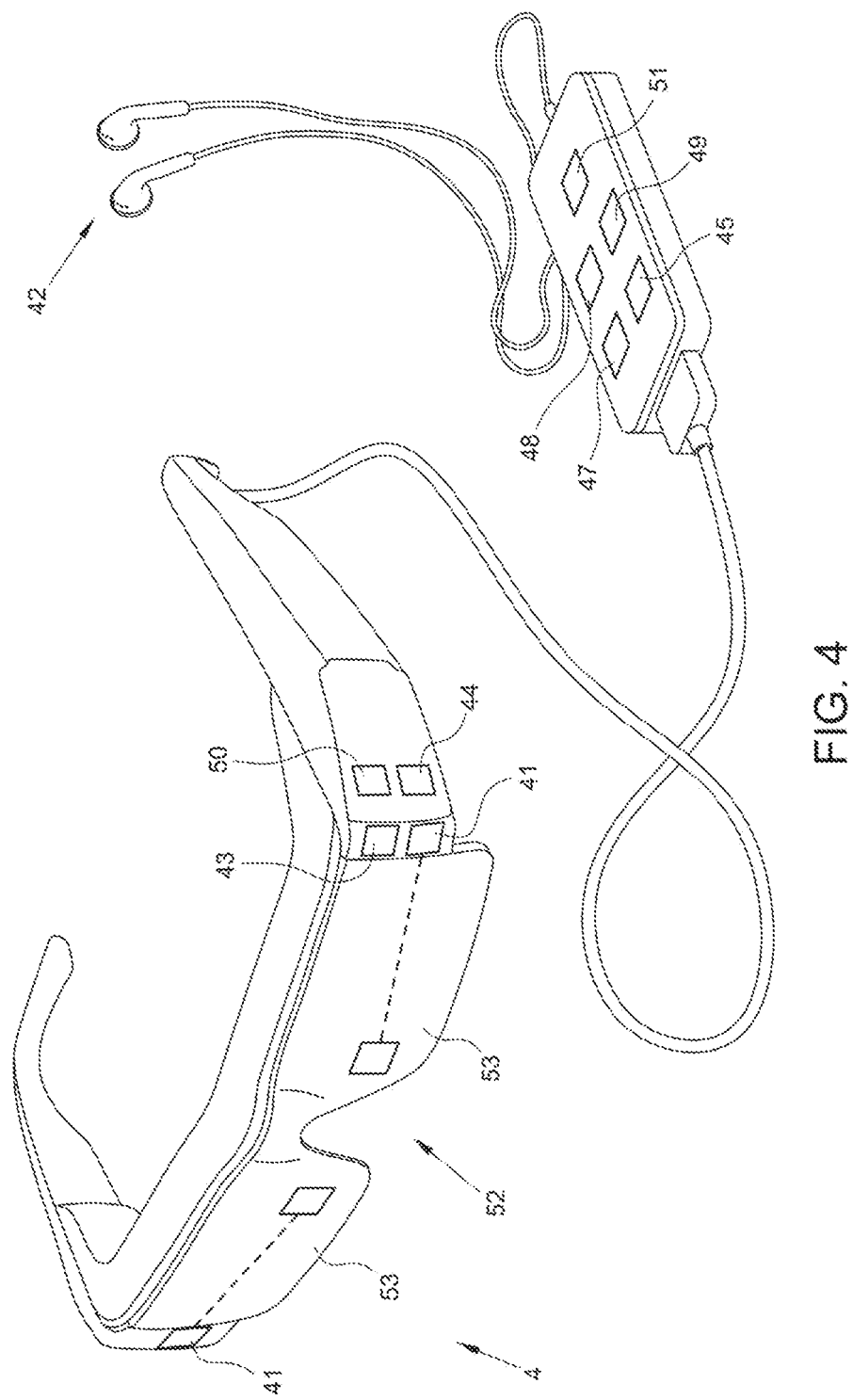

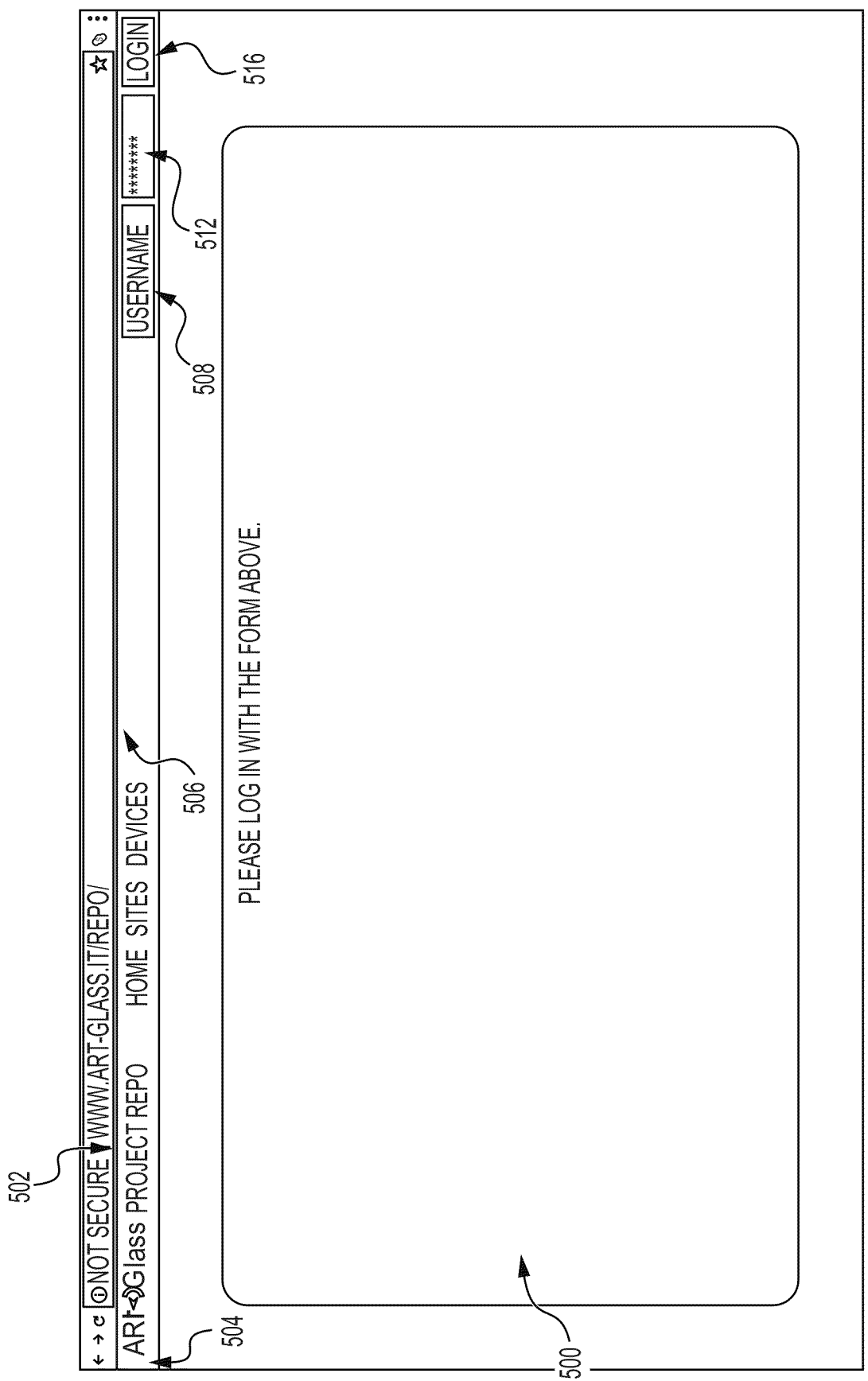
FIG. 5 LOGIN SCREEN

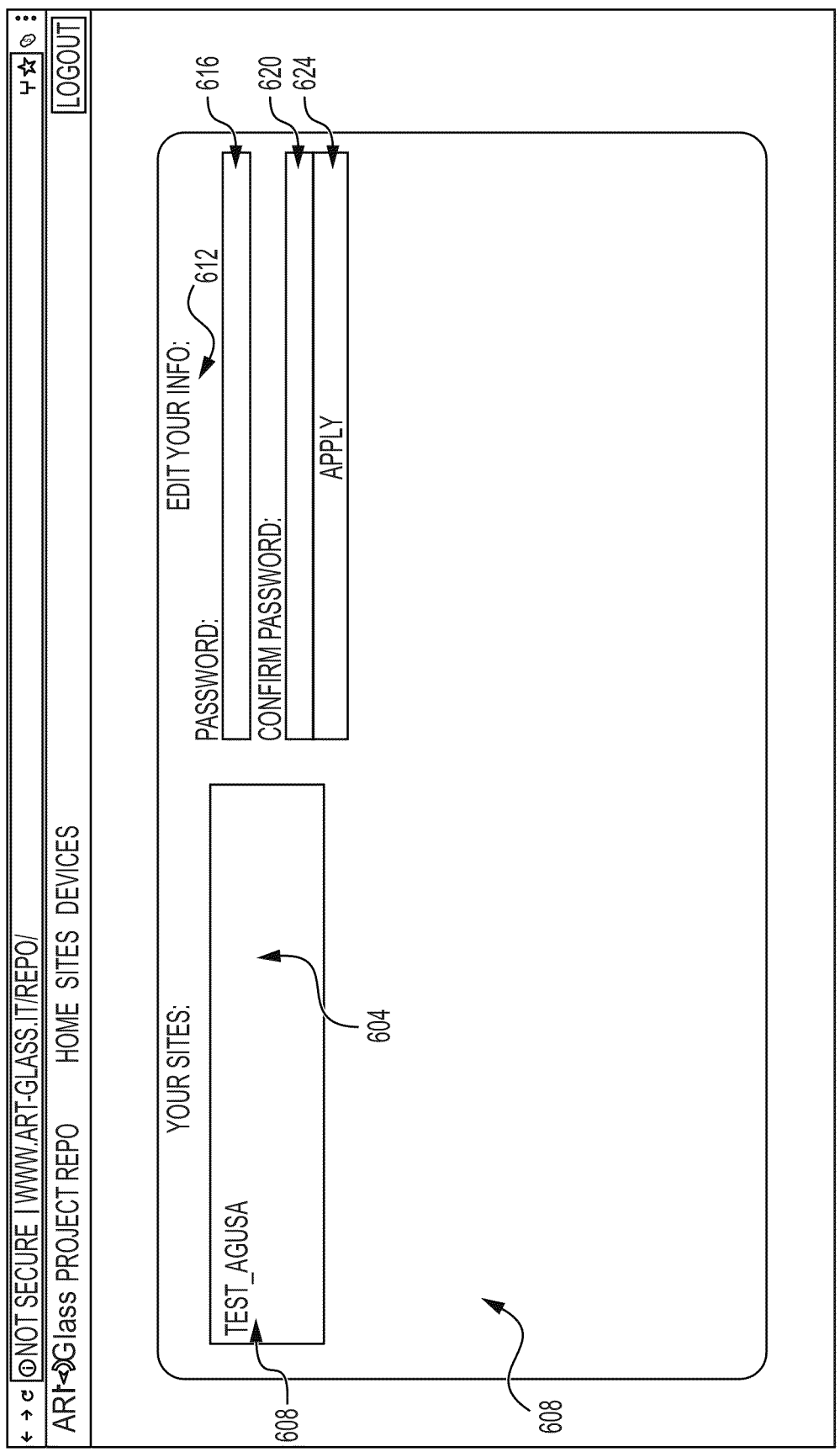
FIG. 6 HOME SCREEN

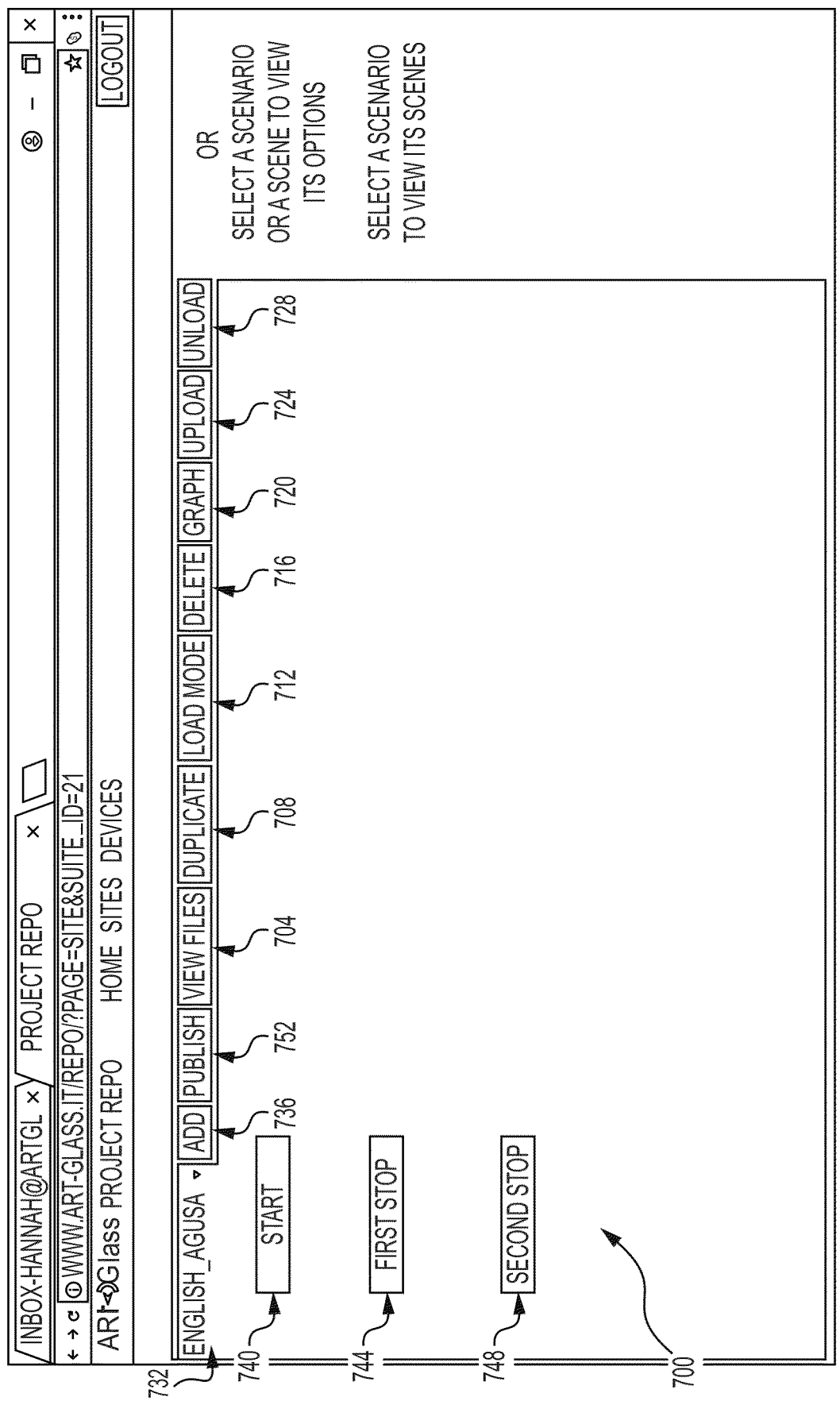
FIG. 7 MAIN SITE PAGE

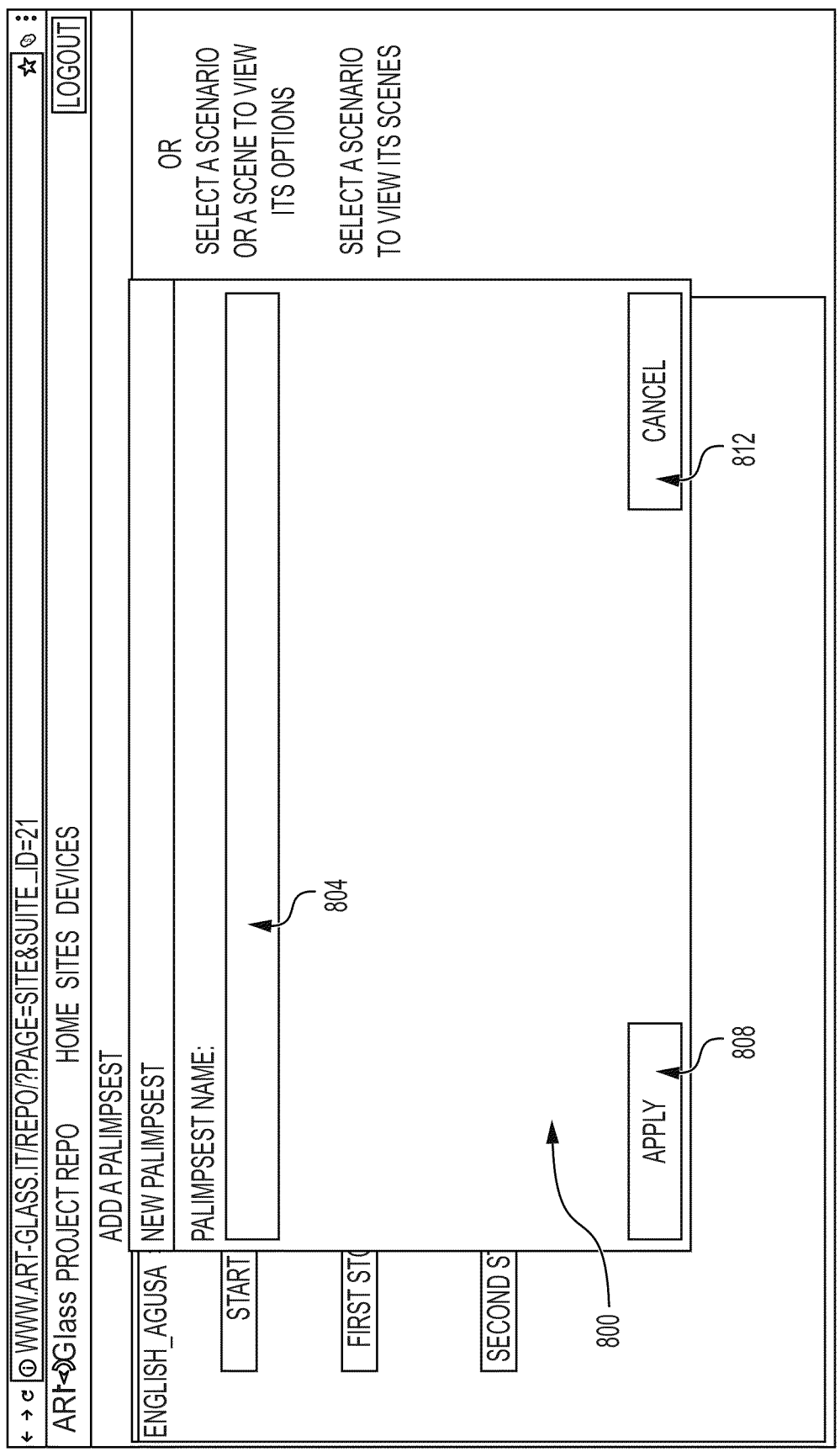
FIG. 8  ADD PALIMPSEST SCREEN

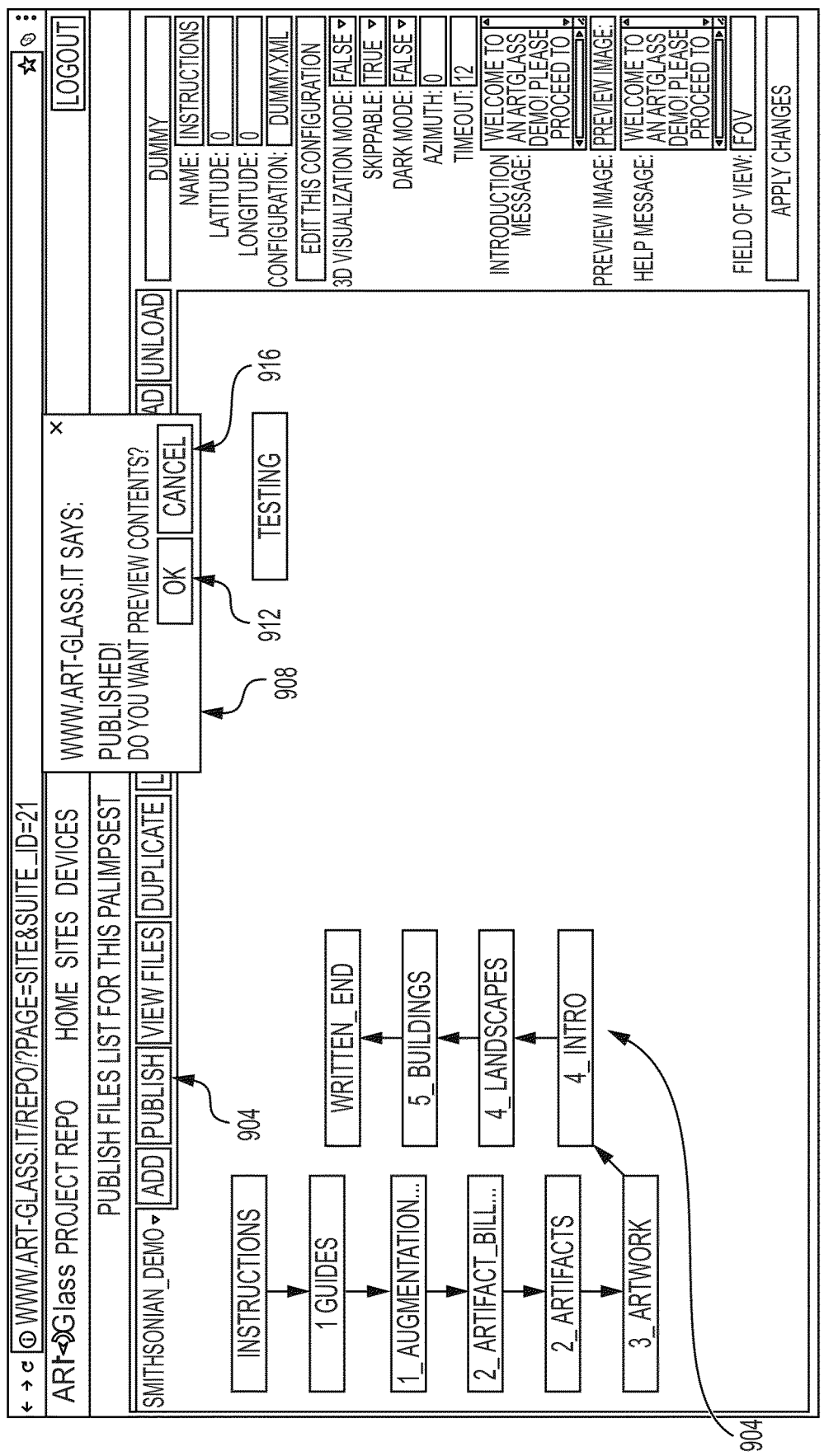
FIG. 9 PUBLISH PALIMPSEST SCREEN

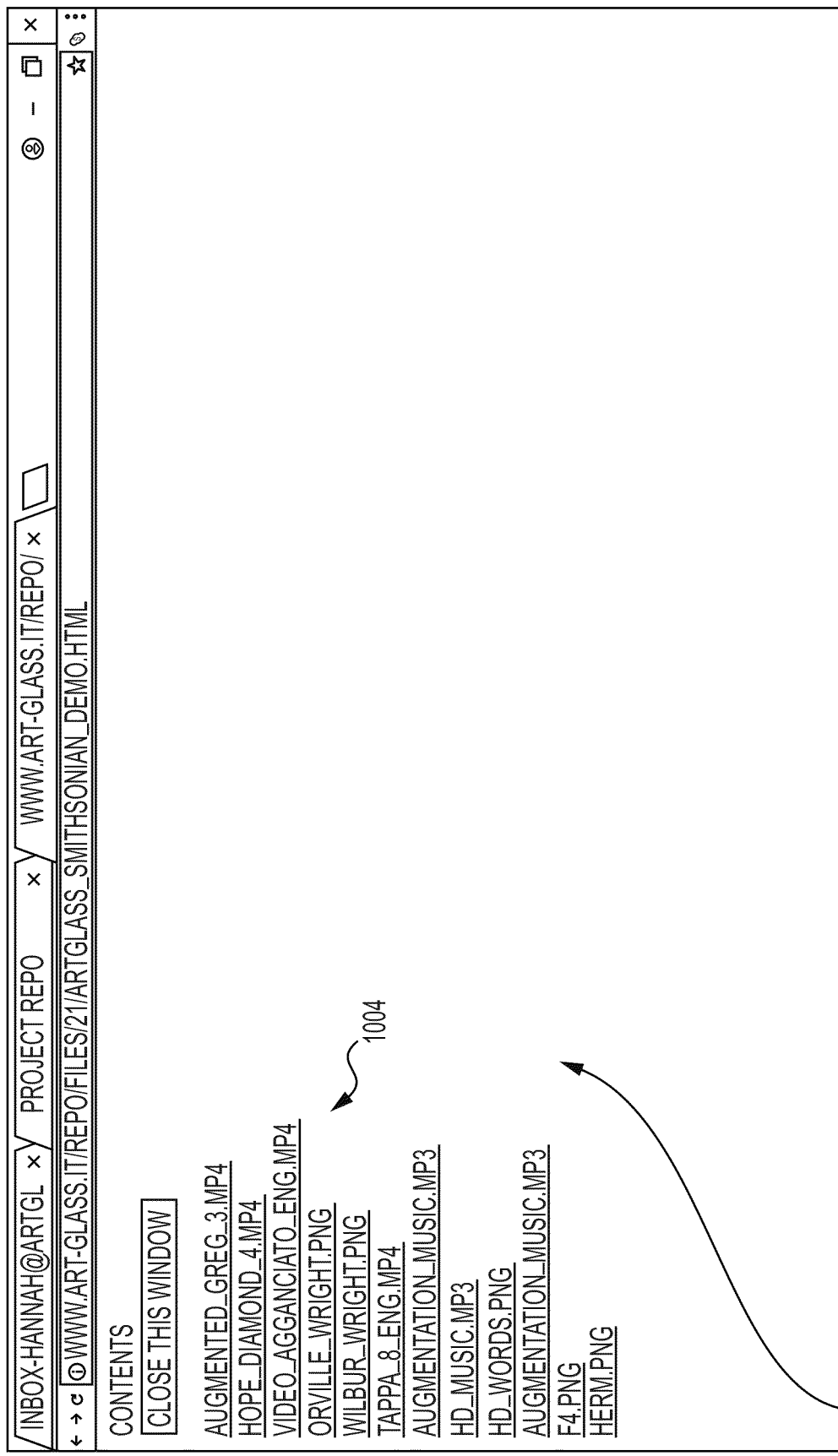
FIG. 10    VIEW FILES FROM SELECTED PALIMPSEST SCREEN

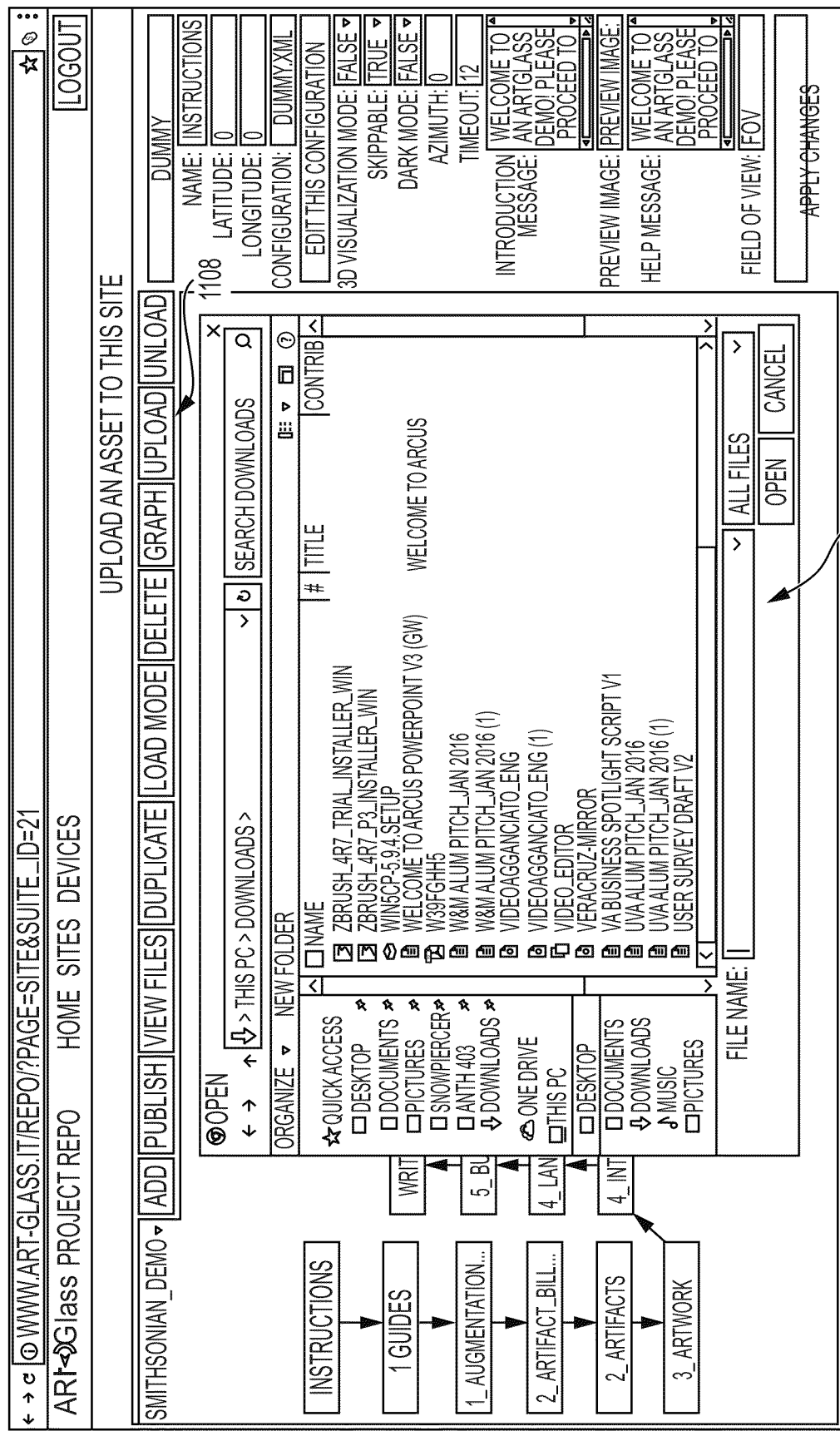
FIG. 11 UPLOAD ASSESTS TO SELECTED PALIMPSEST SCREEN

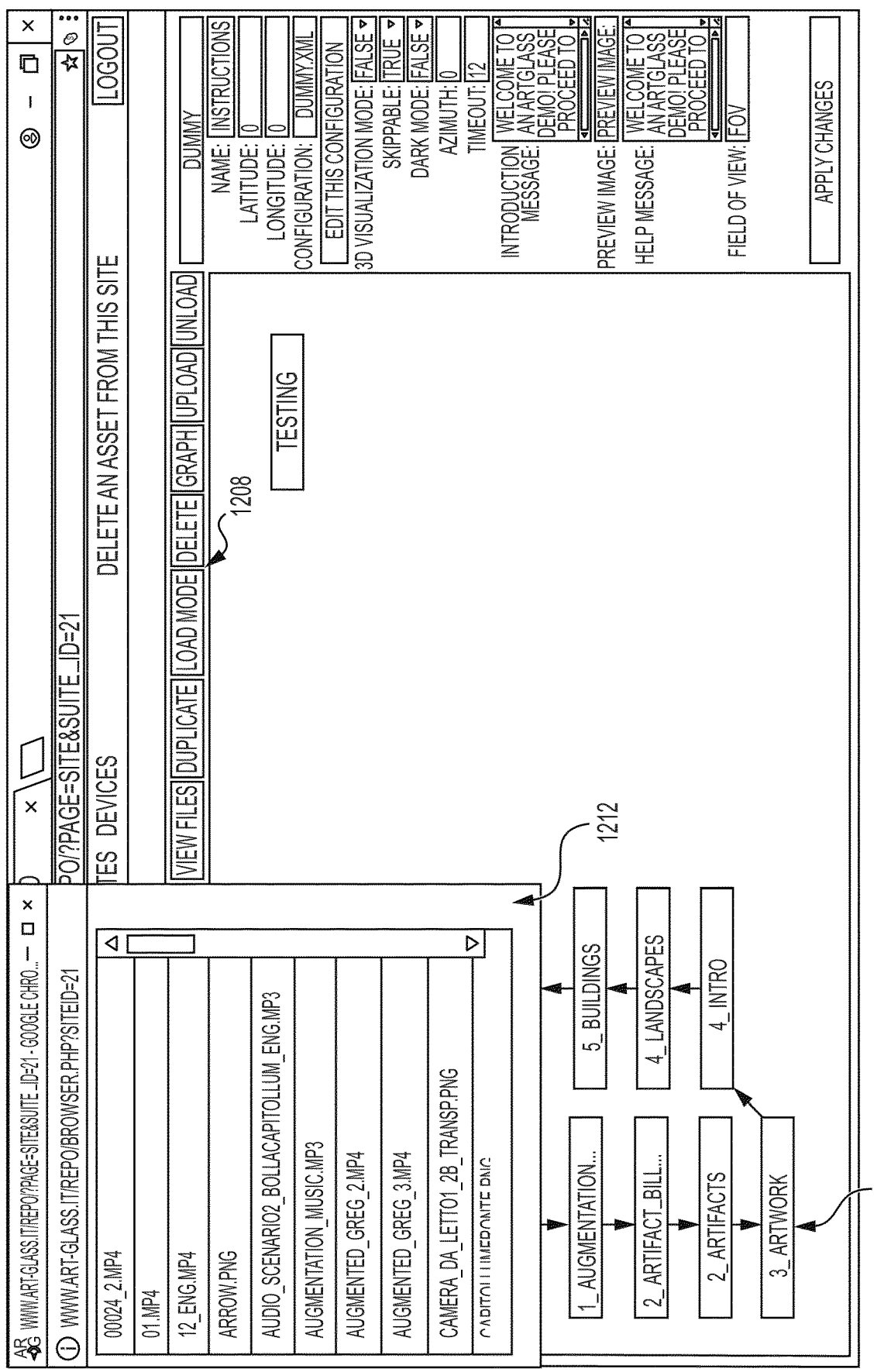
FIG. 12  DELETE ASSETS FROM SELECTED PALIMPSEST SCREEN

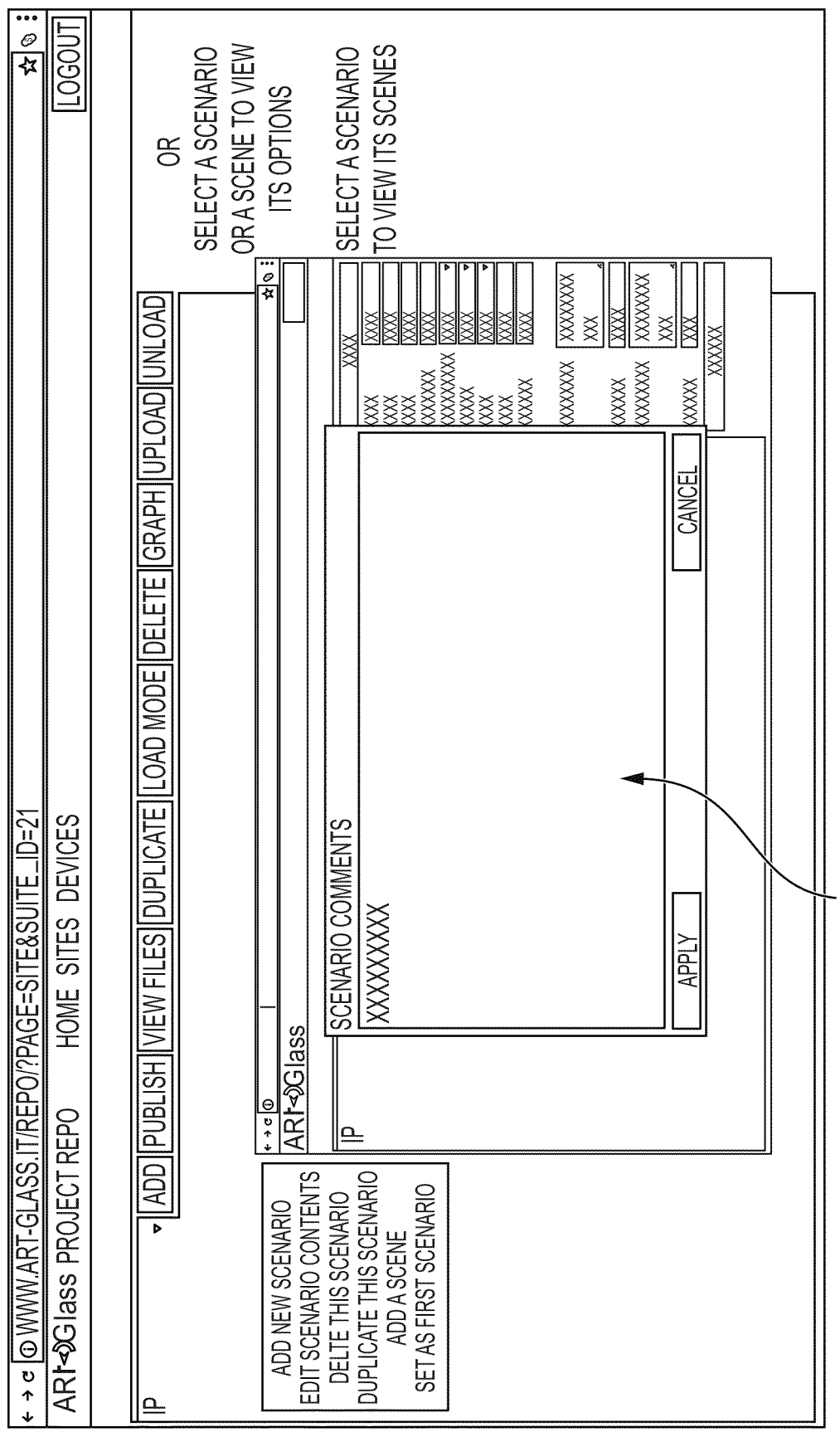
FIG. 13 SCENARIO COMMENT SCREEN

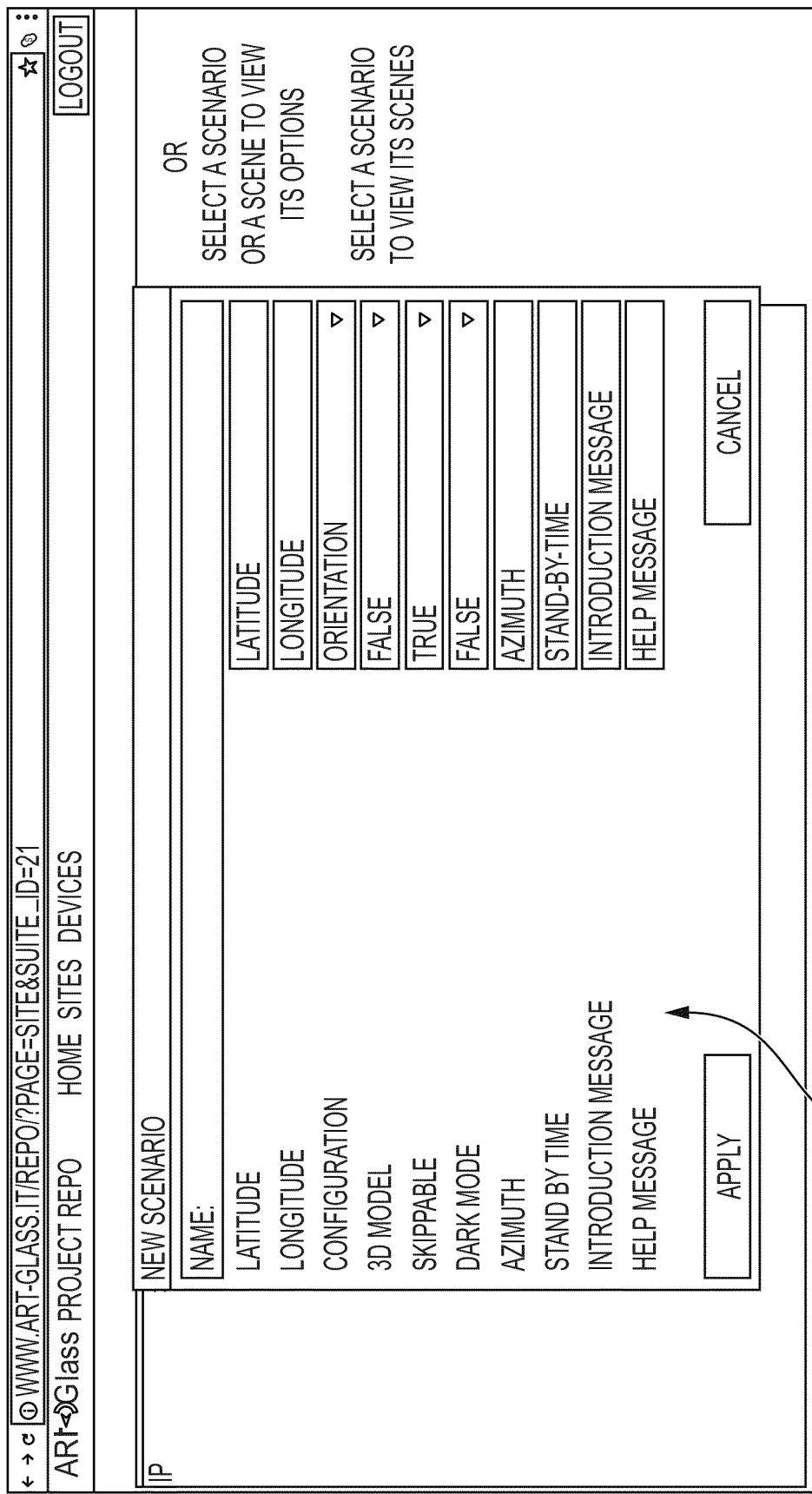
FIG. 14   ADD A NEW SCENARIO SCREEN

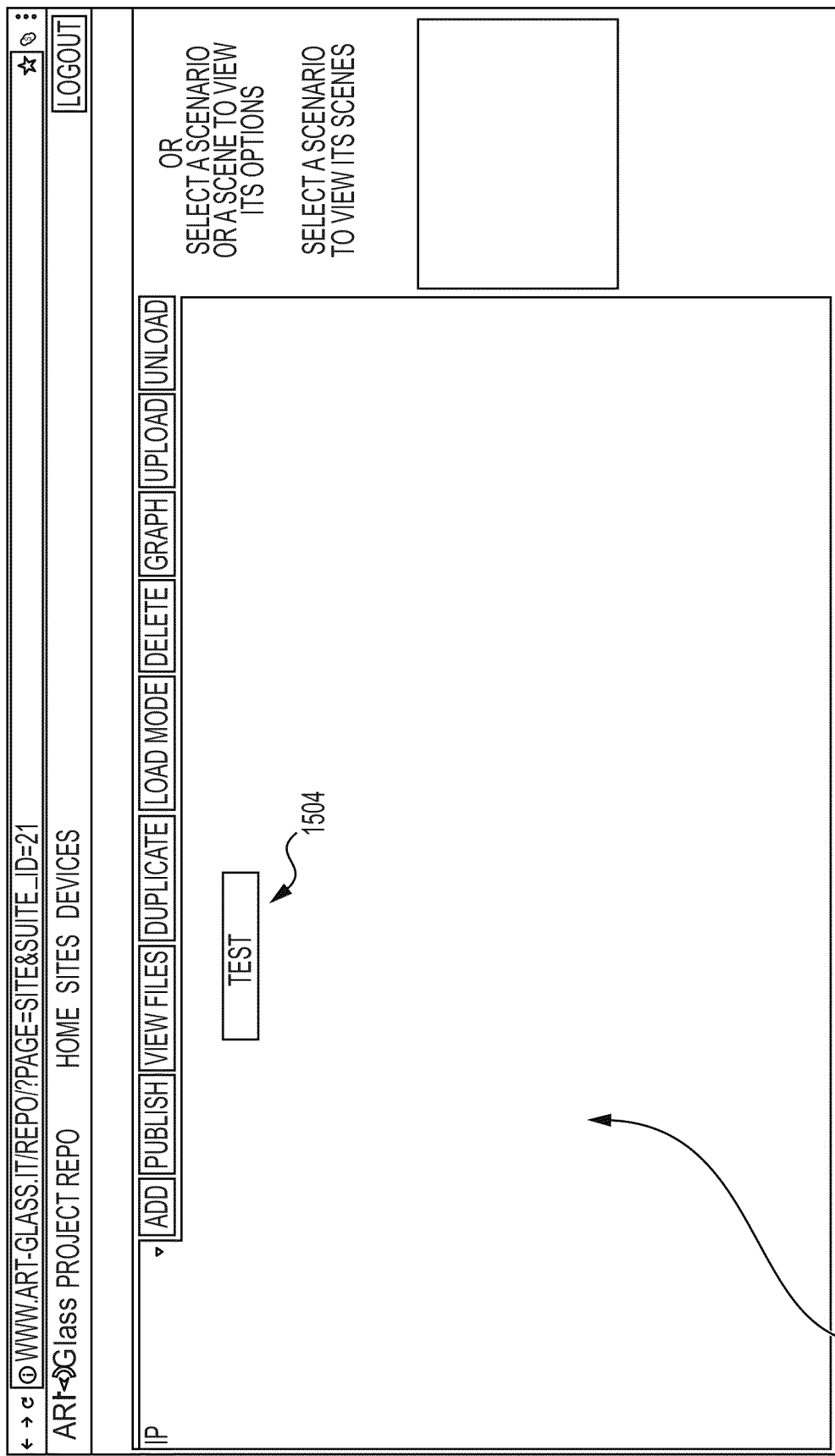
FIG. 15 SCREEN DEPICTING NEWLY ADDED SCENARIO

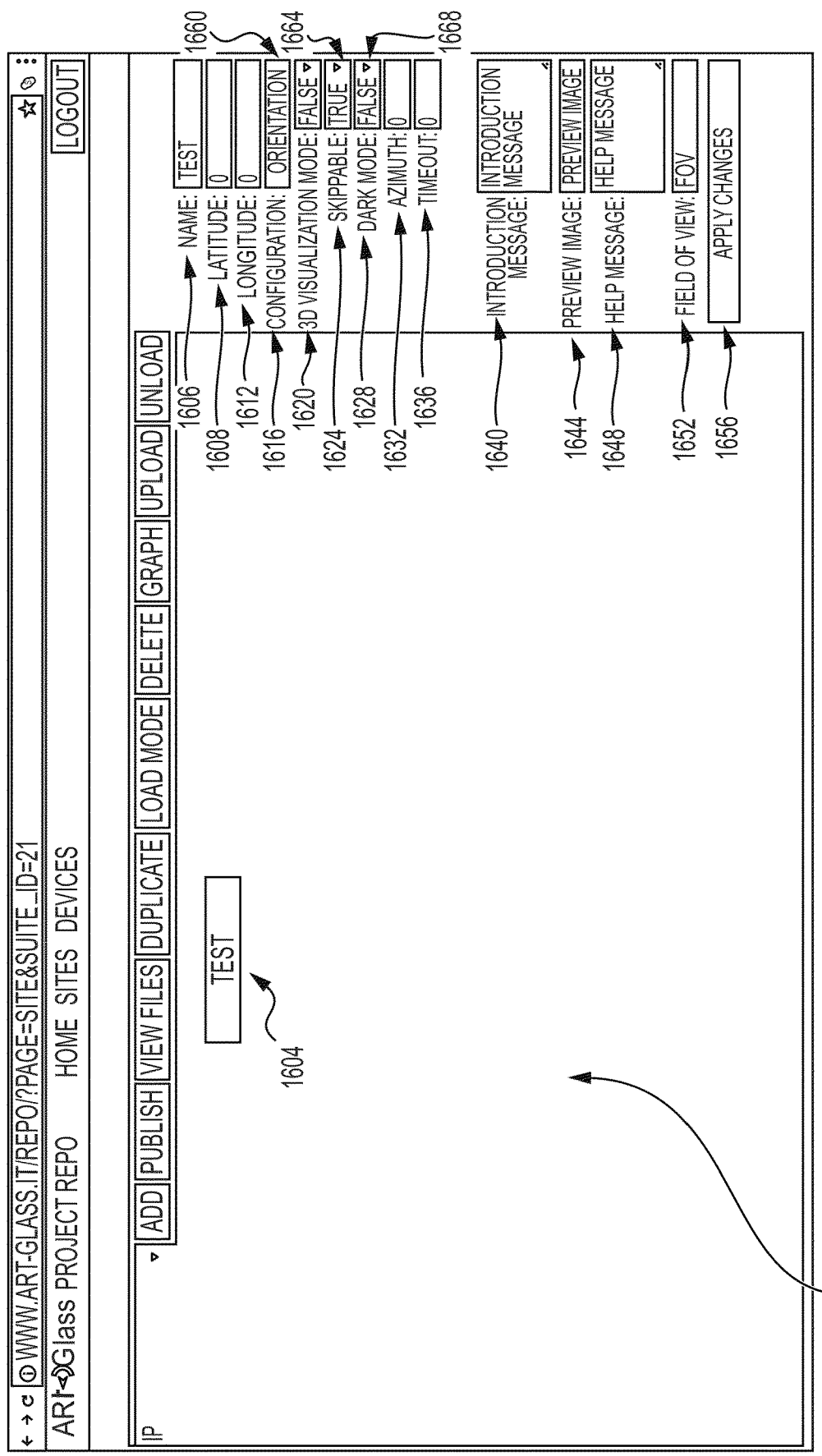
FIG. 16  SCENARIO PROPERTY SCREEN

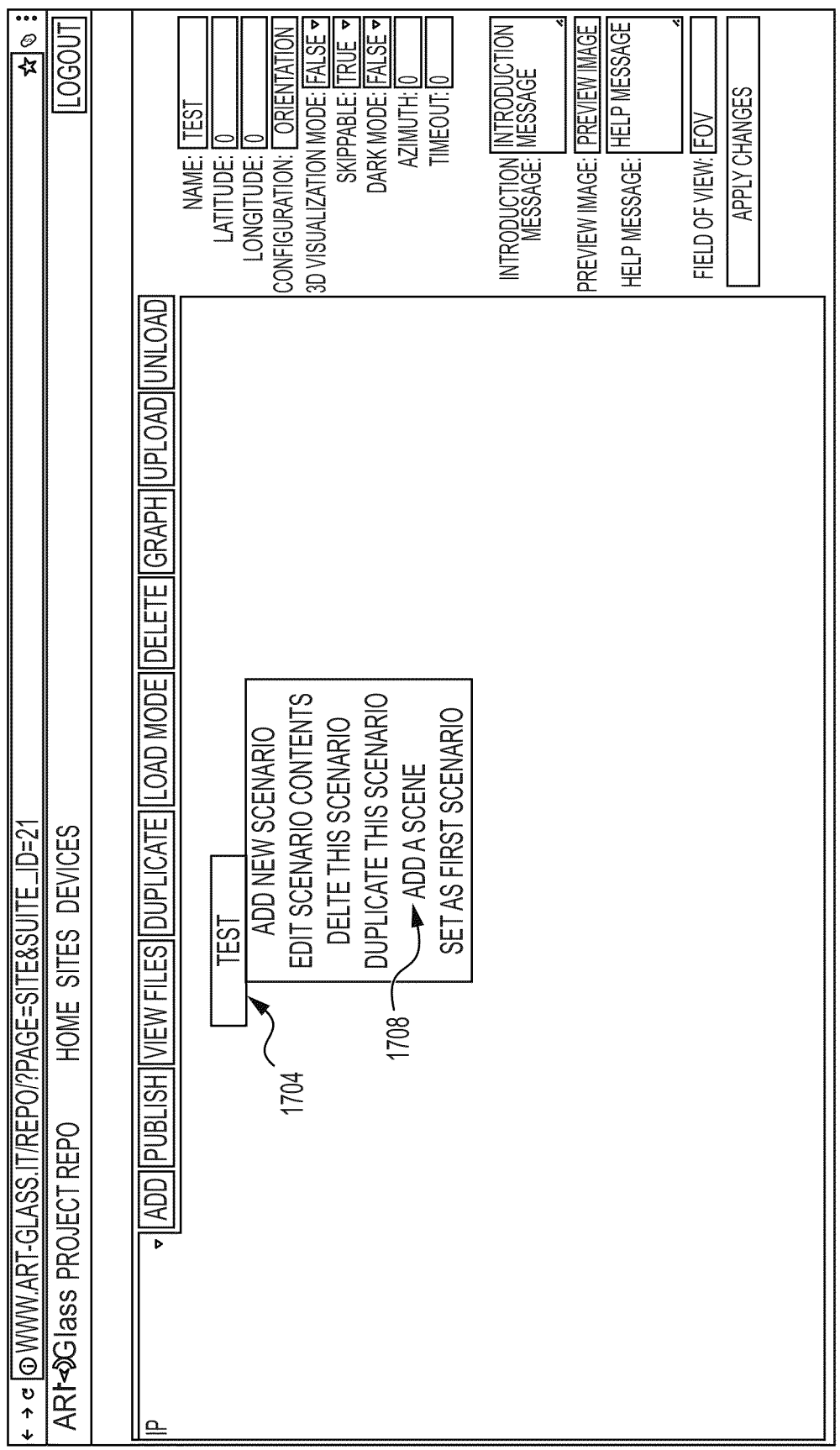
FIG. 17  ADD A SCENE SCREEN

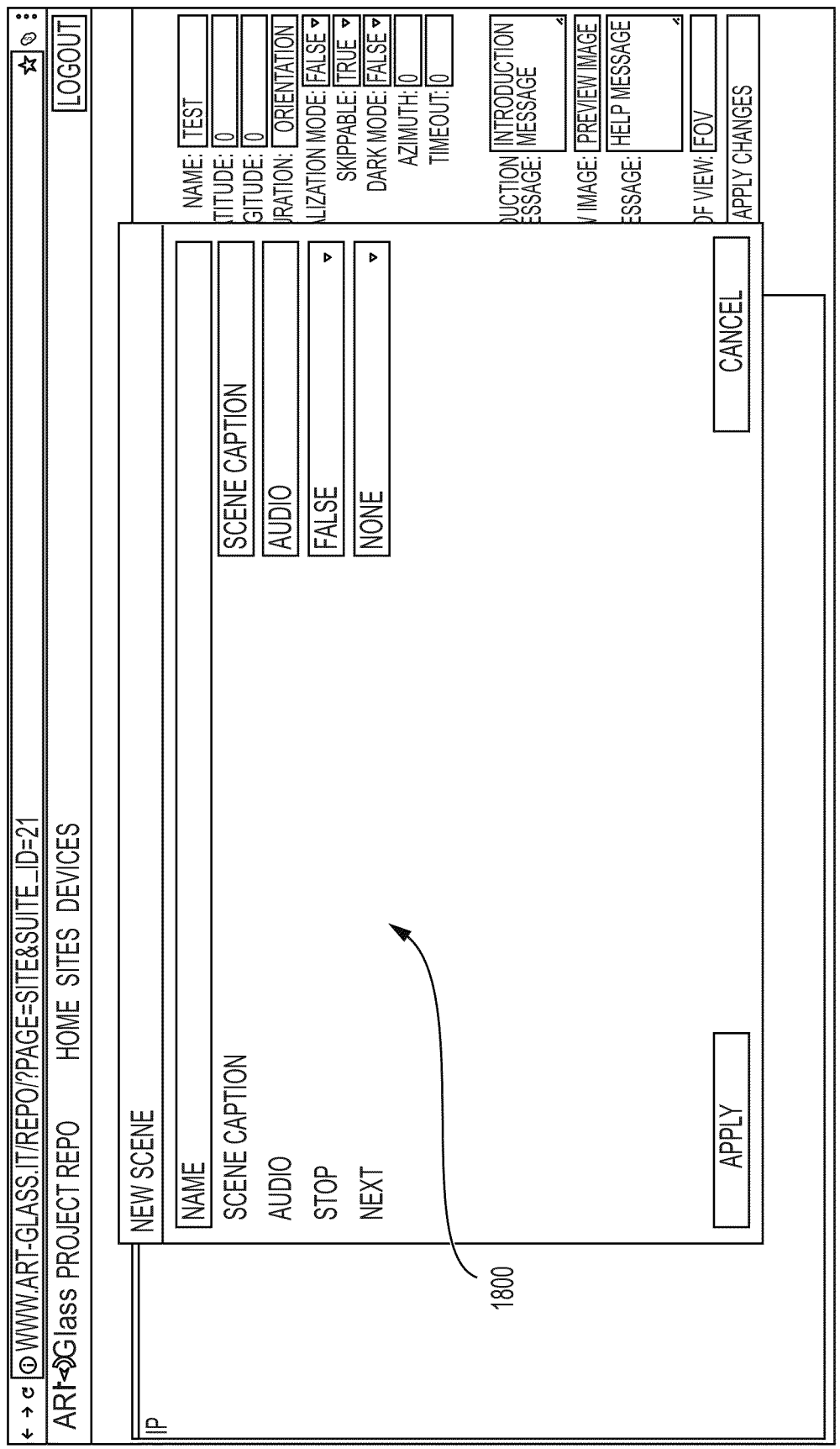
FIG. 18 NEW SCENE SCREEN

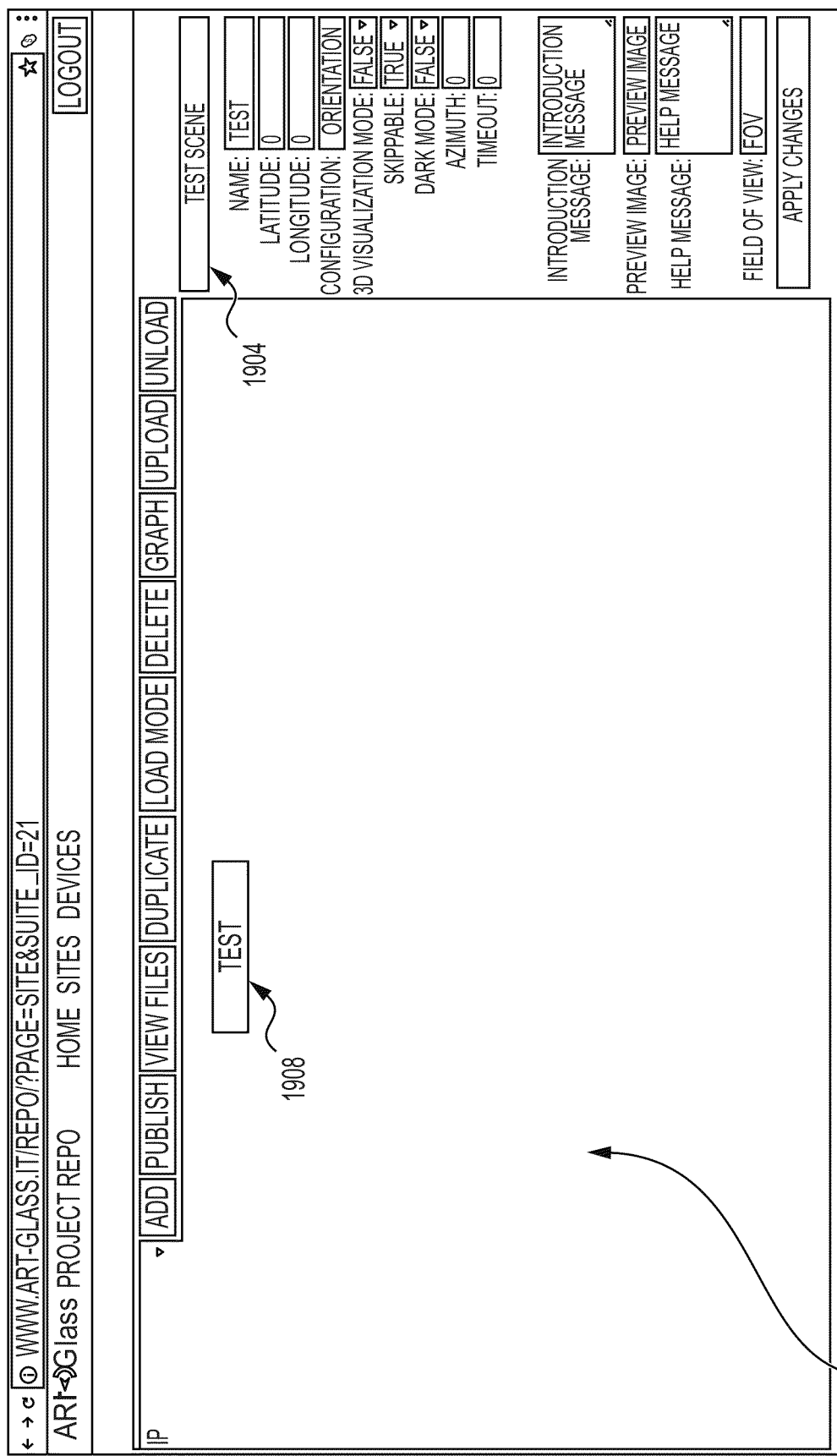
FIG. 19  SCENARIO PROPERTY SCREEN WITH SCENE DISPLAYED

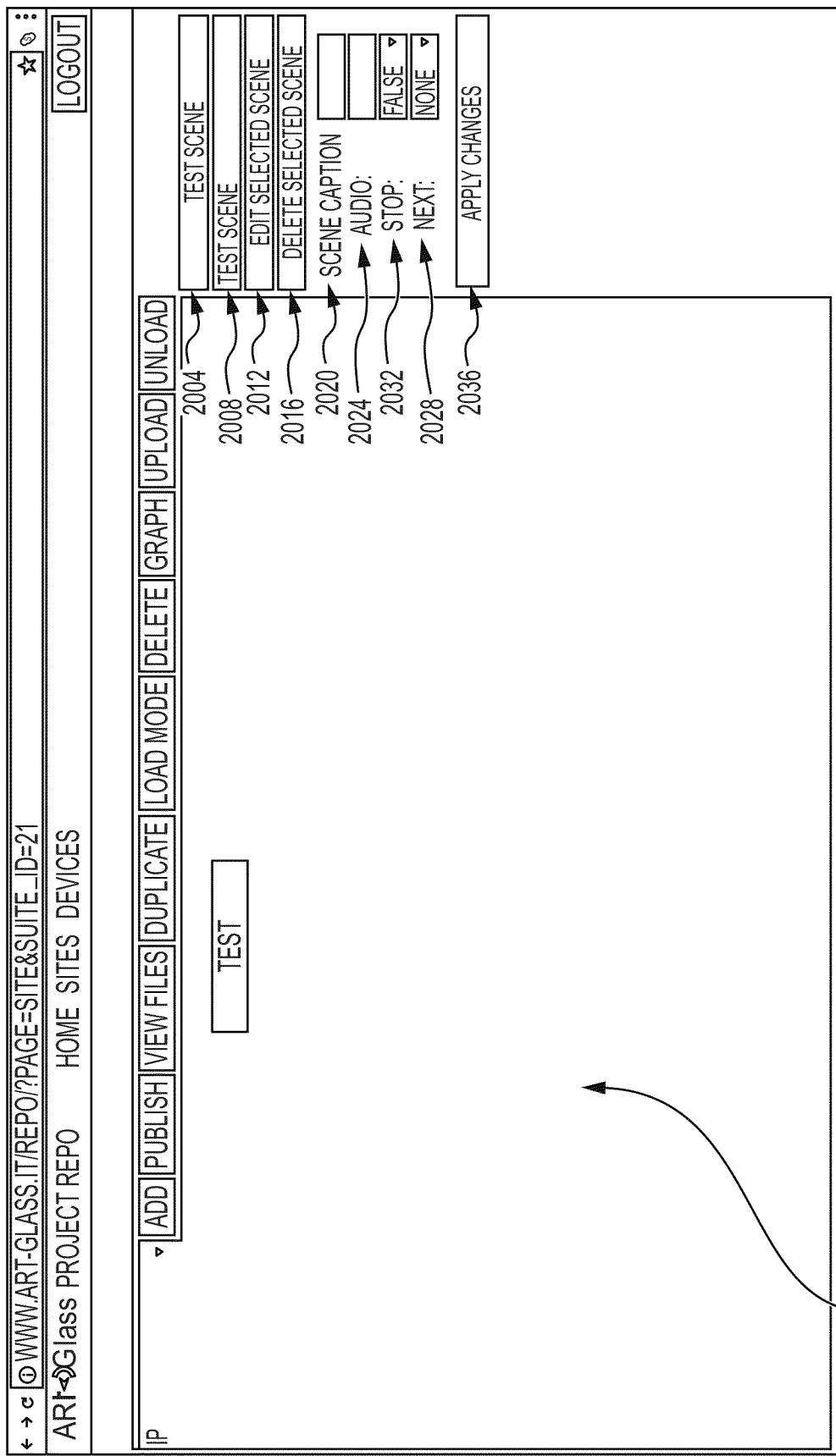
FIG. 20 SCENE PROPERTY SCREEN

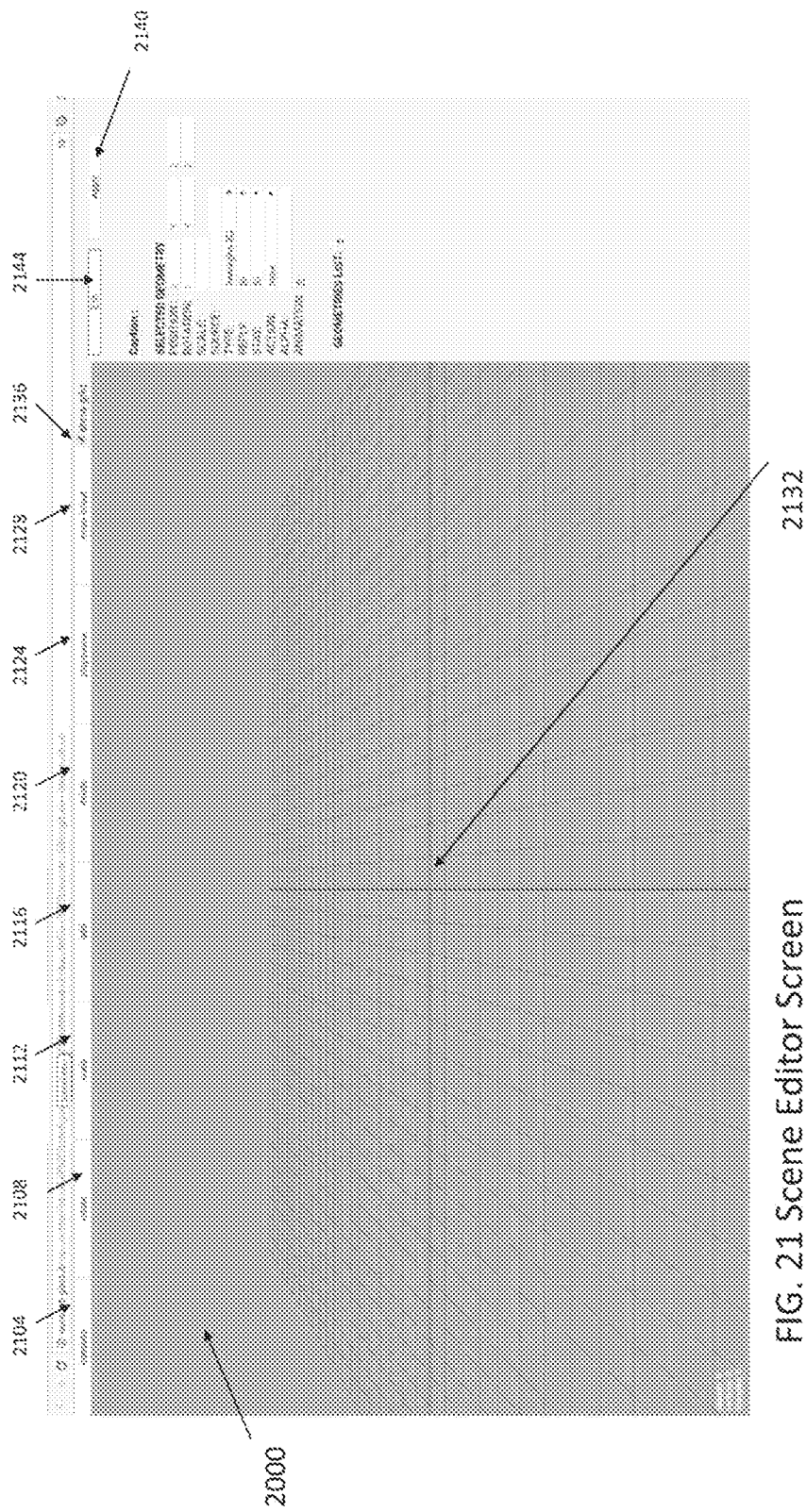
FIG. 21 Scene Editor Screen

AUGMENTED REALITY SMARTGLASSES FOR USE AT CULTURAL SITES

RELATED APPLICATIONS

This patent application claims priority to provisional patent application 62/572,452, entitled METHOD AND SYSTEM OF USE OF EDITORIAL CONTENT IN A SITE, PREFERABLY OF CULTURAL OR ARTISTIC OR LANDSCAPE OR NATURALISTIC TYPE OR RELATING TO TRADE SHOWS OR EXHIBITIONS, filed on Oct. 14, 2017 naming as inventors Luigi Percuoco and Antonio Scuderi. This provisional patent is hereby incorporated herein by reference in its entirety. This patent application also claims priority to Italian Application Ser. No. 102017000058961 (also known as IT2017000058961) entitled, METODO E SISTEMA DI FRUIZIONE DI UN CONTENUTO EDITORIALE IN UN SITO PREFERIBILMENTE CULTURALE O ARTISTICO O PAESAGGISTICO O NATURALISTICO O FIERISTICO O ESPOSITIVO filed on May 30, 2017 naming as inventors Luigi Percuoco and Antonio Scuderi. The translated title of this Italian patent application is: METHOD AND SYSTEM FOR THE UTILIZATION OF EDITORIAL CONTENT IN A SITE, PREFERABLY OF CULTURAL OR ARTISTIC OR LANDSCAPE OR NATURALISTIC TYPE OR RELATING TO TRADE SHOWS OR EXHIBITIONS. This Italian Patent Application is hereby incorporated herein by reference in its entirety.

TECHNICAL FIELD

This invention relates to augmented reality systems and devices that provide the user with enhanced human sensorial perceptions using digital content. More particularly it relates to the use of smartglasses to create an immersive Augmented Reality experience for visitors of cultural sites using object identification and optical flow tracking.

BACKGROUND OF THE INVENTION

Augmented Reality is the enrichment of human sensorial perceptions using digital content and providing information that would not otherwise be perceived with the five senses.

SUMMARY OF THE INVENTION

The invention includes a system software platform and methodology especially suited to design and deploy immersive Augmented Reality experiences to visitors of cultural sites on user wearable devices. In some embodiments, the user wearable devices are glasses (sometimes called smartglasses).

Smartglasses are intelligent devices equipped with a binocular video projector, movement and position sensors, camera and audio services. These devices have the considerable advantage of being worn like regular eyeglasses and therefore enable the wearer to interact with the real-world environment in ways enhanced by the new dimensions offered by augmented reality and digital storytelling. Because smartglasses may combine hands-free use with binocular projection, they offer the wearer a more immersive, 3-D experience than hand-held devises, while enabling real-world visits unavailable with closed virtual reality goggles.

Smartglasses hardware typically requires third-party developed software and applications for practical use. This invention includes a system software platform and methodology that enables platform administrators to convert disparate cultural site content to coherent augmented reality story-telling experiences (called PALIMPSESTS or TOURS) deployed across an array of smartglasses hardware models to visitors of cultural sites.

These immersive augmented reality experiences may provide additional information regarding a particular artifact or artwork, allow the user to view a historical site as it would have appeared prior to its present configuration, provide a character-guided tour of an area or collection of objects, etc., and interact with objects and characters. These immersive experiences become possible when a visitor uses the smartglasses upon which operates an application of the system software platform containing the site-specific tour. The self-guided tour may be either unstructured or structured (for example, a chronological tour of an exhibit) depending on the requirements of the site. Guided tours may also take advantage of this Augmented Reality technology.

Cultural sites contribute raw tour narratives and content, which may take the form of digital scans of images, documents, art, artifacts, original audio and video, and more, via a cloud-based system. System software platform administrators aid the site in tour-script creation through a team of cultural site experts (Archaeologists, Anthropologists, Art Historians, Storytellers, etc.) and digital experts (3D modelers, graphic artists, etc.). Administrators use the system software platform and methodologies to create, organize, and cohere visual and audio creative work within a flexible tour format. The system software platform then allows administrators to tie the tour content to a system of distinct tour markers. The system uses a distinctive algorithm of visual markers combined with image-recognition to identify the visitor's position and perspective and guide him, like a "cultural navigation system." The platform allows the reuse of tour models, modules, and technical components in the process of creating subsequent tours to save time and expense. Contents may be assembled and reassembled in infinite combinations.

The system platform is very easy to use for site visitors as and they need only wear and follow the instructions provided in the smartglasses. The visit is organized into stops (called SCENARIOs); visitors' flows are very smooth and visitors always know in which step of the way they are and where they should go next. This system may allow visitors to freely choose to follow an alternative path among the scenarios, always letting the visitor return to the main path or the end point to return the smartglasses to the appropriate drop-off location.

This invention relates to a system and methodology for the utilization of editorial content in augmented reality tours of a site, preferably of cultural or artistic or landscape or naturalistic type or relating to trade shows or exhibitions.

The site comprises a plurality of points of interest that can be, by way of non-limiting example, artworks, details of artworks, artifacts, archaeological sites, buildings, building ruins, a naturalistic detail or any other element of interest to be shown to a visitor.

For at least thirty-years, the known art of cultural site tour-augmenting technology has been audio guides. Generally, these audio guide systems of editorial content in a site consists of an audio-guide device comprising a loudspeaker, a memory, and a keypad, provided by the site to the visitor. In the memory are loaded audio recordings relating historical information about a point of interest. A visitor can listen to said audio recordings by selecting on the keypad a number that has been associated with the point of interest before which he is located. The audio-guide augments the visitors experience with only audio; it provides no visual augmentation and no opportunity for interaction with digital forms of the site's content.

Very recently a small number of cultural sites have developed apps downloadable to a visitor's smartphone or installed on a smartpad on loan from the site that allow the visitor to augment certain objects in an exhibit with audio heard through the smartphone headphones and additional text and images available for viewing on the hand-held device's screen. These apps require the user to scan a QR code to trigger the content, or rely exclusively on Wi-Fi-signals, to determine a visitor's location. A few such apps may also provide a 2-D augmented reality experience insofar as when the visitor holds their smartphone or smartpad in the air in front of an object, digital augmentation appears over a captured image of the real-world object displayed within the viewscreen of the hand-held device. These apps offer 2-D visuals, not the immersive 3-D binocular experiences available through smartglasses and 3-D augmented reality software systems. Further, to trigger the experience in the device, they require either manipulation of the devise by the user or rely solely on transmission technologies such as Wi-Fi, with frequent rates of failure, whereas the present invention requires no device manipulation by user and may rely only in part, or not at all on Wi-Fi transmissions, instead using its own photo-recognition algorithm to be free from, or markedly less reliant, on hardware beyond the smartglasses.

One aim of the present invention is to provide a method for the utilization of editorial content that overcomes at least one of the drawbacks of the known art.

According to the present invention, a method is provided for the utilization of editorial content in a site, preferably of cultural or artistic or landscape or naturalistic type or relating to trade shows or exhibitions by means of software system platform deployed on a user-wearable device (e.g., smartglasses); the site comprising a plurality of points of interest; the user-wearable device (e.g., smartglasses) are comprised of a display unit, an audio unit, a camera, a memory and a processing unit; the method comprised of a learning phase that defines at least one marker datum for each point of interest, a configuration phase, and a user utilization phase; the configuration phase comprises the phase of storing in the memory of the user-wearable device (e.g., smartglasses) a plurality of scenes, and the plurality of points of interest, and wherein each scene is coupled with a point of interest; the user utilization phase is comprised of the step of detecting one of the points of interest from the plurality of points of interest stored on the basis of an image framed by the camera of the user-wearable device (e.g., smartglasses) or on the basis of a position detected by means of a radio signal, and reproducing the scene coupled with the point of interest detected via the display unit and/or the audio unit; preferably the scene comprises at least one visual element and/or one audio element. The points of interest are typically named and stored or registered in the system.

Thanks to the present invention, a visitor to the site need simply wear the user-wearable device or smartglasses, which will guide him along the route to be followed inside the cultural site with audio and/or video instructions and will show him the points of interest. At the moment that the visitor looks at a point of interest, the wearable device or smartglasses will project video and/or audio content of the scene associated with the point of interest and illustrating the point of interest, when the illustration of said point of interest is over, the device will guide him to the next point of interest or to subsequent points of interest. In some embodiments, the user is guided without him having to manipulate any aspect of the devise. In yet other embodiments, the wearable device operates without the device having to rely only or at all on Wi-Fi transmissions.

According to an embodiment, the learning phase comprises the phase of defining at least one marker datum for each point of interest to be stored in the memory of the user-wearable device or smartglasses; the phase of defining at least one marker datum comprises the phase of recording at least one image of the respective point of interest and processing the at least one image to obtain the at least one marker datum; preferably recording a plurality of images of the respective point of interest (e.g., from different angles, height and in different light conditions) and processing the plurality of images to obtain a marker datum from the plurality of images or a respective marker datum for each image of the plurality of images to be stored in the memory of the user-wearable device or smartglasses; the phase of recording the at least one image is preferably performed by taking a photograph with a camera of a master device or with the camera of the user-wearable device or smartglasses.

According to another embodiment, the configuration phase comprises loading in the memory of the user-wearable device or smartglasses at least one marker datum defined for each point of interest and coupling it to the respective point of interest and to the relative scene; the user utilization phase comprising the step of cyclically recording an image during a visit to the site, defining a marker code on the basis of processing the image recorded; comparing the marker code with the plurality of marker data stored and, if the marker code is the same as or has a degree of similarity greater than a given threshold with one of the marker data, selecting said marker datum and reproducing the scene associated with the marker datum selected via the display device and/or the audio device.

According to another embodiment, the site comprises a plurality of stopping places, each of which comprises at least one of the points of interest of the plurality of points of interest; the learning phase comprising the following steps for each stopping place: detecting a position signal by means of a geo location device in the stopping place with which to associate the scenario to be shown to the visitor, defining a position datum on the basis of the position signal detected.

According to another embodiment, the configuration phase comprises loading into the memory: a) a plurality of scenarios, each of which comprising a group of scenes of the plurality of scenes; b) a specific position datum for each scenario and coupled thereto; the user-wearable device or smartglasses comprising a geo-localization module; the user utilization phase comprising the steps of: detecting a position parameter indicating the position within the site by means of the geo-localization module; comparing the position parameter with the plurality of position data stored; and if the position parameter is the same as or indicates a position within a certain radius from one of the position data, selecting said position datum, and selecting the scene to be reproduced on the basis of the selected marker datum and the selected scenario.

According to another embodiment, the site comprises a plurality of stopping places, each of which comprises at least one of the points of interest of the plurality of points of interest; the learning phase comprising the following steps for each stopping place: detecting a Wi-Fi and/or Bluetooth signal by means of a data connection device with which to associate the scenario to be shown to the visitor; defining a position datum on the basis of the position signals detected.

According to another embodiment, the configuration phase comprises loading into the memory: a) the program schedule comprising a plurality of scenarios, each of which comprising a group of scenes of the plurality of scenes; b) at least one position datum for each scenario and coupled thereto; and the user utilization phase comprises the steps of: detecting Wi-Fi and/or Bluetooth signals by means of a data connection module and processing a position parameter on the basis of the signals detected; comparing the position parameter with the plurality of position data stored; if the position parameter is the same as or has a certain degree of similarity with one of the position data, selecting the scenario associated with the position data, selecting the scene to be reproduced on the basis of the selected marker datum and the selected scenario.

According to an embodiment, the learning phase comprises installing radio transmitters within the site and at stopping places or points of interest; the radio transmitters being configured to transmit signals that differ from each other; coupling the different signals of the radio transmitters to the respective stopping places or points of interest.

According to another embodiment, the wearable device comprises a pair of glasses having at least one lens coupled to the display device; the user utilization phase comprises the step of wearing the pair of glasses having the at least one lens; projecting the visual elements associated with the scenes selected onto the at least one lens of the glasses.

According to another embodiment, the at least one lens is transparent; the user utilization phase comprises projecting the visual elements associated with the scenes selected onto the transparent lens of the glasses.

According to another embodiment, the glasses have two lenses, preferably transparent; the user utilization phase comprises simultaneously projecting two different visual elements associated with each scene onto two different lenses of the glasses.

According to some embodiments, the system provides a stereoscopic view to the user.

According to another embodiment, the learning phase comprises the phase of travelling a route comprising a plurality of stopping places, each of which comprises at least one point of interest; for each stopping place detecting a GPS signal and/or a Bluetooth signal and/or a Wi-Fi signal and defining the position datum on the basis of the signal or signals detected. This creates within the system database a geographic representation of the boundaries of the room or outside area of the scenario for which a set of scenes are located.

According to another embodiment, the learning phase comprises the phase of travelling a route comprising the plurality of points of interest; for each point of interest detecting a GPS signal and/or a Bluetooth signal and/or a Wi-Fi signal and defining the marker datum on the basis of the signal or signals detected. This creates within the system database a geographic representation of the boundaries of the room or outside area of the scenario for which a set of scenes are located.

According to another embodiment, the learning phase comprises the phase of travelling a route comprising the plurality of points of interest associated with the site; for each point of interest recording at least one image of the point of interest and defining at least one marker datum on the basis of the at least one image detected; preferably processing the recorded image and obtaining the marker datum on the basis of the processing of the image recorded. This creates within the system database a geographic representation of the boundaries of the room or outside area of the scenario for which a set of scenes are located.

According to another embodiment, the learning phase comprises the phase of travelling a route comprising the plurality of points of interest associated with the site; for each point of interest recording at least one plurality of images of the point of interest, preferably from different angles with respect to the point of interest or with different lighting conditions, and defining at least one marker datum for each image detected, associating each marker datum defined to said point of interest, preferably processing each image recorded and obtaining a respective marker datum for each image recorded on the basis of the processing of the recorded image. This creates within the system database a geographic representation of the boundaries of the room or outside area of the scenario for which a set of scenes are located.

According to another embodiment, each scene comprises one or more visual elements that can be projected in sequence.

According to another embodiment, each scene comprises one or more pairs of visual elements, the user utilization phase comprises the steps of projecting each pair in sequence, projecting both visual elements of each pair onto two different lenses so as to provide a stereoscopic view.

According to the present invention a system is created for the utilization of editorial content comprising a user-wearable device or smartglasses; the user-wearable device or smartglasses comprising a display unit, an audio unit, a camera, a processing unit and a memory; the memory of the user-wearable device or smartglasses having stored a program schedule that in turn comprises a plurality of scenes; the user-wearable device or smartglasses being configured to cyclically record an image via the camera, select a scene on the basis of the image recorded, reproduce the scene selected via the display device and/or the audio device; preferably the scene comprising at least one visual element and/or one audio element.

According to an embodiment, the memory comprises at least one marker datum for each scene, coupled thereto; the user-wearable device or smartglasses being configured to define a marker code on the basis of the processing of the image recorded, comparing the marker code with the plurality of marker data and if the marker code is the same or has a degree of similarity greater than a given threshold with one of the marker data, selecting said marker datum, reproducing the scene associated with the selected marker datum via the display device and/or the audio device.

According to another embodiment, the memory includes a program schedule comprising a plurality of scenarios, each of which comprises a group of scenes of the plurality of scenes; and a position datum for each scenario and coupled thereto; the user-wearable device or smartglasses comprising a geo-localization module and being configured to: detect a position parameter indicative of the position within the site by means of the geo-localization module, comparing the position parameter with the plurality of position data and if the position parameter is the same or indicates a position within a certain radius from one of the position data, selecting said position datum, selecting the scenario associated with the position datum, selecting the scene to be reproduced on the basis of the selected marker datum and the selected scenario.

According to another embodiment, the memory includes a program schedule comprising a plurality of scenarios, each of which comprises a group of scenes of the plurality of scenes; and a position datum for each scenario and coupled thereto; the user-wearable device or smartglasses comprising a data connection module and being configured to: detect a position parameter indicative of the position within the site by means of the data connection module, comparing the position parameter with the plurality of position data and if the position parameter is the same as or has a certain degree of similarity with one of the position data, selecting the scenario associated with the position datum, selecting the scene to be reproduced on the basis of the selected marker datum and the selected scenario.

According to another embodiment, the wearable device comprises at least one pair of glasses having at least one lens and being coupled with the display unit; the display unit being configured to reproduce one or more visual elements of the scene onto the at least one lens.

According to another embodiment, the wearable device comprises glasses having at least one lens and being coupled with the display unit; the display unit being configured to reproduce the visual element or elements of the scene onto the at least one lens.

According to another embodiment, the at least one lens is transparent, in particular the lens may be clear or partially darkened.

According to another embodiment, the glasses have two lenses; the scene comprises at least one pair of visual elements, wherein the visual elements of the pair differ from each other; the visualization unit being configured to reproduce the two visual elements of each pair simultaneously by two different lenses so as to provide a stereoscopic view to the wearer.

Another aim of the present invention is to provide a method for defining the marker data of a system for the utilization of editorial content in a site that overcomes at least one of the drawbacks of the known art.

According to the present invention, a method is provided to define the marker data of the utilization system, the method comprising the following steps for each marker datum: recording at least one image of the point of interest with which to associate the scene to be shown to the visitor; processing the at least one image and defining a marker datum on the basis of the processing carried out.

According to an embodiment, the method comprises the following steps for each point of interest: recording a plurality of images of the point of interest from different angles with respect to the point of interest and/or with different lighting conditions of the point of interest; defining a marker datum for each image recorded on the basis of the respective image recorded; associating each marker datum defined with the point of interest and with a scene to be shown to the visitor; the method comprises the step of processing each image recorded and defining a marker datum for each image recorded on the basis of the respective processing carried out.

Another aim of the present invention is to provide a method for defining the position data of a system for the utilization of editorial content in a site that overcomes at least one of the drawbacks of the known art.

According to the present invention, a method is provided for defining the position data of the utilization system, the method comprising the following steps for each position datum: detecting a position signal by means of a geo-localization device in the stopping place with which to associate the scenario to be shown to the visitor; defining the marker datum on the basis of the signal detected.

According to the present invention a method is provided for defining the position data of the utilization system, the method comprising the following steps for each position datum: detecting a Wi-Fi and/or Bluetooth signal by means of a data connection module in the stopping place with which to associate the scenario to be shown to the visitor; processing the signals received and defining the marker datum on the basis of the processing carried out.

Further features and advantages of the present invention will emerge from the following description of its non-limiting embodiments, with reference to the accompanying Figures.

BRIEF DESCRIPTION OF THE DRAWINGS

FIG. 4 is a smartglasses of the utilization system shown in the preceding Figures.

FIG. 5 is an exemplary Login Screen for the system software platform.

FIG. 6 is an exemplary Home Screen for the system software platform.

FIG. 7 is an exemplary Main Site Page for the system software platform.

FIG. 8 is an exemplary Add Palimpsest Screen for the system software platform.

FIG. 9 is an exemplary Publish Palimpsest Screen for the system software platform.

FIG. 10 is an exemplary View Files from Selected Palimpsest Screen for the system software platform.

FIG. 11 is an exemplary Upload Assets to Selected Palimpsest Screen for the system software platform.

FIG. 12 is an exemplary Delete Assets from Selected Palimpsest Screen for the system software platform.

FIG. 13 is an exemplary Scenario Comment Screen for the system software platform.

FIG. 14 is an exemplary Add a New Scenario Screen for the system software platform.

FIG. 15 is an exemplary Screen Depicting Newly Added Scenario for the system software platform.

FIG. 16 is an exemplary Scenario Property Screen for the system software platform.

FIG. 17 is an exemplary Add a Scene Screen for the system software platform.

FIG. 18 is an exemplary New Scene Screen for the system software platform.

FIG. 19 is an exemplary Scenario Property Screen with Scene Displayed for the system software platform.

FIG. 20 is an exemplary Scene Property Screen for the system software platform.

FIG. 21 is an exemplary Scene Editor Screen for the system software platform.

DETAILED DESCRIPTION OF EMBODIMENTS

Figure 1A:
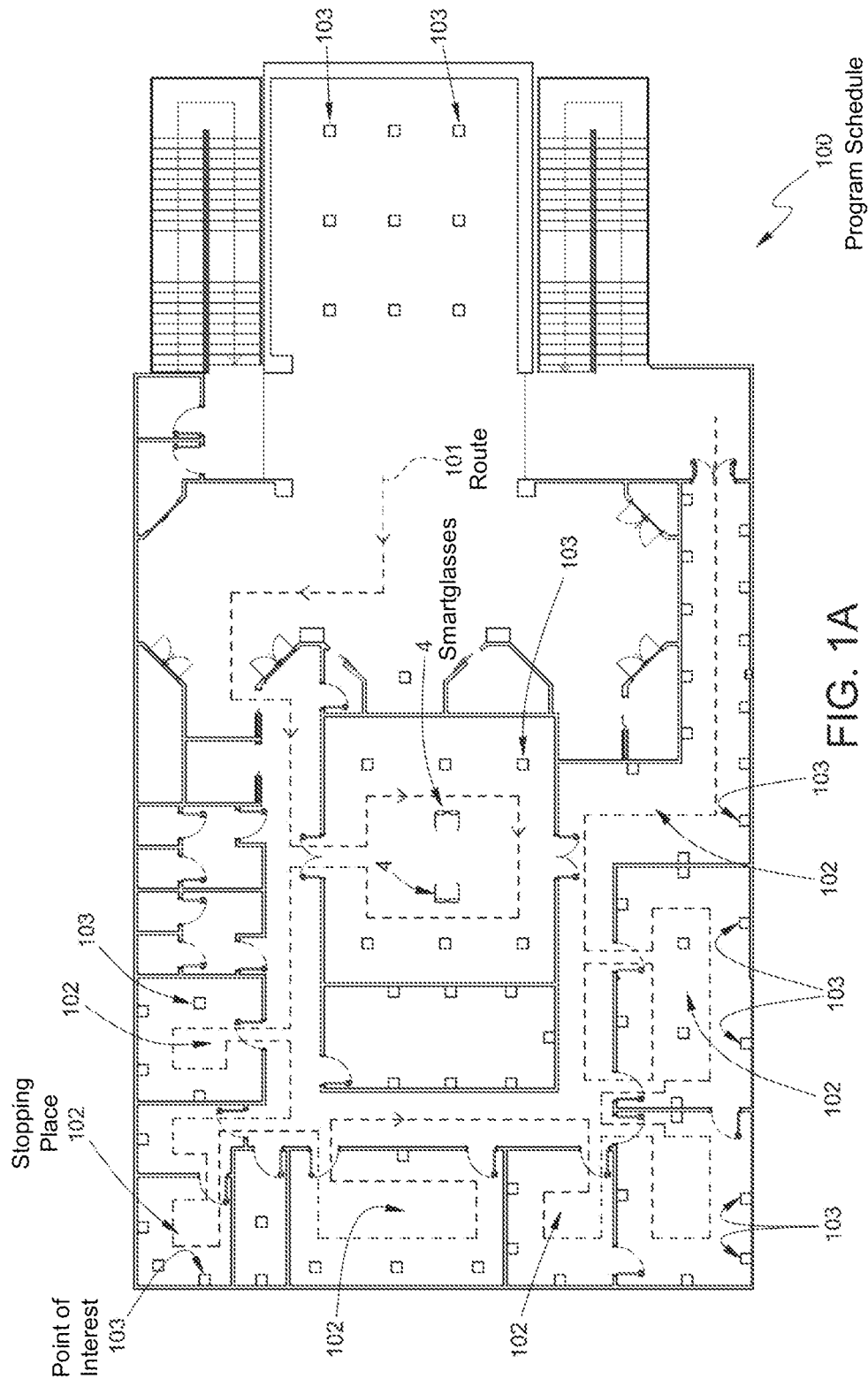
FIG. 1A shows a cultural or artistic site in which a system for the utilization of editorial content is present or being used.

The system software platform is the architectural software utilized to create augmented reality visual images and experiences that may be seen through the user wearable devices while looking at real-world objects.

Architecture Components

Referring generally to FIGS. 1A through 4, in an embodiment, the main modules of system software platform Architecture are as follows: Learning Machine; Central Repository; Updater; and Plugin.

Examples of submodules included in an embodiment include sub Main; Orchestrator; Submodule Positioning; Submodule rendering engine; Sub manager of exceptions and the details of the visit; Submodule tracking engine; Submodule audio manager; Submodule Interaction; Submodule help; Submodule Assistant (user wearable device); Assistant Tablet.

For example, in an embodiment, the Plugin module installed on the user wearable device is organized into the following submodules:
orchestrator
positioning
rendering
tracking
exception handler
data recorder
audio manager
interaction
help
assistant user wearable device
assistant tablet (a user performs work on a tablet, which then provides commands to the user wearable device to create a human guided tour).

The Learning Machine module runs on the user wearable device and is used during the project by the project leader, or other delegated personnel, to enable the user wearable device to register where the user is and what they are looking at. The module allows the user wearable device to register the environment signals and camera images while the operator is walking into the site simulating the user's behavior. All the learned data are then transferred to the central repository in the form of markers.

The Learning Machine module is performed by utilizing an application that is installed on the user wearable devices. The application generates marker files, which are then stored in a local directory in the user wearable devices. For example, a local directory may be set up on the user wearable devices that corresponds to the site id number. When the marker files are generated, they could be stored in this local file and then later uploaded to the platform editing database.

The purpose of the Learning Machine module is to produce the digital "footprints" (markers) of the points of interest of the visit. The markers are created by holding the user wearable devices in a manner that replicates the view that a user would have of a particular scene. Once the user wearable device has a view that a user would have, an operator initiates marker registration and identification and the software in the user wearable device identifies a set of markers. In one embodiment, the operator performs the marker identification and registration using the user wearable device and either soft selections or by pressing buttons on the user wearable device. The operator then accepts some or all of the individual markers (e.g., points) from the first view. The operator then moves to a different view and repeats the marker identification and registration process. Finally, after a sufficient number of marker identification views (approximately 1 to 20) the operator ends the identification process. The system then creates a fingerprint using the identified and registered markers. These markers in the fingerprint are then used by the tracking module (described below) to identify the user's view and load the correct scene. In an embodiment, marker registration is done by selecting options in a special menu inside the device.

The basic concept in these algorithms (marker identification and registration, fingerprint creation, tracking module) is the point in an image. The point is the position of a particular region of an image called "feature." An ordinary person skilled in the art will recognize the concept of feature in image recognition. The algorithm functions to locate corresponding features between images to establish if they are the same image, even when compared from different angles, heights, distances, lighting, etc. Operatively, the creation of a marker works as follows:

The programmer chooses parameters for a marker. These include such parameters as acceptance threshold (new), max distance between points (new), minimum points required (new), maximum number of points (new). These parameters are in addition to system parameters that have already been established for all markers.

The programmer moves to a position in front of the artwork (target), thereby choosing an initial position to capture an image.

The programmer performs the first image capture using button(s) on the user wearable device using the parameters that have been chosen.

If the image is suitable based on the given parameters, the image capture is complete. If the image is not suitable based on the given parameters, the programmer receives a message from the system to retry from a different distance, angle, lighting, etc.

Once an image is successfully captured, the user wearable device registers the image and the point.

The user wearable device next enters a recognition mode and begins tracking the images using the original image and point as a reference.

The programmer can immediately check the first image capture by moving in front of the target.

The programmer evaluates if it is necessary to add a new or additional captured image for the same target.

Once the programmer is satisfied that enough images have been captured for the given marker, the programmer can save the information in the system memory and move to the next target.

Upon completion of the above steps, a marker file contains parameters, target, (image name 1, points set 1), (image name 2, points set 2), etc.

The primary inputs required of any marker to be useful within the system are:

The type of marker, planar marker or 3D marker, depending on the target type—i.e. a painting is generally a planar target, objects or architectures are a 3D target;

The cultural site to which it refers;

The stop to which it refers.

The registration of a marker is carried out under different lighting conditions and with different poses simulating the user movements, in such a way that it can be easily recognized during the visit. This module must be installed on the various models of user wearable device on which we will carry out the end user tour in order to have the same hardware detection conditions between the learning phase and the tour phase.

The commands to register or perform generation of the markers are different from device to device—depending on the buttons and sensors available on the unit—and the module will adapt the corresponding instructions for the operator. The marker contains various information, including but not limited to:

the value of the GPS coordinates at that specific location, if available. This value will be used from the Positioning Module to compare the user location with the marker location.

a map of the Wi-Fi router signals with fixed location (no mobile hot spot) obtained by scanning the environment through the device at that specific location. The map will contain the key data of the scan such as the identification of the equipment and signal strength. This value will be used from the Positioning Module to compare user location with marker location.

The map of Bluetooth signals present in the environment at that specific location, in particular Low Energy (beacons). This value will be used from the Positioning Module to compare user location with marker location.

The visual markers that are recorded from various poses corresponding to images taken from different angles during the marker registration and identification process. These images are analyzed using different algorithms (including open source algorithms) that produce a coding (features). For example, during the visit, the camera frame is passed to the feature generation algorithm (e.g., opencv) and then the features are compared with the ones stored during the learning phase (comparison is done using for example opencv). For example:

Consider a value of n matching on a total of m features of the actual frame. Then, $x=n/m(\%)$ represents the score of that matching.

Consider a threshold value t that is predetermined. Each frame has its x value. Each x value is averaged with previous values coming from the previous frames ($a=(x+a)/2$ with $x>t$, otherwise $a=0$). In this example, $a>t$ indicates that the target value is reached (=) or surpassed (>).

This calculation has the following effect: the visitor has to see the target for a certain number of frames in order to have the match; otherwise the match is lost.

If the number of features exceeds the predetermined threshold described above, then the frame image is considered reliable and the corresponding features are recorded. This operation is performed from different camera angles and under different lighting conditions. The markers are generated with a process of accumulation and can be immediately verified by the operator. This means that during the learning phase, after a new shot, the device starts the tracking of the target, giving the operator the possibility to verify in real time if the learning done until that moment is robust enough. If not, he can continue the process adding more shots or images to the marker set. The accumulation process can also be carried out at different times (e.g. different days or different times of the day). The markers will then be used during the tour by the positioning and tracking modules.

Various other scoring, matching, calculations, mathematical algorithms and thresholds may be used with regard to visual markers and are within the scope and spirit of this disclosure.

The marker consists of a record of a point on a planar or non-planar object within or upon a scene. The collection of markers on the scene together forms a fingerprint of the scene that the user wearable device compares with the view that the user sees. The system attempts to match the markers using similarity algorithms.

For example, the following steps describes one embodiment of the learning module and creation of marker sets:

a. A learning module application is installed on a user wearable device system by system administrator.

b. The storyboard is already created (through the system software platform) with preferably all stops and all the points of interest defined.

c. An uploader (person to establish the markers) goes to the first point and decides which is the best, good, or better marker for that point of interest based on the following:

light conditions of the subject (paint, architectural element or whatever physical element);

the subject will not be obstructed during the visit;

the subject will not change significantly in the time (tree is not a good marker, movable objects are not good markers, and so on);

Angle viewer will approach subject;

d. If the marker is planar (paint, frescoes, panels, etc.), the uploader selects the 2D option in the application.

e. If the marker is 3D (an object of various dimension e.g., sculpture), the uploader selects the 3D option in the application.

f. The uploader writes the marker name in the application; typically, the marker name is chosen with the same name of the point of interest stored in the storyboard.

g. The uploader indicates the site id that the marker belongs to.

h. The uploader selects the "start tracking" mode.

i. The image recognition module begins recognizing camera images and plots dots on the screen corresponding to features. Features are well recognizable regions of an image (feature generation may be performed using opencv library).

1. In one embodiment, a marker has at least 20 features, otherwise the marker is not considered adequate or good enough. In alternative embodiments, at least 300 features are used. These empirical values are valid for the current/actual generation of user wearable device and may change as hardware capability changes.

2. The features may be represented by dots on the image and are overlapped on the screen in order to give the uploader an idea of how the features are distributed. (This is a not uncommon representation in image recognition systems for example within the opencv community).

j. If the marker is 2D and features are >=20 (or >=300), the learner module registers the image and related features in a file. One image may be sufficient.

k. If the marker is 3D, one image is not enough because the system needs to reconstruct a 3D points set; thus the camera should be moved around the subject obtaining images from different angles (a publicly available method known as STRUCTURE FROM MOTION may be used—the system may use opencv library and some custom code to perform this operation). When 20 or 300 points or more are obtained, the marker is registered by the uploader.
l. When the "generate marker" button is clicked, the learning module scans all available Wi-Fi signals and registers an array of results (ssid, mac, signal strength, etc.) with the same filename but with a different extension.
m. In the same manner, the learning module scans Bluetooth low energy (BTLE) signals and records the results in a file.
n. In the same manner, the module registers available GPS signals and records the results in a file.
o. Immediately after marker registration, the learning module begins tracking the marker, and shows an image on it once it is tracked. In this way, the uploader may immediately be made aware about the marker performances.
p. If the marker performances are not satisfactory, the uploader can continue the process, generating an additional marker with the same marker name that will be cumulated in the same file. Some markers may also be deleted by the uploader.
q. The process of marker registration continues until the uploader covers all points of interest.
r. Once all points of interest have been covered, the uploader opens the updater module and logs into the repository system with site credentials and uses upload markers options. The updater collects all the markers belonging to the site id and uploads them.
s. The uploader uses the repository system to bind the marker to the scene.
t. It is also possible to use a marker editor within the repository system. The marker editor allows the uploader to change marker names or delete a specified marker from the marker set or import additional markers from the local directory and add them to the file. It is also possible to delete isolated points. For example, points that are not directly related to the marker itself can be deleted. This can occur in such instances as when points are generated for features on the wall next to an object; the editor can delete the points associated with the wall. Similarly, other obstacles or objects (not of interest) near the point of interest may have been captured and need to be deleted.
u. In this way, it is possible to customize the marker set in post-production phase.
v. In the same manner, a threshold can be set to the Wi-Fi, Bluetooth, and GPS signal(s) to indicate the distance to determine when to load the specific stop.
w. The uploader can bind the Wi-Fi or the Bluetooth signal to the STOP (or scenario); binding the Bluetooth and Wi-Fi files previously generated.
x. During the fruition or use phase, the user walks in/through the site—indoor or outdoor.
y. The user wearable device continuously or periodically checks the signals arriving from the environment (Bluetooth, Wi-Fi, GPS).
z. If a new signal is intercepted, e.g., Bluetooth beacon with a specified minimum power is intercepted, then:
  1. The user wearable device checks if that beacon is associated with any of the stops; and
  2. checks if the power> greater than the power recorded/settled in the editor system (this means very close and the stop is loaded).
  3. From this moment all signal checks are suspended;
  4. The user wearable device loads the corresponding stop from the system memory; and
  5. the visual recognition is started to reach the targets related to the specific stop.

CENTRAL REPOSITORY. This is the central system in the cloud; it is a collaborative environment where experts can work together to create experiences. In an embodiment, this collaborative environment is web-based. The data collected as described above is stored in a database. This database may be of any commercial or proprietary type and may be located on-site or remotely from the cultural site that will utilize the data. Primarily, the data will be located in a remote database that allows access to any number of remote users, to provide an internet-based collaborative environment where experts in multiple fields can work together to create geometry and audio for the user experiences.

The database may be administered by the owner of the system software platform, or alternatively, by the administrators of an individual site. Access to the database and the associated data may be controlled through commercially available software that provides users associated levels of access based on the requirements of their participation (i.e. administration, contribution, read-only, etc.). When the data is stored centrally on a server owned or controlled by the owner of the system software platform, the owner of the system software platform will have full access to all content and data entered for any Site. Such a system allows for cross-collaboration and creation of content that may be common to more than one Site. License agreements may be established through such a central repository by the owner of the system software platform in order to limit or control access to data.

The central repository provides a system for user administration, sites administration and licenses. Examples of user levels include:
  Guest: can only view and upload content but not edit;
  Site manager: can view and upload content, and also modify and delete content;
  Contributors: can configure the tour, upload files, delete files;
  Project leader: can create a tour, add, delete or modify the rights of a user, and acts as a contributor;
  Admin: administers the system and can act as a project leader and can also add or delete licenses, assign the project leader right, access to the log files. Note that the licenses are assigned to the user and not to the site so that the same user can manage multiple sites and move user wearable device within a group of museums.

The central repository home page is customized depending on the user rights and displays only the sites to which the user can access and commands that are allowed to the user. The users can also change their password. At a minimum, there will be one account with edit permissions for each site. This ensures each site is properly administered to maximize the visual data content stored for each site. Generally, the storytelling is a high level or top-level view thus maintaining an overview of the tour. Storytelling is represented graphically by boxes and arrows. The boxes represent the stops and arrows the transition between the stops. See generally FIGS. 1A, 2, 3A and 3B.

Operations that can be performed on the tour:
  add/delete a new tour;
  edit a tour;
  duplicate a tour or a stop (tour/stop templates to copy from are also available);
  upload content in a tour;

publish the tour (the publication means that user wearable device are able to download updates).

By clicking on the stop, it is possible to navigate its properties and the various scenes contained within the stop. The properties are:

geo-location of the scenario (latitude and longitude): this can be set manually to be used as a mock location in the absence of a GPS signal;

set of markers associated with the scenario: In this set of markers are also included the GPS, Wi-Fi and Bluetooth signals corresponding to the location where the marker was registered. Those values can be edited to delete some of them in the case they are considered redundant or obsolete. These values determine the position of the user to check if the user is in proximity of a specific stop or within a certain distance. In this example the specific stop will be loaded and the visual recognition will start;

whether the scene is to be displayed in stereo (i.e. the contents are produced in stereoscopy);

if the completion of the scenario is required to continue the tour the orientation of the scenario, with respect to the geographic north, it is used to orient all the scenes according to the real situation parameters of help system, timers, messages, the introductory panels.

When the scenario is loaded, the introductory message and the graphic panel give instructions to the visitor on where to go and what to look for to identify the scene. The help system may be set to be displayed after a certain time if the user does not locate the scene. The set of markers associated with the stop can be viewed and edited through the marker editor, where you can add or delete group of markers.

Clicking on the scene, the scene properties are presented with the following attributes:

marker to which the scene is associated;

the introductory message of the scene;

audio associated to the scene;

a flag that indicates if at the end of the scene the tour ends or continues with the next step.

The user creates and changes the structure of a scene through the scene editor as follows:

the scene editor shows a simulation of what users see in the user wearable device;

with a control panel the editor can change the settings of individual geometries as well as add or delete geometry;

the position and rotation of the geometries can be done graphically by acting directly on the geometries in the scene;

each geometry has different properties depending on the type. Examples of the properties and types are:

Type
picture 2d;
3d model;
billboards;
full-screen video;
video animation;
video360.
Position (x, y, z)
Rotation (with respect to x, y, z)
Scale
Transparency value
Actions if touched (see interaction module)
Animation Persistency (STAY) (i.e. they remain visible even if the user has lost the target)

Repetition (if they can be reproduced several times or only once).

The Updater module is installed inside the user wearable device and this module is installed during the first initialization of each device and acts as a local control unit. This module creates a link with the central repository system, in this way the remote control of all units is available. The updater is used in order to:

Initialize the device. The initialization of a device includes the creation of local workbooks necessary for its usage and in order to generate the license key; this key is created using a security key generation algorithm using the universal time combined with a secret key. The license key is then communicated to the central system that associate this license key to the user deducting the counter of licenses available to users.

Install and update the plugin software. The installation of plug in software can be done by connecting the unit to the central system and downloading the latest version available in the plug in. The installation can also be done using a local software that is loaded into the device by system staff. This second option is particularly useful in situations where connectivity is missing with the central system (this procedure is reserved exclusively to system personnel).

Install and update all tours. This module is used to install and update all the palimpsests, experience contents, and learned data for a specific site. The module is only accessible to authenticated users. The user can authenticate himself on the central system providing his credentials using a log on form. The credentials are checked by the central system and, if the device is activated for the specific user license, the user enters in his personalized home screen. Each user has indeed a number of licenses established by the current contract and recorded on the central system. When a device enters in maintenance, it is possible to delete the existing license from the central system in order to release the current license allowing a new license allocation so as to ensure always the availability of the number of the licenses granted to the user. By using the user credentials, the updater module is able to find the information corresponding to the sites linked to the specific user. The sites and the related tours are shown within a personalized home page showing a list of tours. This list contains the name of the site, an indication of the tour, and the status of the tour. If the tour is already installed on the user wearable devices, there will be the UPDATE button. If it is a new tour, there will be the INSTALL button. The installation works incrementally and, in this way, only the new or modified contents are downloaded during the updating, to let the tours upgrade faster. The system also provides administrative access, allowing the administrator to install any tour he wants, independently from the user rights and licenses.

Upload all the devices log containing user behavior, errors, accounting data, etc. to the central repository.

Upload markers to the appropriate directory project in the central repository.

The Plugin module is installed on the user wearable devices and acts as the user wearable device "brain" to reproduce an experience. The site staff asks the visitor what kind of tour he wants to have (this indicates which palimpsest to activate); the plugin reads the tour and starts to guide the visitor to the site. When the visitor reaches a specific stop, the plugin uses the data collected during the learning phase from learning machine and compares the data with the actual data in order to understand what the visitor is looking at and it activates the corresponding scene. The scene is updated in real time, so the visitor gets an "augmented" vision of the reality where digital elements are superimposed onto real elements, creating a harmonious and coherent vision of the augmented world. The plug module is organized into the following sub-modules:

The sub MAIN module manages the ordinary charging operations of the device, selection and activation of the tour from the staff and the extraordinary operation of reactivation in case of fault of the system. The main module is organized in such a way as to freeze the device when it is connected to the charging cable in order to minimize the battery consumption and optimize the timing of the charging. During charging operations, in fact, all the sensors, wireless connections, the screen and the activities of the processing unit 36 are disabled. The main module recognizes the type of device on which it is installed so as to properly intercept the commands given by the concierge staff. Some wearable devices have a PAD with touch function and hardware keys, other devices have only the proximity sensors: depending on the device, the staff performs specific operations to select the tour and extraordinary operations.

The Orchestrator module acts as the orchestrator of the visit on the basis of the instructions included in the tour and the visitor behavior. This system is also able to perform special commands such as unconditional termination of the tour, following the pressure of a particular keys combination (used by the concierge to finish a tour in advance). The module also performs ordinary operations, as volume adjustment, pause/resume the scene, or reactivate the user wearable device after a long pause. In addition, visitors can decide to follow specific path or select particular contents using the buttons available on the device. Depending on the programming instructions, this module loads the corresponding scene and communicates to the rendering engine the scene to show. The scenes are loaded in a selective manner, i.e. only the relevant scenes with respect to the position of the visitor (known thanks to the positioning module) are loaded. The loading of a scene involves loading the following settings:

Lock/Unlock scene: controls whether it is possible (or not) to leave the scene before completion, for example, if a visitor decides to leave the room and to go into the next room of the museum, then the user wearable device remains in the current scene, forcing the visitor to return in the room to complete the scene.

The 2D/3D display mode: allows the user wearable device is able to project the contents selectively on both eyes, in order to create the feeling of depth for geometries. This setting is decided according to the type of available content; some content, in fact, can be created upstream as stereoscopic content and therefore is suitable for binocular projection in a different way between the right and left eye.

Geometries: Once loaded with the main parameters, the orchestrator loads individual geometries in the scene e.g., position, rotation, level of transparency with respect to the underlying geometries, the scale and provided animations for the geometry with relative activation times. The types of geometries available are:
  2D image;
  3D object;
  360 degree panorama;
  Billboards—special types of 2D images with additional properties such as the geographical position. They are anchored to the corresponding GPS location;
  Infographics (anchored), are 2D images that are positioned on the screen to give the visitor graphic information (a kind of information panel),
  Animations that are projected in the form of streaming video—these animations manage a level of transparency so that it can be projected onto the underlying geometries.
  Animations loops have the same characteristics as the previous animations, but may be infinitely looped until the completion of scene.
  Video full screen occupies the entire field of view and occludes all of the underlying geometry.

The Submodule Positioning module constantly compares GPS, Bluetooth and Wi-Fi signals received from the environment with those previously recorded through the learning module. Each type of signal works independently, all the feedback from the sensors are compared with the values recorded during the learning phase. The first signal that returns a value corresponding to one of the signal previously recorded, will determine the user position. At this point the corresponding stop is loaded and the control is passed to the tracking engine. In the case that a GPS signal is available, it determines directly the user position. In the case of Wi-Fi, the position is derived from the power of previously recorded signals and represents the distance of the user from the sources (the routers). If all the signals are compatible with the original values (the difference of signal is within a range or under a certain threshold), this means that the visitor is in proximity of a point of interest, then the corresponding scene is activated and the control is passed over the tracking engine. Other geolocation signals or devices may be used with the system.

The positioning module can be ignored by the orchestrator in the situation in which the user escapes before the current scene is completed or if there are other scenes that have to be viewed first (in the case of a storytelling the user cannot skip some steps of the story). The scene change is thus influenced by the type of scene and its position in the story. For the scenes whose completion is mandatory, the system is not allowed to change the scene and a warning message is given to the visitor.

Submodule rendering engine: manages the projection of the scene in relation to the position of the visitor with respect to a detected marker. When a marker is detected, the rendering engine shows the scene, positioning the relative geometries and making them visible. The projection is made according to the user pose determined from the tracking engine, that activates the corresponding animations. The animation manager acts on individual geometries. Each geometry, in fact, contains an execution time interval of the animation and the type of transformation to be carried out with respect to position, rotation, scale, and initial transparency. The rendering module also manages the visibility of the screen based on the presence or absence of geometries (some scenes may for example be only audio). The rendering module is capable of projecting the scenes even in the absence of markers; in this case it uses the motion and the magnetic field detection sensors to understand the movements of the visitor and projects the scene in a consistent manner.

Sub manager of exceptions and the details of the visit. This module is invoked at each micro action of the visitor so that it can record all events. The recorded events are
  start visit;
  loading scenarios;
  loading scenes;

user actions as: vocal commands, buttons usage, hand recognition;

marker detection;

abnormal behavior of the software or indeterminate state of the visit. In the case of unexpected error, the system suspends the scene, records in the log all the information available and sends a signal to the main function and repeats the scene from where it has been interrupted. The main module also gives a reassuring message to the visitor.

Information is accompanied by a timestamp, in this way it can then be analyzed as a detailed history of the visit.

Submodule tracking engine: activates the camera and analyzes the flow of images to check the correspondence of these with the set of predefined markers for the specific stops during the learning phase. If the tracking engine finds one or more matches, the tracking engine calculates the pose with respect to them and generates the transformation to be applied to different geometries in the scene, so as to create correct geometries in the projection with respect to the observation point. This activity is carried out in real time by the tracking system and communicated to the rendering system in the form of the transformation. If the marker is lost, the scene is immediately turned off, until a new match is found. The tracking system is optimized so as to report only the changes of state compared to the previous detection. By looking for a change in state, the tracking system allows the rendering system to calculate the scene only when needed rather than continuously. In order to avoid false positive in the target recognition, the tracking engine requires that the target is found for a certain number of consecutive frames. This means that the user is looking at the target and observing it. If one of the consecutive frames is not corresponding to the target, then the target is considered lost and the scene is immediately disabled. Optical flow tracking and extended tracking of a target may also be conducted by the tracking engine submodule.

Submodule audio manager. Multiple audio sources can be combined within a scene, some audio sources are independent from the projection of geometries (for example, to create the background of a story) others may be part of the geometry itself like audio effects (animations that can contain some sounds), in this case sounds are overlapped with the background story, creating a realistic setting.

The background audio has the important task of helping to determine if the scene has terminated. At the end of a background audio playback, the audio module generates an event to the orchestrator communicating that the scene may be finished. The orchestrator module will analyze the scene by checking if other geometries are still playing (in playback) to decide if the scene is completed or not, and consequently move forward to the next stop.

Submodule Interaction. This module interacts with the user. In general, it may interpret one or more of: hand movement, hand gestures, pad movement, hardware buttons or vocal commands, and associate those movements to take or play specific actions during the rendering of a scene. Hand movement can be detected using the device camera or using an external device held by the user. The user's hand positions are typically transmitted to the device using:

device camera in the case of hand free movement;

via cable in the case of pad connected to the device;

via Bluetooth in the case of wireless tab of accessories.

The interaction module is able to interpret specific gestures such as "select" or "move the selected geometry". This module knows the position, orientation and what the visitor is watching and therefore is able to know what the user wants to do. The action to be performed by the system is determined by the properties of geometry involved in the gesture.

Submodule help: performs constant monitoring of the user's behavior and is able to trigger messages and actions towards the user depending on the context. This is accompanied by a multilevel help messaging:

The first level refers to the stop, when a new stop is loaded, the visitor is invited to go to a certain area and watch a particular real object or point of interest.

The second level also refers to the stop, but is activated only after a certain time established during the design of the experience: the first message that appears tells the visitor where to go (first level); the second message, second level, appears after a time established during the design of the experience. The second message is typically used to further help the visitor, giving him more precise information ("Do you need help? The point you are looking for is . . . "). This system produces a sense of safety in the visitor who feels increasingly assisted by the user wearable device.

A third level of help is when the scene is activated, in this case the help message depends on the scene. For example, the visitor might have seen a certain work (scene 1) but he cannot find the next work (scene 2). The help, according to previously performed scene, will be able to send the correct message and help the visitor by giving instructions on where the next scene is. This level of help can also force the trigger of the scene. Some scenes, in fact, may start anyway, even if the visitor did not perform the required actions, and even after repeated help messages. Whether to forcibly continue to the next scene, can be decided at the design stage of the user experience. This option is extremely useful when the scene is very crowded with many visitors and therefore the point of interest is permanently occluded from view. In this case, the wearable device offers the possibility to benefit from the augmented media content for the stop, even if the target point of interest is occluded. Thus, the visitor will have a good experience based on an estimate of the user's position with respect to the target point of interest (e.g., artwork).

Submodule Assistant (User wearable devices). The assistant submodule is activated by the orchestrator if, in a particular stop, the devices are "controlled" by an external tablet. The external tablet identification code is stored within the tour so that the user wearable devices react exclusively to the specific external tablet and ignore all the other sources.

The assistant submodule scans the environment continuing to search for the tablet recorded as master. Once the device identifies the tablet, through the Bluetooth signal, it receives instructions about the scene to be activated. The main commands that the tablet can send to the device are:

activate scene x;

go to the stop y;

end the visit;

start the visit by activating the specific tour.

It is not necessary that the device is permanently connected via Bluetooth with the tablet. The tablet emits a signal and all the devices in the radius of action intercept and execute the command. The device keeps a memory of executed commands and therefore is able to avoid the repeated execution of commands.

Such a system allows the coordination of a very large number of devices by a tablet bypassing the limits of the maximum number of Bluetooth simultaneous connections. When a wearable device executes a command, it performs a broadcast itself with the new state in which it is located. In this way the tablet has the returning information of the status of each of the wearable devices.

This also opens the opportunity that the devices can have consciousness of what the other user wearable devices in the range are performing. In this way if a visitor interacts with a geometry of a scene, the user wearable devices in the vicinity receives this information and can bring it back in the scene (if a visitor decides to activate an animation of a scene, other visitors who are viewing the same scene can see this interaction in augmented reality). This communication system also has cognizance of the distance between devices on the basis of signal power in broadcast and therefore it is also possible to include/exclude actions on the basis of the radius/distance.

ASSISTANT TABLET. This assistant tablet module is installed on a traditional tablet and can be used by touristic guides to coordinate the devices' work. In this way the museum can create a complete self-service tour or a mixed tour; partially assisted by guides and partially self-service. In this way the touristic guides can alternate, during the visit, speech moments (e.g., lecturing) with immersive augmented reality moments.

Before the staff of the museum provides the wearable device to the tourists, they select the palimpsest and the code of the tablet. In this way the assistant module, installed on the tablet, will be able to broadcast information, via Bluetooth, to several devices and to give instructions to the plugin software on what scenario has to be activated and when. The tablet, in fact, contains a copy of the palimpsest, and the guides can choose the contents to be activated at any time. The wearable device themselves produce broadcast signals that the assistant module will be able to interpret, so that the guide will always know what the user is playing (all user wearable device are also labeled on a side, that label is also noted in the tablet). This function can also be used by the museum staffer that approaches a visitor to know what the visitor is looking at and the state of the user wearable device. Thus, the staff will be able to help the user.

The term user means an individual visiting a site (e.g., cultural site) that utilizes the system software platform to create an augmented reality experience. The user is the individual utilizing the user wearable device described herein.

PALIMPSEST. Palimpsest is a guided tour that is based on storytelling with a precise chronological sequence. It is composed of several scenarios representing storytelling phases. The system software platform allows the coexistence of multiple palimpsests within the same cultural site in order to give opportunities and different interpretations of the same storytelling. The palimpsest is created through collaboration among the curators of the cultural site and the editorial team. The drafting of the palimpsest can be made through the preparation of an electronic document directly on-line using the system software platform.

SCENARIO. A scenario is a step of the visit tied to a particular environment (a room of the museum, an area of archaeological site, a particular monument, etc.). Each scenario is accompanied by a set of information that is provided to the visitor by the system software platform help system (the route map with instructions on where to go, what to watch, etc.). This help system is organized so that the system software platform can figure out if the visitor is in trouble and provides assistance on how to get back on the correct path. In addition to messaging, each scenario contains the technical instructions necessary during the visit, such as the scenes display mode and the relevant scenes to be activated.

The term scene means a part of the scenario. A scene is associated with a trigger, referred to as a marker. Once the marker is detected, the scene is shown to the visitor. The scene is composed of different elements: an audio file and many digital objects, called geometries, that are positioned in the scene. The scenes are created within the system software platform using 3D visual editor that allows to graphically position the digital objects (geometries) in a virtual environment in order to have a simulation of what will be the scenes projected to the user. Within a scenario multiple scenes may exist, the scene to be activated is determined by a function of the marker that is intercepted by the end user device. A typical case is a room of a museum (a stop) with several paintings: when the visitor looks at a specific painting, the system will render the corresponding scene, for example the pictorial analysis of the masterpiece. The marker is used to check if the visitor is looking at a particular detail within the scenario and it is created/generated during the learning phase through the learning module, as described below. Using the system software platform, the markers are associated to the scene so that the system is able to understand what to do once the marker is recognized.

MARKER. Markers are the tool used to check if the visitor is looking at a particular detail within the scenario. The markers are created/generated during the learning phase through the learning machine, as described below in this document. The markers are aggregated into a file called "markers" file, this file is associated with a scenario so that the system is able to recognize simultaneously more markers and activate the corresponding scene.

GEOMETRY, the scenes are composed of audio and visual elements. Each visual element corresponds to a geometry. A geometry can be any type of digital file such as images, videos, 3D models, etc. The geometry has different properties such as: the type of file, position, rotation and animations to be activated. The geometries must be anchored to a point of reference; this may be a marker or the visitor himself. In the case of markers, the geometry will be superimposed on the marker. Otherwise the geometry will be positioned in the space around the visitor according with setting made in system software platform. This will create a virtual set around the user with digital billboards, 3D objects, etc., so that the user can explore the scene moving inside the set.

AUDIO. Audio refers to the audio file linked to a geometry in the scene.

FIG. 1A shows a cultural or artistic site in which a system 1 for the utilization of editorial content is present. The invention relates to the application of said utilization system to any type of site, for example a landscape site, a naturalistic site, a cultural site, an artistic site, a site relating to trade shows, a site relating to exhibitions or a site having any type of interest for a visitor.

Referring to FIGS. 1A, 1B, 1C, and 2, the utilization system 1 comprises a central unit 2, a master device 3 and at least one smartglasses 4 (in the accompanying Figures two wearable devices 4 are shown). The central unit 2 comprises a memory 20 and a processing unit 21. The master device 3 comprises a camera 31, a motion sensor 32, a geo-localization module 33, a data connection module 34, a memory 35, a processing unit 36, an operator control 37, preferably a button or keypad that can be used by an operator, and a display unit 38, preferably of video or images or of video and images. Furthermore, the master device 3 can comprise and audio unit and a microphone.

Figure 2:
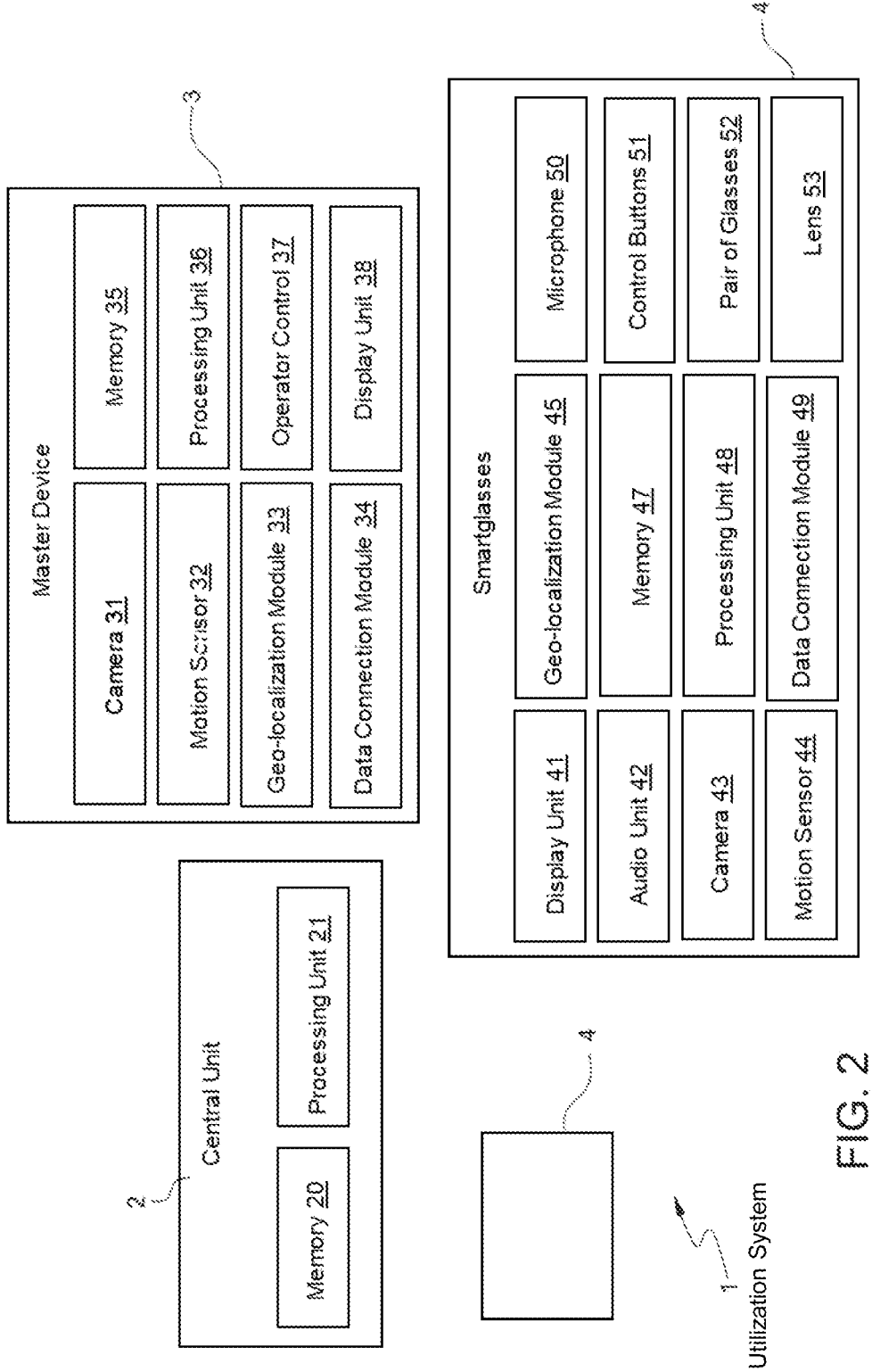
FIG. 2 is a diagram of the system for the utilization of editorial content in preferably cultural or artistic sites made in accordance with the present invention.

With reference to FIGS. 2 and 4, the user-wearable device is a pair of smartglasses 4 comprising a display unit 41; an audio unit 42, preferably earphones with loudspeakers; a camera 43; a motion sensor 44, a geo-localization module 45, a data connection module 49, a memory 47 and a processor or processing unit 48. In an embodiment, the smartglasses 4 comprises a microphone 50 and one or more control buttons 51. While glasses are shown, various other user wearable devices may be used such as googles, retinal displays, headsets, etc.

Furthermore, the smartglasses 4 comprises a pair of glasses 52 having at least one lens 53 coupled with the display unit 41. The display unit 41 is configured to project a visual element 203 onto the at least one lens 53. In the embodiment shown in FIG. 4, the glasses 52 have two lenses 53 coupled with the display unit 41, which transmits two identical or different images (e.g., stereoscopic) onto the two lenses 53. The lenses are typically transparent. In an embodiment, the lenses are transparent and partially darkened so as to reduce the passage of light rays from the surrounding environment. The processor and memory of the smartglasses are programmed or configured to perform the various tasks and generate the images to allow the user to see the augmented reality and multimedia palimpsest.

In the memory 20 of the central unit 2 is stored a route 101 associated with the site and a program schedule 100 associated with the route 101 and site. The route 101 comprises a plurality of stopping places 102. Each stopping place is associated with a location, for example, a room, an area of the site or with an exhibition stand. In an embodiment, the route 101 is defined by a chronological list of stopping places 102. In an embodiment, the utilization system 1 is configured so as to organize the user's visit so that it develops starting from the first stopping place 102 on the chronological list of stopping places and continues with subsequent stopping places 102 on the chronological list of stopping places. In each stopping place 102 there are points of interest 103, which are associated with works such as for example paintings, statues, sculptures, landscapes or more generally any element of interest to a user and before which the user is to stop and receive information. The association between the stopping places 102 and the rooms or areas of the site is made during a learning phase A of the utilization system that will be described later. The association between the points of interest 103 and the relative works is made during a learning phase A of the utilization system 1 that will be described later.

Figure 3A:
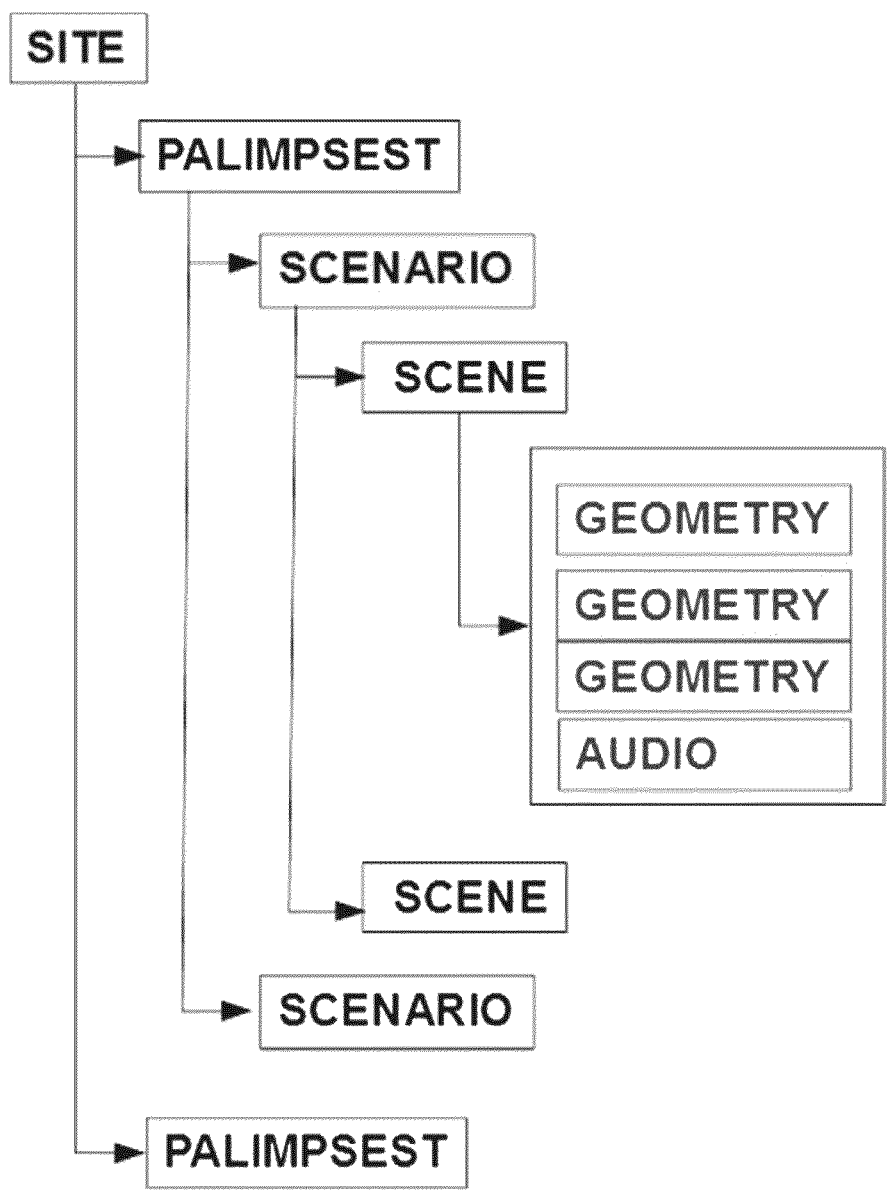
FIG. 3A is an example of a diagram of the structured hierarchy for the media content for a site.
Figure 3B:
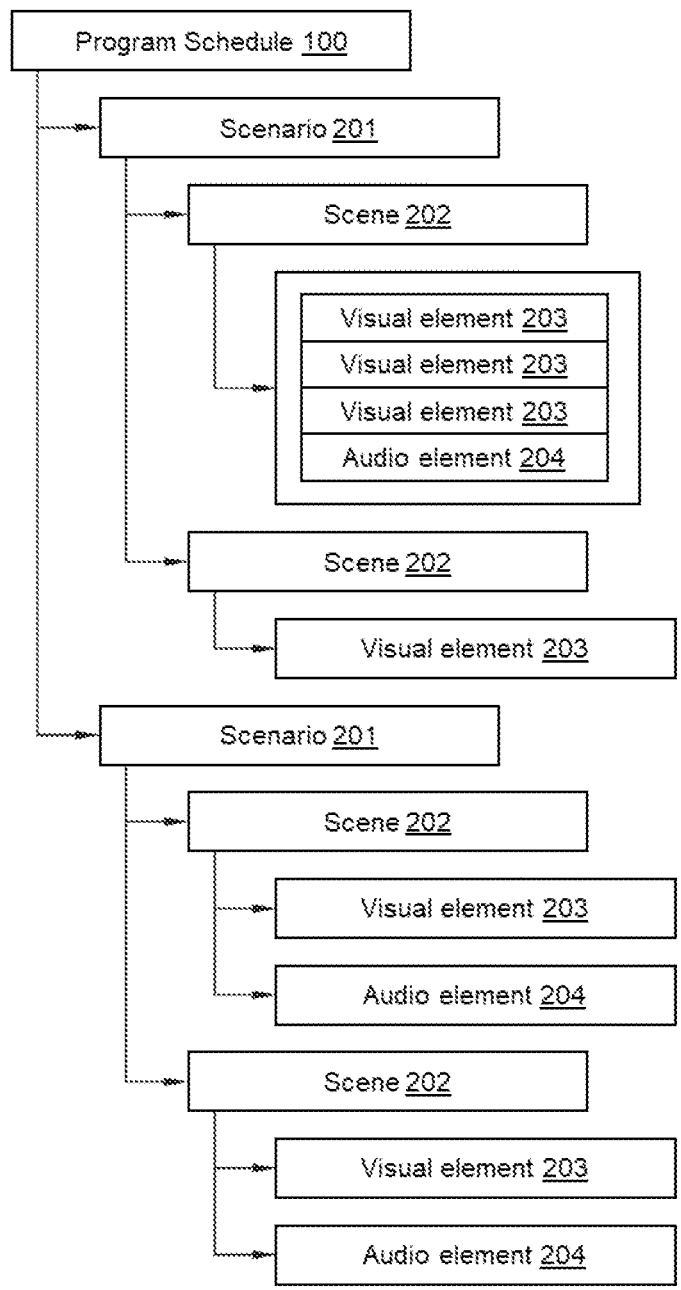
FIG. 3B is another example of a diagram of the structured hierarchy for the media content for a site.

With reference to FIGS. 3A and 3B, the program schedule 100 comprises a plurality of scenarios 201, in which each scenario 201 is coupled with a stopping place 102. Each scenario 201 comprises one or more scenes 202, in which each scene 202 of a scenario 201 is coupled with the point of interest 103. Each scene 202 comprises at least one visual element 203 and/or at least one audio element 204. In an embodiment, each scene 202 comprises at least one pair of visual elements 203, in which the two visual elements 203 of the pair are projected, preferably simultaneously, onto the two different lenses, in other words one of the visual elements 203 of the pair of visual elements 203 is projected onto one of the two lenses and the other visual element 203 of the pair of visual elements 203 is projected, preferably simultaneously, onto the other of the two lenses 53. Each visual element 203 comprises one or more images, one or more videos or a combination of one or more images and one or more videos. In particular, the images or videos can be of a larger size than the size of a user's field of view, or the image can be a panoramic image formed by an assembly of several images side by side. These images or videos can be shown in portions depending on the movements of the user's head so as to show an image or a video having a greater extension than a user's field of view. The movements of the user's head are detected by means of the motion sensor 44. In one embodiment, the motion sensor is mounted on the frame of the glasses 52. The visual element 203 is projected by the smartglasses 4, in particular by means of the display unit 41. The audio element 204 is reproduced by the smartglasses 4, in particular by means of the audio unit 42.

More precisely, the memory 20 of the central unit 2 comprises a plurality of pairs, in which each pair comprises a scene 202 and a point of interest 103. In an embodiment a same point of interest 103 is coupled with two scenes 202, and in which the two scenes 202 belong to two different scenarios 201. As will be described in greater detail later, the point of interest 103 acts as a trigger to start up the utilization or playing of the scene 202 by means of the smartglasses 4.

The system 1 is configured to operate by means of a learning phase A; a configuration phase C usually performed after the learning phase A; and a user utilization phase F performed after the learning phase A and configuration phase C. The goal of the learning phase A is to define the points of interest 103. In other words, during the learning phase A the points of interest 103 are associated with a site element. A site element can be a picture, a statue, a sculpture, a landscape or any other element before which a visitor is to stop and receive information. The master device 3 is used during the learning phase A to define the points of interest 103. In an embodiment, the master device 3 and the smartglasses 4 are devices that have the same hardware components and that have software components that differ from one another, a master software component and a user software component respectively. In an embodiment, the smartglasses 4 is a master device 3 on which the master software component has been uninstalled and the user software component has been installed.

During the learning phase A, the master device 3 defines and stores a plurality of points of interest 103 and associates with each point of interest 103 at least one marker datum detected by means of the camera 31. In an embodiment, during the learning phase A, the master device 3 associates with each point of interest 103 a plurality of marker data detected by means of the camera 31. Furthermore, in an embodiment, the master device 3 associates with each stopping place 102 a position datum detected by means of the geo-localization module 33 or by means of the data connection module 49. In an embodiment, the master device 3 associates with each stopping place 102 a position datum detected by means of the geo-localization module 33 and the data connection module 34.

During the learning phase A, the route 101 is loaded into the memory of the master device 3. Furthermore, the master device 3 is moved within the site along the route 101 by an operator. More precisely, during the learning phase A, the master device 3 is moved along the route 101 from the first point of interest 103 to the last point of interest 103 by the operator. Furthermore, the master device 3 for each point of interest 103 of the route 101 defines at least one marker datum, more precisely, the master device 3 is configured to obtain at least one marker datum for each point of interest 103 from at least one image of the point of interest 103 detected by means of the camera of the master device 3. More precisely, the operator, by using the operator control 37 of the master device 3, selects the point of interest 103 before which he is located; the camera 31 of the master device 3 captures an image of the point of interest 103 selected; the processing unit 3 is configured to receive the image of the camera 31 and process it in order to define the marker datum of the point of interest 103. In other words, the processing unit 306 defines the marker datum of the respective point of interest 102 by processing the recorded image and associates it with the respective point of interest 103.

For each point of interest 103, the operator repeats the operation several times to record several images in different light conditions; different height framing angles, e.g., from different heights; various side angles around the point of interest 103, for example obtained by rotating round the point of interest 103. The processing unit 36 of the master device 3 is configured to receive the plurality of images from the camera 31 and process them in order to define a respective plurality of marker data of the point of interest 103. In other words, the processing unit 306 defines a plurality of marker data of the respective point of interest 103 from the images recorded and associates them with the respective point of interest 103.

In an alternative embodiment of the present invention, the marker datum is determined by processing a plurality of images of the point of interest to be associated. In an alternative embodiment of the present invention, a plurality of marker data is determined by processing an image of the point of interest to be associated. In an embodiment, for each point of interest the operator commands the processing unit 36, by means of the user command, so as to define a number of marker data preferably from 1 to 15, in other words, the operator sends a user command to record an image of the point of interest 103 and to define the marker datum and preferably repeats the operation for each point of interest 103 in particular up to a number of times equal to 15. More precisely, the processing unit 21 is configured to define a marker datum from an image by means of feature extraction algorithms.

Furthermore, during the learning phase A, after storing a marker datum as described above, the master device 3 cyclically detects the images by means of the camera 31, obtains a marker code for each image detected and compares it with the marker data stored until that moment of the learning phase A. If one of the marker codes obtained is the same as a stored marker datum, the processing unit 36 sends an approval signal to the operator by means of a visual configuration element or an acoustic configuration element.

More precisely, the processing unit 36 is configured to obtain a marker code from an image by means of feature extraction algorithms, such as FAST. In particular, in an embodiment, the marker code is obtained by means of the same algorithm used to define the marker data. In an alternative embodiment, the algorithm used to define the marker data is different than the algorithm used to define the marker codes, in particular, the algorithm used to define the marker data is an algorithm that generates marker data with a first number of characteristics, whereas the algorithm used to define the marker code is an algorithm that generates marker data with a second number of characteristics less than the first number of characteristics.

In an embodiment, during the learning phase A, in addition to the definition of the marker data for the respective points of interest 103, position data are defined for the respective stopping places 102 of the route 101. More precisely, during the learning phase A, the master device 3 is moved along the route 101 from the first stopping place 102 to the last stopping place 102. The master device 3 for each stopping place 102 defines a position datum. More precisely, the master device 3 is configured to obtain a position datum for each stopping place 102 from at least one signal received from the geo-localization module 33. For this purpose, the operator follows the route 101 and for each stopping place 103: the operator selects the stopping place 103 in which he is located by means of the operator control 37; the master device 3 defines a position datum by means of the geo-localization module 33 and associates it with the specific stopping place 103. The geo-localization module 33 detects the position datum by means of a GPS detection system. In other words, for each stopping place 103, a position datum is detected and defined by means of a GPS detection system and is associated with said stopping place.

In an embodiment, during the learning phase A, the master device 3 is configured so as to obtain one or more or all of the position data from at least one signal received from the data connection module 34. In other words, some position data are obtained by means of the geo-localization module 33 and others by means of the data connection module 34. More precisely, the data connection module 34 detects one or more signals indicative of Wi-Fi signals and/or Bluetooth signals. The data connection module 34 defines one or more position data based on the Wi-Fi and/or Bluetooth signals detected in the respective stopping place 102. In one embodiment, all the position data are obtained by means of the data connection module 34. In an embodiment, the master device 3 is configured in order to associate a position datum with one or more or all of the points of interest 103 in combination or substitution with the respective marker data.

After the learning phase A or in parallel thereto, the configuration phase C of each smartglasses 4 is implemented. More precisely, the learning phase A is performed once for each site using the master device 3 and then the data learned by the learning phase A can be used for all of the user devices 4 used in said site during the configuration phase C of each smartglasses 4. The aim of the configuration phase C is to couple each scene 202 with one of the points of interest 103 and the relative marker datum or relative marker data defined in the learning phase A and to load the program schedule 100 with the associated points of interest 103 in the memory 47 of the smartglasses 4. For this purpose, the program schedule 101 is loaded into the memory 47 of the central unit and the scenes 202 are coupled with the respective points of interest 103. Consequently, the scenes 202 are coupled with the points of interest 103 and the relative marker datum or relative marker data.

In an embodiment, each scene 202 of each scenario 201 is coupled with the respective point of interest 103. In an embodiment, a point of interest 103 is coupled with two or more scenes 202 belonging to different scenarios 201. In other words, two scenes 202 belonging to different scenarios 201 can be coupled to the same point of interest 103. In an alternative embodiment, during the configuration phase C in the memory 20 of the central unit 2, the stopping points 102 of the program schedule 100 are coupled with the scenarios 201. Lastly, in the configuration phase C, the program schedule 100 used as above and coupled with the route 101 and with the points of interest 103 is loaded into the memory 47 of the smartglasses 4 usually from the memory 20 of the central unit 2. Furthermore, in the memory 20 of the central unit 2 a program schedule 100 is stored that is associated with the site.

Figure 1B:
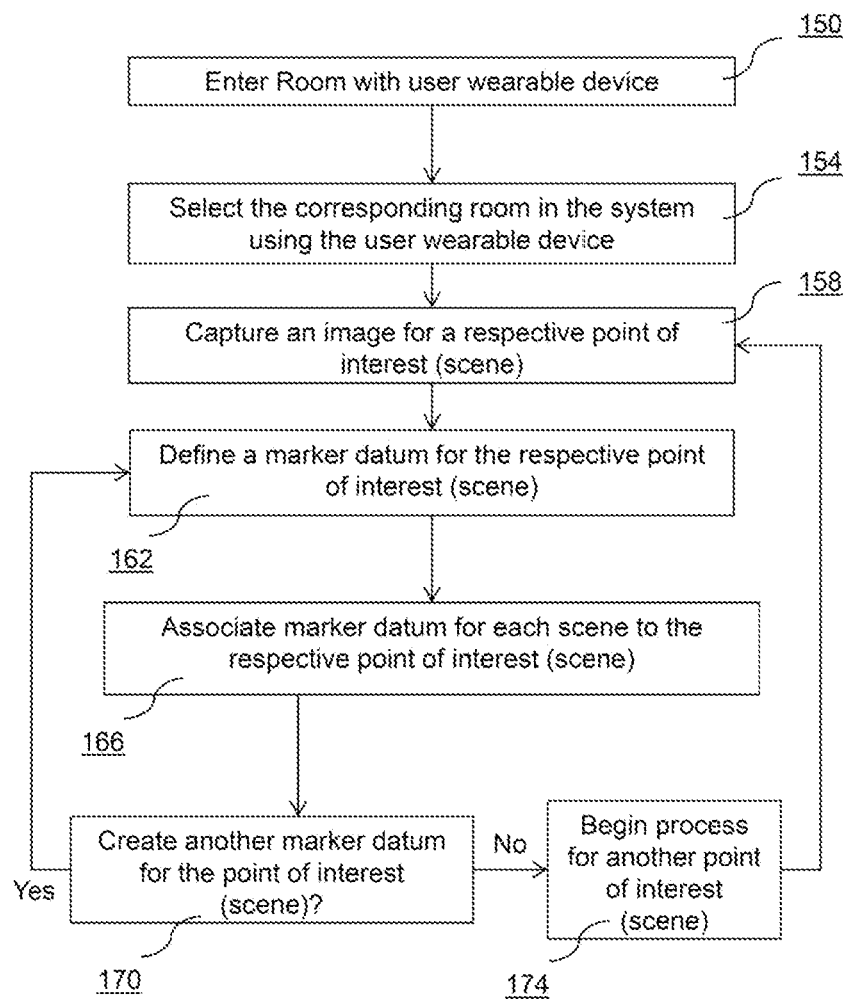
FIG. 1B is an exemplary process flow for creating datum markers.

FIG. 1B is an example of a process flow for creating markers that are used by the system as described herein. In FIG. 1B, the person creating markers for the learning phase enters 150 the room with a user wearable device 4. Once in the room, this person (referred to here as a programmer) selects 154 the corresponding room in the system using the user wearable device 4. The rooms are programmed into the user wearable device according to processes described elsewhere in this specification. Once the correct room has been selected, the programmer captures 158 an image for a respective point of interest (scene) 103 using the user wearable device 4 image recording capability. The programmer then defines 162 a marker datum for the respective point of interest (scene) 103. The programmer next associates 166 the marker datum for each scene to the respective point of interest (scene) 103. This marker datum may then be used within the system as described throughout this specification.

Once a marker datum for a point of interest (scene) 103 has been associated, the programmer can choose 170 whether or not to create another marker datum for that point of interest (scene) 103. If the programmer chooses to create another datum marker for that point of interest (scene) 103, the process begins again by defining 162 a marker datum for the respective point of interest (scene) 103. If the programmer chooses not to create another marker datum for that point of interest (scene) 103, the process starts for another point of interest (scene) 103, by recording 158 an image for the next respective point of interest (scene) 103. This process continues until all points of interest 103 in a given room have marker datum(s) associated with them. The programmer may then enter the next room, if there is another room, and begin the process depicted in FIG. 1B again.

In an embodiment, the utilization system 1 has stored in the memory 20 the chronological list of stopping places 102 that define the route 101. In the user utilization phase F, the smartglasses 4 is configured to cyclically record images by means of the camera 43 and to detect whether the camera 43 of the smartglasses 4 has framed a point of interest 103 and for a time longer than a specific threshold time. More precisely, the smartglasses 4 is configured to cyclically record images by means of the camera 43 and send the images to the processing unit 48 of the smartglasses 4. The processing unit 48 defines a marker code from each image and compares it with the marker data contained in the memory 35. If the marker code is the same as one of the marker data stored or if it has a certain degree of similarity defined by a similarity function, the processing unit 48 then detects the point of interest 103 coupled with the marker datum identified. For example, the certain degree of similarity for the comparison is greater than 50%, preferably 70%, in particular greater than 75%. In an embodiment, the processing unit 48 detects the point of interest 103 if a certain number of images detected sequentially amongst each other are associated with respective marker data all having a degree of similarity greater than a similarity threshold.

The visual markers that were recorded during the learning phase from various poses corresponding to images taken from different angles during the marker registration and identification process, are analysed against captured camera frame images. Analysis of the recorded visual markers may be performed using coding produced from open source algorithms (e.g., feature extraction algorithm). For example, during the tour, the camera frame is passed to the feature extraction algorithm (opencv) and then the features are compared with the ones stored during the learning phase (e.g., comparison is done using opencv).

Consider a value of n matching on a total of m features of the actual frame. Then, x=n/m(%) represents the score of that matching.

Consider a threshold value t that is predetermined. Each frame has its x value. Each x value is averaged with previous values coming from the previous frames (a= (x+a)/2 with x>t, otherwise a=0). In this example, a>t indicates that the target value is surpassed or a=t that it is reached.

This calculation has the following effect: the visitor has to see the target for a certain number of frames in order to have the match; otherwise the match is lost.

If the number of features exceeds the predetermined threshold described above, then the frame image is considered reliable and the corresponding features are recorded. This operation is performed from different camera angles and under different lighting conditions. The markers are generated with a process of accumulation and can be immediately verified by the operator. This means that during the learning phase, after a new shot, the device starts the tracking of the target, giving the operator the possibility to verify in real time if the learning done until that moment is robust enough. If not, he can continue the process adding more shots (views) to the marker set. The accumulation process can also be carried out at different times (e.g. different days or different times of the day). The markers will then be used during the tour by the positioning and tracking modules. In an embodiment, the certain number of images is greater than 15 images, preferably greater than 20, in particular greater than 25. In this way false positives are avoided.

In an embodiment, the processing unit 48 defines a marker code from each image and compares it with the marker data associated with the scenes not yet shown contained in the memory 35. If the marker code is the same as one of the marker data stored and associated with the scenes not yet shown or if it has a certain degree of similarity defined by a similarity function as described above, then the processing unit 48 detects the point of interest 103 coupled with the marker datum identified. The processing unit 48 is configured so as to select the scene 202 to be reproduced on the basis of the point of interest 103 detected, in particular the processing unit 48 selects the scene 202 associated with the point of interest 103 detected. More precisely, the processing unit 48 is configured to send to the display unit 41 and/or to the audio unit 42 the scene 202 selected. The display unit is configured so as to reproduce the visual element 203 of the scene 202 selected and/or the audio unit 42 is configured to reproduce the audio element 204 of the scene 202 selected. The processing unit 48 selects the visual element 203 and the audio element 204 to be shown on the basis of the point of interest 103 detected in particular on the basis of the marker datum selected.

In an embodiment, the processing unit 48 is configured so as to detect the user's movements in particular the head movements by means of the motion sensor 44 and is configured to command the display unit 41 so that it projects a portion of the visual element 203 on the basis of the head movement detected. In particular, the processing unit 48 is configured so as to select a portion of the visual element 203 associated with the point of interest 103 detected on the basis of the movement detected by the motion sensor 44 and to send to the display unit 41 the portion of the visual element 203 selected. The display unit 41 is configured so as to project the visual element sent to it. In this way, the user sees a visual element 203 that is anchored to the physical objects or anchored to a point on the physical object to which it relates even during head movement. Furthermore, when the visual element 203 is larger than the field of view of a user, the user sees the various portions of the complex visual element according to his head movements. Thanks to this embodiment, an entire visual element 203 having a greater extension than the field of view of a user can be reproduced in portions. As stated above, the display unit 41 is configured to project the visual elements 203 selected onto the lens 53 or onto the lenses 53 of the glasses 52.

Figure 1C:
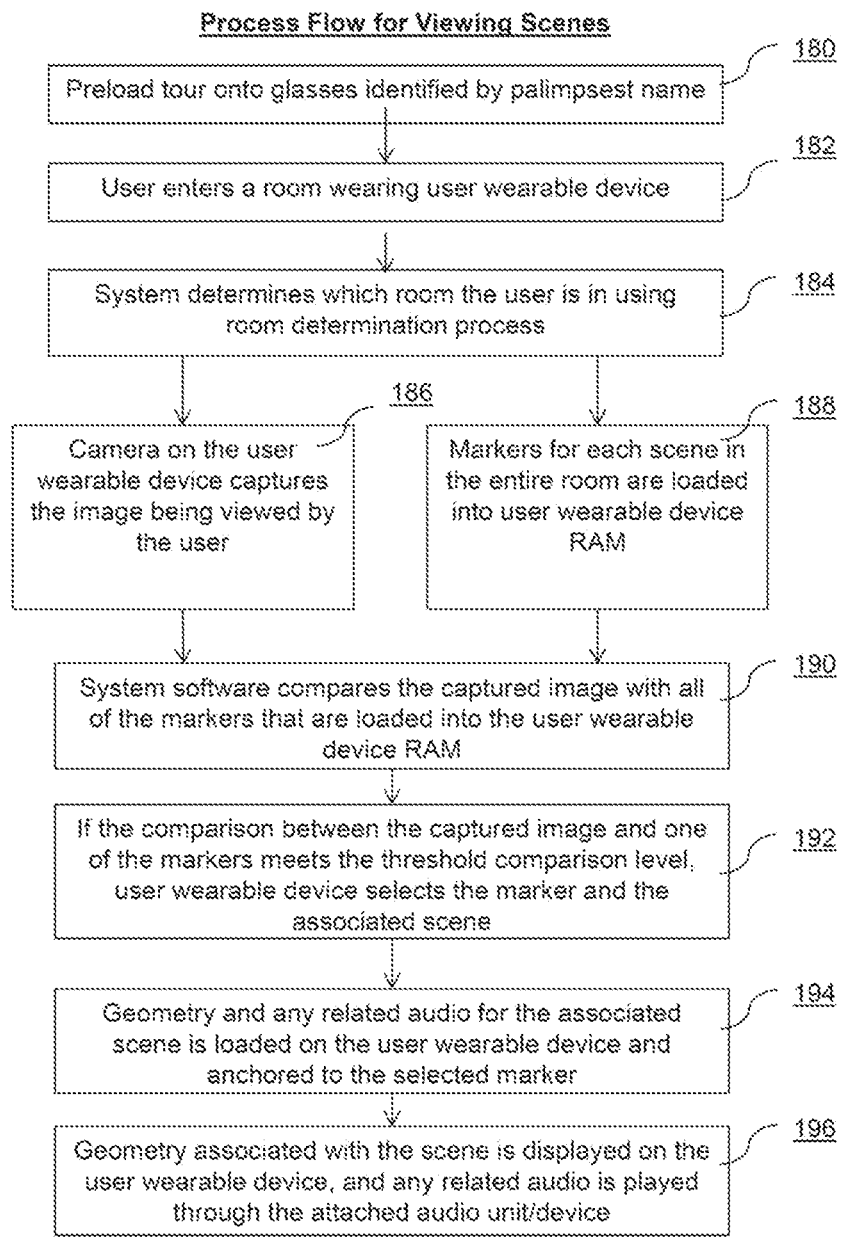
FIG. 1C is an exemplary process flow for viewing scenes.

FIG. 1C is an example of a process flow for viewing scenes. Said process begins by pre-loading 180 a tour onto the glasses 52, identified by palimpsest name. The user then enters 182 a room wearing the user wearable device 4. When the user enters 182 the room, the system determines 184 which room the user is in using the room determination process(es) described elsewhere in this specification. Once the system has determined 184 which room the user is in, two processes occur in parallel. One of these processes is that the camera on the user wearable device captures 186 the image being viewed by the user. The other process is that markers for each scene in the corresponding room are loaded 188 into the user wearable device 4 RAM 45. Next, the system software compares 190 the recorded image with all of the markers that are loaded 188 into the user wearable device 4 RAM. If the comparison between the recorded image and one of the markers meets the threshold comparison level (described elsewhere in this specification), the user wearable device 4 selects 192 the marker and the associated scene. Next, geometry and any related audio for the associated scene is loaded 194 on the user wearable device 4 and anchored to the selected marker. The geometry associated with the scene is then displayed 196 on the user wearable device 4, and any related audio is played through the attached audio unit/device 42.

In an embodiment, the processing unit 48 detects hand movements by means of the camera of the smartglasses 4 in order to receive commands. In an embodiment, the processing unit 48 comprises a microphone to receive voice commands. Furthermore, the smartglasses 4 is configured to show through the display unit 41 information in order to follow the route 101 and go to the next point of interest 103 to the one shown.

In an embodiment, the smartglasses 4 is configured to show the scenes 202 to the user following the chronological order of the scenes 202 within the route 101. More precisely, the smartglasses 4 is initialized by means of a command at the start of the visit, in this case the smartglasses is configured to show the first scene 202 of the chronological order of the program schedule 100 when the smartglasses 4 will frame the first point of interest 103 of the chronological list of the points of interest 103 that is coupled with the first scene 202. The smartglasses 4 is configured to show the scene 202 next to the scene 202 that has been shown on the basis of the chronological order of the scenes when the smartglasses 4 will frame the point of interest 202 associated with the scene 202 subsequent to the one that has been shown. In this embodiment, during the utilization phase F, the processing unit 48 receives the images from the camera 43, defines a marker code from each image and compares it, preferably exclusively, with the marker datum or marker data associated with the scene 202 subsequent to the scene that has been shown on the basis of the chronological order. If the marker code is the same as the marker datum or as one of the marker data associated with the scene subsequent to that which has been shown or has a certain degree of similarity defined by a similarity function as previously described for the other forms of embodiment, then the processing unit 48 detects the point of interest 103 coupled with the marker datum identified. In other words, in this embodiment, the smartglasses 4 is configured to show the scenes 202 of the program schedule 100 solely in the chronological order defined by the program schedule 100.

Furthermore, in this embodiment, the smartglasses 4 is configured to activate a user assistance function when the smartglasses 4 frames a scene 202 different from the subsequent scene 202 just shown. In other words, if, for example, after having shown the first scene 202, the smartglasses 4 frames the fourth scene 202 then the smartglasses 4 will activate a user help function. When the smartglasses 4 activates the user help function, it is configured to show a route to return to the subsequent (second) scene 202 not shown in the chronological order of the scenes 202. Furthermore, in an embodiment, the smartglasses 4 is configured to receive a command from the user by means of a button or by means of a voice command, and to show the scene 202 associated with the point of interest 103 framed by skipping the chronological order of the scenes 202.

Furthermore, the user-wearer device 4 is configured to activate the user help function every time a specific time passes between the end of the projection of a specific scene 202 and the framing of the point of interest 103 associated with the next scene 202. The smartglasses 4 is configured so that when the help function is activated it projects one or more items of information relating to continuing the route of the visit, to how to resume the route of the visit, to which part of the route of the visit the user is in so as to help him to resume the visit as soon as possible.

In another embodiment, the program schedule 101 is freely utilizable based only on the user's movements even if not in chronological order. In other words, the smartglasses 4 selects the scene 202 to be reproduced on the basis of the point of interest 103 detected.

In another embodiment, the smartglasses 4 detects a position parameter by means of the geo-localization module 45 and detects the stopping place 102 in which it is located within the site and the scenario 201 associated therewith. In this way, the smartglasses 4 is configured so as to select the scenario 201 to be shown to the user on the basis of the stopping place 102 detected. In this case, the smartglasses 4 is configured to select the scene 202 to be shown on the basis of the scenario 201 selected on the basis of the stopping place 102 detected, and on the basis of the point of interest 103 detected. In one embodiment, the smartglasses 4 detects one or more or all of the position parameters by means of the data connection module 49 and the geo-localization module 45. In an alternative embodiment, the smartglasses 4 detects one or more or all of the position parameters by means of the data connection module 49 as well as by means of the geo-localization module 45.

More precisely, in an embodiment, included within the embodiments in which the processing unit 48 detects the stopping place 102 and the scenario 201 associated therewith, the processing unit 48 receives the images from the camera 43, defines a marker code from each image and compares it, preferably exclusively, with the marker data associated with the scenes 202 of the scenario 201 identified. If the marker code is the same as one of the marker data associated with the scenes 202 of the scenario 201 identified or if it has a certain degree of similarity defined by a similarity function as described previously in the other embodiments, then the processing unit 48 detects the point of interest 103 coupled with the data marker identified.

In an embodiment, the smartglasses 4 is configured to determine which scene 202 to project on the basis of the point of interest 103 detected and on the basis of the scenario 201 selected. The scenario 201 is selected on the basis of the position code selected or chronologically on the basis of the scene previously projected.

Thanks to the present invention, a visitor to the site need simply wear the smartglasses 4, which comprises the glasses 52, that will guide him along the route to be followed within the site with audio and video instructions and will show him the points of interest 103, at the moment when the visitor will look at the points of interest 103, the wearable device 4 will project the visual element 203 or the visual elements 203 and the audio element 204 associated with the point of interest 103 and illustrative of the point of interest 103; on completing the illustration of said point of interest 103, the smartglasses 4 will guide him towards the next point of interest 103. In some embodiments, if the visitor skips points of interest 103, the wearable device will change the route to be followed.

Furthermore, the smartglasses 4 is configured to record user parameters associated with the visit, chosen from a group of parameters comprising parameters indicative of: visit duration, stoppage time for each stopping point, stoppage time for each point of interest, scenes not viewed, scenarios not viewed, and operating errors of the smartglasses 4. Furthermore, the smartglasses 4 is configured to send the user parameter to the central unit 2 after having shown the last scene to the user.

Contents Structure

In a cultural site, the media content can be structured in a hierarchy as shown in FIG. 3A and FIG. 3B. Referring to FIG. 3A, the Site represents the overall cultural site or exhibit. The Palimpsest represents a particular experience/presentation that has been set up for visitors to view/experience. Any number of Palimpsests may be established/created for a given Site. The Scenario represents a particular stop in a tour that forms part of the palimpsest. For example, a Palimpsest may be created that guides a visitor to experience a site in chronological order. A separate palimpsest may be created for the same site that guides a visitor on only a portion of the site (for example, a tour of a particular wing of a building, or a particular battle that occurred on a battlefield). The scenarios within each palimpsest provide the user of the user wearable devices information that is available for viewing/interaction at that stop/scenario. At any given scenario, there may be multiple scenes that have been programmed for viewing/interaction. For example, a given piece of art may be located at a scenario, where there is also a second piece of art. A scene could be created for each piece of artwork. Once the user wearable devices, utilizing the system software platform have identified the artwork being viewed at that particular Scenario, the scene is displayed to provide the user with the geometry and audio that correlates with that scene.

Everything starts from the brief creation phase. The brief is the document (based on a system template document) that contains the storytelling structured in palimpsests. The brief document describes all the tours and all the stops. The brief can be coded directly online using system software platform utilizing the repository system as described below. In one example, a system project (palimpsest) is structured in the following phases:

BRIEF CREATION PHASE→LEARNING PHASE→CONFIGURATION PHASE→DEPLOYMENT PHASE

Brief Creation Phase

Palimpsest identification: Palimpsests can be categorized into different thematic areas, here are some examples:

Language (ITALIAN, ENGLISH etc. . . . ): Language palimpsests are the basic ones, and they are fundamental in creating the experience. In this case the visit path and the rules are the same but the contents are different because of the different languages. In particular, at least the audio files and text are changed from one language to another. Sometimes, cultural differences must also be addressed, for example, attire.

Smart tours: this palimpsest can be created for cultural sites that need a shorter path for crowded days in order to let the number of visitors flow easily or for the visitors that do not have much time. Shorter path tours can be created by editing the main palimpsest and instructing the system to skip specific areas or portions of a tour.

Thematic tours: some cultural sites have made significant investments in digital material, they have wide collections and want to create a number of thematic tours for the same site that can be chosen by the end users. More tours can be created for expert users like curators, historians, restorers, etc. Thematic visits are typically realized starting at the beginning of a tour and are addressed by selecting a specific thematic tour. Special paths can be created also for specific subsets of visitors, such as divided by age, such as kids and adults, with a different kind of communication and contents. Consider that the system software platform allows special functions, such as COPY/PASTE applied to an entire stop or scene. This is a tremendous time saving for the creators. Some cultural sites have completed important restoration activities and want to show to expert users the restoration techniques or the original state of art. Such custom palimpsests can also be created utilizing the same techniques.

Other site-specific needs may be addressed by the system. Each palimpsest is divided into scenarios; each scenario is further divided into scenes (as depicted in FIG. 3A). During the Brief Creation Phase, scenarios are defined. A typical scenario definition contains the following essential information:

Marker identification: The marker is related to the point of interest and represents a real element used to identify the scene to render within. A marker is linked to a specific subject that is present in the environment. Example: a museum is organized in rooms, in one room there are four paintings, each painting can be coded as a point of interest and thus as marker. The concept of markers is flexible and can be applied to planar objects (painting, drawing, frescoes or any type of planar sources) but also to 3D object like columns, ruins, statues, architectural features etc. For each scenario, the project team should define the meaningful set of markers that will be coded during the learning phase.

Scenes identification: As part of the scenario, each scene is linked to a specific marker within the scenario. The scene contains: information about the audio to be played during the scene; the next scene to be loaded once the current scene finishes; geometries involved in the scene.

Geometries identification: Each scene is composed of several geometries that are rendered together (as a scene) when the specific marker is detected. A geometry has several attributes that define the geometry type (image, video, 3D model, panorama, landscape, etc.), position in the space, and the behavior (animations) of the geometry during the rendering of the scene.

Contents Creation Phase

Once the brief is completed, the project continues with content creation. The main content to develop are related to geometries:

2D images
3D models
Stereo (or mono) video renders
Stereo animations
audio and translations
messages
360 degree panoramas (video or static image)

Learning Phase

The scope of learning phase is to implement markers using the learning module and a brief document to locate a meaningful marker. The brief document contains the scenarios and scenes. For each scene the project leader, or delegates, uses the learning software installed on the devices to generate the marker corresponding to the specific scenes. The project leader, or delegates, can name the marker as they prefer, or in a standard configuration for a given site (for example giving the same name of the scene he wants to link the marker to). The learning software installed on the device has a guided procedure in order to let the project leader create markers step by step. At the end of the learning phase the project leader can upload the learning data. Those data will then be linked to the corresponding scenes during the configuration phase.

Configuration Phase

In this phase, the project team completes the creation of the user experience using the repository (REPO) system assuring that all the contents are uploaded. The tour is orchestrated and edited using the REPO system. The system will ultimately contain all the palimpsests and scenarios. Generally, each scenario contains multiple scenes, each scene is activated by a specific marker. After the learning phase, all the markers are uploaded to the system software platform and thus it is possible to associate play back of the scenes with their related markers. The effect is that, during the run time, when a marker is detected, the corresponding scenes will be activated rendering the relative geometries. A scene may also contain a main audio file that is played once the scene is activated by the marker. If a necessary element is missing in the stop or in the scene, the REPO system will alert the team/project leader. The REPO system may be used team/project leader or others to review all the scenes and stops in order to check if the structure of the tour is complete.

Deployment Phase

At this phase the configuration is completed and the project leader can publish the palimpsest. Publishing the palimpsest related to a site means that the palimpsest (or all palimpsests) of a specific site are available and ready to be downloaded to the user wearable device. All the user wearable devices are equipped with the updater module. This module checks if any update is published for a specific site and, if so, starts downloading contents updating the device automatically. At the deployment phase or stage, the device is ready to use.

The updater periodically connects the devices to the REPO system in order to upload device data, for example:
1. device log files, that can be analyzed by the back office personnel;
2. accounting data to track rental activities;
3. device detailed tracking data used to create analytics;

User tracking data are uploaded into a database for user behavior statistics for example:
1. what users are preferring to look at;
2. how long users stay in certain areas within the site;
3. what are users favorite topic(s) and path(s).

All data can be presented in graphs or statistical tables with analytics and are continuously updated by the uploader module installed on the devices.

A programmer interface system utilized to create the user experiences is also claimed. This interface system makes use of software and hardware to allow a user to create palimpsests utilized within the method herein described. In one embodiment, this interface system is built upon existing hardware and software platforms and customized. In one embodiment, the interface system is written in php as front-end and ajax as back end access to the database is in MySQL. The 3D editor portion is written in JavaScript using webgl features for 3D representation.

This programmer interface system enables the user, for example a programmer, to enter all necessary information, data, etc. for all of the modules herein described. This includes, but is not limited to, entering data and creating content for: Learning Machine; Central Repository; Updater; Plugin; sub Main; Orchestrator; Submodule Positioning; Submodule rendering engine; Sub manager of exceptions and the details of the visit; Submodule tracking engine; Submodule audio manager; Submodule Interaction; Submodule help; Submodule assistant (user wearable device); and assistant tablet.

Referring to FIG. 5, a Login Screen 500 is depicted where a programmer can access the editing software herein described. In an embodiment, such access may be provided through a website, which allows collaboration from participants around the globe. In such an embodiment, a website address bar 502 may be displayed at the top of the Login Screen 500. In another embodiment, the access may be provided through proprietary software that further accesses database and other stored files on a server. In FIG. 5, a company logo 504 may be displayed on a banner 506 to identify the system owner. In most embodiments, a username box 508 and password box 512 are also included in the banner 506. The programmer may enter their assigned username and password into the corresponding boxes 508, 512, and then select the "Login" button 516 to gain access to the system.

Once a programmer has logged in (for example, as described above), in many embodiments, the programmer's screen displays the Home Screen 600 depicted in FIG. 6. The Home Screen 600 contains a "Your sites" box 604 that identifies the programmer's available palimpsests. In some embodiments, a pull-down menu may be available that lists all palimpsests available for the user to work with. In an embodiment, this list will also contain an option to "create a new palimpsest," that, when selected, creates a new palimpsest within the database for the user to select. Such a palimpsest may be named in accordance with any naming convention that a system administrator sets up within the database. Also located on this main site page in an embodiment, is a tab or button that the user can select to publish the selected palimpsest to the platform hardware (for example, to the user wearable devices or assistant tablet). In FIG. 6, one palimpsest is displayed as being available to the logged-in programmer; "TEST_AGUSA" 608, which represents the name of an available palimpsest. Other palimpsest names may also be displayed.

Additionally, in FIG. 6, in some embodiments, an option for the programmer to edit information 612 such as user password, may be available. As shown in FIG. 6, this option appears as a box to enter a new password 616, a box to confirm the new password 620, and a button to apply the new password 624 to the programmer's account. When such password is updated, the information is changed within the storage database. In some embodiments, sites are associated with specific passwords and access is restricted to data for individual sites.

FIG. 7 depicts a main site page 700 which is a user interface screen. In an embodiment, on the main site page 700, a "View Files" tab 704 is displayed. When the "View Files" tab 704 is selected, the screen displays all files utilized for the selected palimpsest. This graphic user interface allows a user to move or change items in the palimpsest with a click of the mouse. In an embodiment, on the main site page, a "Duplicate" tab 708 is displayed. When the "Duplicate" tab 708 is selected, the user may make a duplicate of the palimpsest that may then be modified. For example, a user may want to offer the same palimpsest in a different language. By selecting the "Duplicate" tab, the user creates the duplicate palimpsest with all of the same content, and then is capable of changing any files that incorporate written or spoken language with the appropriate files corresponding to the other language. A palimpsest may be duplicated for any number of other reasons including variations of user tours.

In an embodiment, on the main site page, a "Load Mode" tab 712 is displayed. When the "Load Mode" tab 712 is selected, the system uploads all selected files to platform hardware through Bluetooth or any other wireless or wired method. Data may be uploaded and maintained in the cloud.

In an embodiment, on the main site page, a "Delete" tab 716 is displayed. When the "Delete" tab 716 is selected, the system deletes the selected palimpsest. In an embodiment, when this tab is selected, a popup warning appears asking the user if they truly want to delete the selected palimpsest. A user would have to select this secondary tab in order to delete the palimpsest. Such a feature ensures that palimpsests cannot accidently be deleted.

In an embodiment, on the main site page, a "Graph" tab 720 is displayed. When the "Graph" tab 720 is selected, the system displays user data and metrics for the programmer to visually inspect. Such data may be useful for monitoring analysis of user behavior or any other inferences that such data may provide.

In an embodiment, on the main site page, an "Upload" tab 724 is displayed. When the "Upload" tab 724 is selected, files that have been created for the selected palimpsest are uploaded to the server. In an embodiment, on the main site page, an "Unload" tab 728 is displayed. When the "Unload" tab 728 is selected, the system performs the opposite function of the "Upload" tab 724; namely that specific files are deleted from the selected palimpsest.

In some embodiments, as shown in FIG. 7, the palimpsest name 732 may be displayed so the programmer knows which palimpsest they are working on. In an embodiment, on the main site page, an "Add" tab 736 is displayed. When the "Add" tab 736 is selected, the system adds an additional stop in the palimpsest. Stops represent physical locations that a user of the platform will stop at to view a piece of art, etc. In FIG. 7, three stops are shown in the selected palimpsest. A "Start" position 740, a "First Stop" 744, and a "Second Stop" 748. In an embodiment, on the main site page, a "Publish" tab 752 is displayed. When the "Publish" tab 752 is selected, the system publishes the selected palimpsest to the platform software for use by the platform hardware.

When a programmer selects the "Duplicate" tab 708, the screen depicted in FIG. 8 is displayed. This "Add Palimpsest Screen" 800 allows the programmer to enter the new palimpsest name in the appropriate box 804. Once the programmer enters the new palimpsest name in the appropriate box 804, the programmer may select the "Apply" button 808, and the system will enter the new palimpsest name into the database and make the palimpsest available for editing. Alternatively, the programmer may select the "Cancel" button 812 to cancel the creation of a new palimpsest and return to the previous screen.

FIG. 9 shows an exemplary "Publish Palimpsest Screen" 1900. This screen depicts all of the scenarios included in the selected palimpsest, and when the programmer selects the "Publish" tab 904, the system provides the programmer with a confirmation pop-up box 908 that the data has been published. In some embodiments, this confirmation pop-up box 908 provides the programmer with an option to preview the contents (by selecting "OK" 912 or "Cancel" 916).

When a programmer selects the "View Files" tab 704, a screen such as that shown in FIG. 10 is displayed. The "View Files from Selected Palimpsest Screen" 1000 contains a list of files 1004 that are associated with the selected palimpsest.

As depicted in FIG. 11, when a programmer selects a site 1104 within a palimpsest, and then selects the "Upload" tab 1108, a dialog box 1112 may open that allows the programmer to select files (assets) to attach to a particular site. In FIG. 11, the selected site 1104 is labeled "Instructions." Any of the displayed sites may be selected, and assets attached in this manner.

As depicted in FIG. 12, when a programmer selects a site 1204 within a palimpsest, and then selects the "Delete" tab 1208, a dialog box 1212 may open that allows the programmer to select files (assets) to delete from a particular site. Any of the displayed sites may be selected, and assets deleted in this manner.

As shown in FIG. 13, in an embodiment, a programmer may, by "right-clicking" on the display screen, produce a Scenario Comments dialogue box 1308. Such a comment box allows a programmer to leave messages for others who may also work on the scenario. Once the Scenario Comments dialogue box 1308 is displayed, the programmer may simply type comments into the available field and save said comments.

FIG. 14 is an example of an "Add a New Scenario Screen" 1400. This screen allows a programmer to add properties for a scenario, including name, location and other properties as described below (See FIG. 16).

As shown in FIG. 15, once a programmer has added a new scenario, a screen 1500 depicting the newly added scenario 1504 may be displayed to the programmer. In the example shown in FIG. 15, the newly added scenario 1504 is labeled "Test."

Referring now to FIG. 16, a scenario property screen 1600 is shown that allows the programmer to view and edit data for the selected "Test" scenario 1604. In some embodiments, the selected scenario 1604 (In FIG. 16, this is the "Test" scenario) may be highlighted, or the edge of the title box may be highlighted in a different color from the rest of the box in order to show that the scenario has been selected for editing. In most embodiments, the scenario properties are displayed on the right side of the screen and contain information such as, but not limited to, Name 1606, Latitude1608, Longitude 1612, Configuration 1616, 3D visualization Mode 1620, Skippable 1624, Dark mode 1628, Azimuth 1632, Timeout 1636, Introduction message 1640, Preview image 1644, Help Message 1648, and Field of view 1652. Name 1606 is the name of the selected scenario, which may be edited by the programmer. Latitude 1608 and Longitude 1612 represent the corresponding geographic coordinates of the scenario on the earth. Configuration 1616 represents the markers for the selected scenario. Markers come from a "shooting application" on user wearable devices used during the Learning Module referenced herein. There are two presets for the configuration, namely "ORIENTATION" and "DUMMY ORIENTATION." These presets are used to automatically start the video without a true marker being necessary. "DUMMY ORIENTATION" allows for text to be displayed on the screen, whereas with "ORIENTATION," no text is available on the screen. As depicted in FIG. 16, the Configuration is set to "ORIENTATION" 1660.

The "Skippable" field 1624 in FIG. 16 allows the programmer to select either "True" or "False." If "True" is selected, a visitor can skip the selected scenario or can stop using the platform controller for the selected scenario. In this manner, a user can skip a scenario and move ahead. As depicted in FIG. 16, the "Skippable" field 1624 is set to "True" 1664. The "Dark mode" field 1628 in FIG. 16 allows the programmer to select either "True" or "False." When the user wearable devices are in dark mode no images are displayed to the user and the user wearable device are clear for viewing. If "False" is selected, the platform user wearable devices are on but not projecting the default black screen that such user wearable devices typically display. This is simply a display option that the programmer can set for a selected scenario. As depicted in FIG. 16, the "Dark mode" field 1628 is set to "False" 1668.

The "Timeout" field 1636 in FIG. 16 allows the programmer to set the amount of time an introduction message and/or help message will be displayed on the platform user wearable device. For example, if timeout=10, the introduction message will play for 5 seconds, and if the marker for the selected scenario 1604 is not seen during that time, then the help message will appear for 5 seconds. After those combined 10 seconds, the tour will start automatically. The "Preview image" field 1644 in FIG. 16 allows the programmer to set an image that the user of the platform user wearable device will see during a help message or introduction message that will assist the user in locating the marker that will subsequently start the selected scenario 1604. Such an image is intended to assist the user in locating the correct piece of art, etc. that they need to aim the platform user wearable device at in order to start the scenario.

FIG. 17 shows an exemplary embodiment that allows a programmer to add a scene to a selected scenario 1704. In an embodiment, when a programmer "right-clicks" on a selected scenario 1704, a menu 1708 pops up that allows the user to choose options for editing. In the menu depicted in FIG. 17, these options are; "Add New Scenario," "Edit Scenario Contents," "Delete This Scenario," "Duplicate This Scenario," "Add A Scene," and "Set As First Scenario." Each stop along a palimpsest is a Scenario, and each Scenario may have multiple Scenes which correspond to different things happening at the Scenario. For example, at a Scenario, a first scene may include a video about the object the user is looking at, and a second scene may be a picture of something associated with the object the user is looking at (such as a picture of the artist, etc.). By selecting "Add A Scene" from the menu 1708, the programmer can add scene information and files to the selected scenario 1704.

As shown in FIG. 18, once the programmer selects "Add A Scene" as previously described, a "New Scene Screen" 1800 is displayed. This allows a programmer to add data to a scene for example, a scene name, scene caption, audio, stop properties, and next properties.

As depicted in FIG. 19, once the programmer has added a scene and given the scene a name, the Scenario Property Screen 1900 displays the scene names 1904 that are associated with a selected scenario 1908. In an embodiment, when a scene is bound to a marker, the scene name 1904 will change to match said marker.

Referring to FIG. 20, in an embodiment, in order to edit scene properties, the programmer selects the scene name 1904 that he wants to edit. FIG. 20 is an example of a "Scene Property Screen" 2000 that is displayed for the programmer once the scene name is selected. In FIG. 20, the selected scene name appears highlighted 2004 at the top of the property field on the right of the display screen. The name of the associated marker 2008 appears below the scene name 2004. In most embodiments, the name of the associated marker 2008 and the scene name 2004 will be identical, as the system will change the scene name 2004 to match the marker name 2008. In order to add visual content, the programmer will select the "Edit Selected Scene" button 2012. The programmer may also delete the selected scene by selecting the "Delete Selected Scene" button 2016. Additionally, a programmer may add a scene caption 2020, which will display as text on the screen, identifying that scene for the programmer. Audio files may be attached to the scene by selecting the "Audio" button 2024; this will produce a dialogue box that allows the programmer to select the appropriate audio file(s) from memory or storage. In some embodiments, still photos associated with a scene must also have audio attached to the scene in order to provide an end-point for the scene. Without an audio file, the scene will not have an end-point in time. In other embodiments, text or other methods may be used to signify the end of a scene. The programmer may select the next stop 2028, which identifies what Scenario follows the selected scene. The "Stop" field 2032 identifies whether the tour is completed (at which point the platform user wearable devices will turn off) or if the tour continues (the platform user wearable devices will remain on). Once the programmer has made edit(s) to the selected scene 2004, he can select the "Apply changes" button 2036 to save the changes in the database.

When editing a scene, the programmer may utilize a "Scene Editor Screen" 2100, such as that depicted in FIG. 21. Such a "Scene Editor Screen" 2100 provides the programmer with a user interface or a user interface screen that allows the programmer to fully edit every aspect of the scene, including, but not limited to, placement of the scene in relation to the associated marker as described herein. Numerous editing features are available to the programmer in the "Scene Editor Screen" 2100, including, but not limited to: translate 2104, rotate 2108, scale 2112, add 2116, delete 2120, play/pause 2124, zoom in/out 2128. Additionally, the programmer may choose to show a grid 2132 by selecting the "show grid" box 2136. The programmer may apply changes to the scene by selecting the "Apply" button 2140 and may exit the scene editor by selecting the "Exit" button 2144.

The translate tab 2104 allows the programmer to change the position of an object within the scene by translating the object. The rotate tab 2108 allows the programmer to change the position of an object within the scene by rotating the object. The scale tab 2112 allows the programmer to change the size of an object within the scene. The add tab 2116 allows the programmer to add an asset (or file) to the scene. The delete tab 2120 allows the programmer to delete an asset (or file) from the scene. The play/pause tab 2124 allows the programmer to play audio and/or video that is attached to the scene to see what the user of the platform hardware will see (i.e. what the user will see through the user wearable devices). The zoom in/out tab 2128 allows the user to zoom in or out within the grid to better see the placement of any assets within the grid.

The properties shown in FIG. 21 on the right side of the Scene Editor Screen 2100 allow the programmer to see detailed information regarding the object within the scene. This includes the position, rotation, scale, source (which may be displayed as the name of the asset), type (asset type;

i.e. photo, video, panoramic, etc.), reply, stay, action, alpha, animation, and a geometries list.

The REPO system provides a number of powerful tools to unleash the creative abilities of the author. The system is easy to use and intuitive. It provides tools to duplicate palimpsest or portions thereof including scenes and audio. A palimpsest may be renamed and edited. In this manner, palimpsests are easily changed, varied and adapted for various purposes including for example for different languages and cultures. Also, full adult length palimpsests may be adapted for children. A number of variations of the REPO system are possible which will allow authors to easily create palimpsests from existing content stored in memory or new content. Various combinations of stored files can be organized and storyboarded for new and exciting tours.

The following definitions are used for the embodiments described below but may not apply to other system embodiments.

Stop: is a physical area that is relevant for the storytelling and corresponds to a specific stop of the tour.

Point Of Interest (POI): within a Stop there could be several points of interest belonging to the same physical objects, architectural details or any shape that can be recognized by analyzing a frame of a camera image. POI is associated to a corresponding scene of the stop.

Angle (A): the POI can be approached from different angles because the visitor can arrive from different directions. For an angle A, a specific marker M is associated with that angle A to cover the situation in which the angle of the visitor's approach is A. Also, different lighting or other environmental differences can be handled with a different A from the same position but with different light conditions. A different Marker (M) may be generated to cover each of the relevant A, as determined by an personnel or the system.

Marker (M): is made of a name, a set of points and a set of points descriptors. It is generated from a camera image taken from a specific angle. Usually, from a specific angle with particular lighting and environmental conditions.

Trigger (T): is made of different Markers taken from different angles and is associated with a POI.

Trigger Set (TS): is made of different triggers associated to the different POI present in a single Stop.

Geometry (G), is a digital content that can be displayed within a scene S.

Scene (S), is the set of geometries G that are displayed associated to a trigger T related to a POI.

Pose (P), is transformation that describes the user position and orientation with respect to the Marker.

Figure 22:
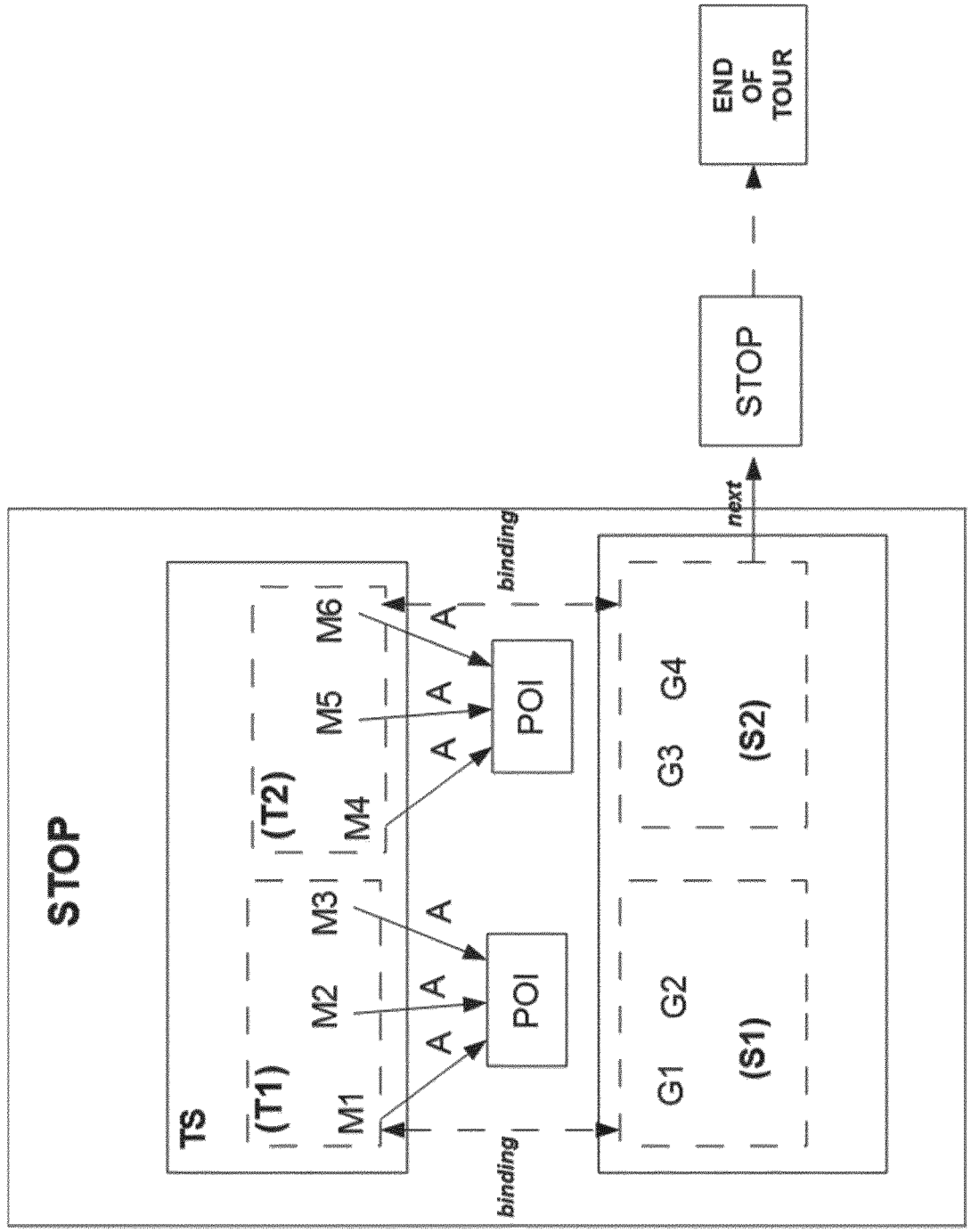
FIG. 22 shows a schematic representation of the data related to a stop position.

Referring generally to FIG. 22, a configuration of a Stop is shown. The exemplary Stop configuration shows two sets of triggers (T1 and T2) in a trigger set (TS), many more may be present. Various Markers M for Angles are shown corresponding to a POI. Also, Scenes (S1 and S2) with corresponding geometries (G1 through G4) are shown within a single Stop. In one embodiment, the learning phase consists of the generation of M, T and TS associated with the Stops. The process of generation is:
 a. The museum personnel, or other delegates, uses the shooting app and approaches a POI of the Stop.
 b. Once there, the personnel inserts into the shooting app the following data: Site name, Name of the TS, Name of the T.
 c. Personnel then chooses an angle of view and, using the buttons on the unit, takes a picture. The picture is immediately analyzed and the Marker is generated in real time and the tracking starts immediately testing the Marker.
 d. In this way, the personnel can immediately verify the Marker and how the triggering works form the specific angle and moving around the angle.
 e. The personnel can decide to consider a new angle and generate a new marker and so on.
 f. All those markers are associated with the same T until the personnel decide to save the T;
 g. and then move to the next POI and start a new process to generate the new T.
 h. Repeat the procedure for all the POI and all the AOI's desired.

Optical Flow for Extended Tracking of a User in View of a Marked Object

Figure 23:
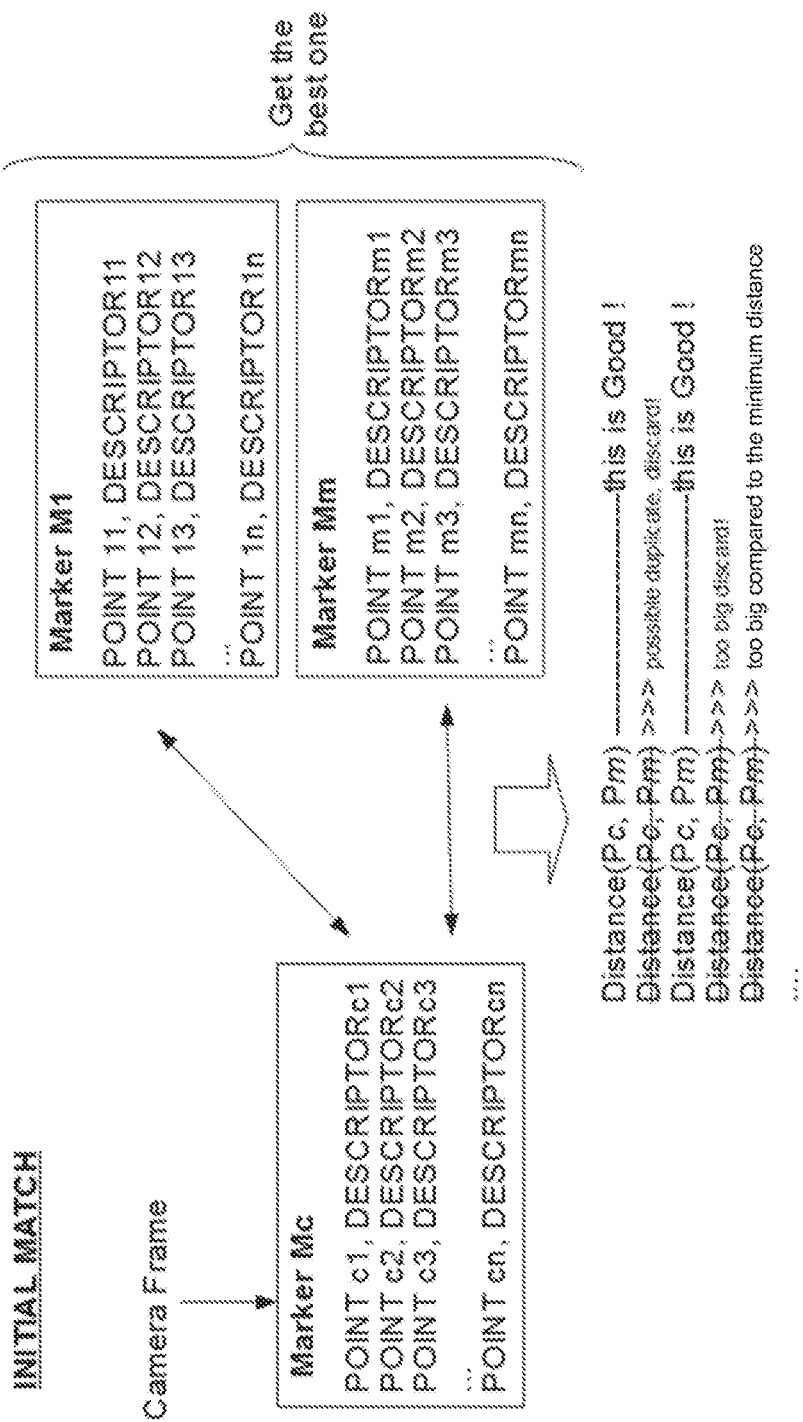
FIG. 23 shows is a diagram of Marker data and relation of Pc to Pm.
Figure 24:
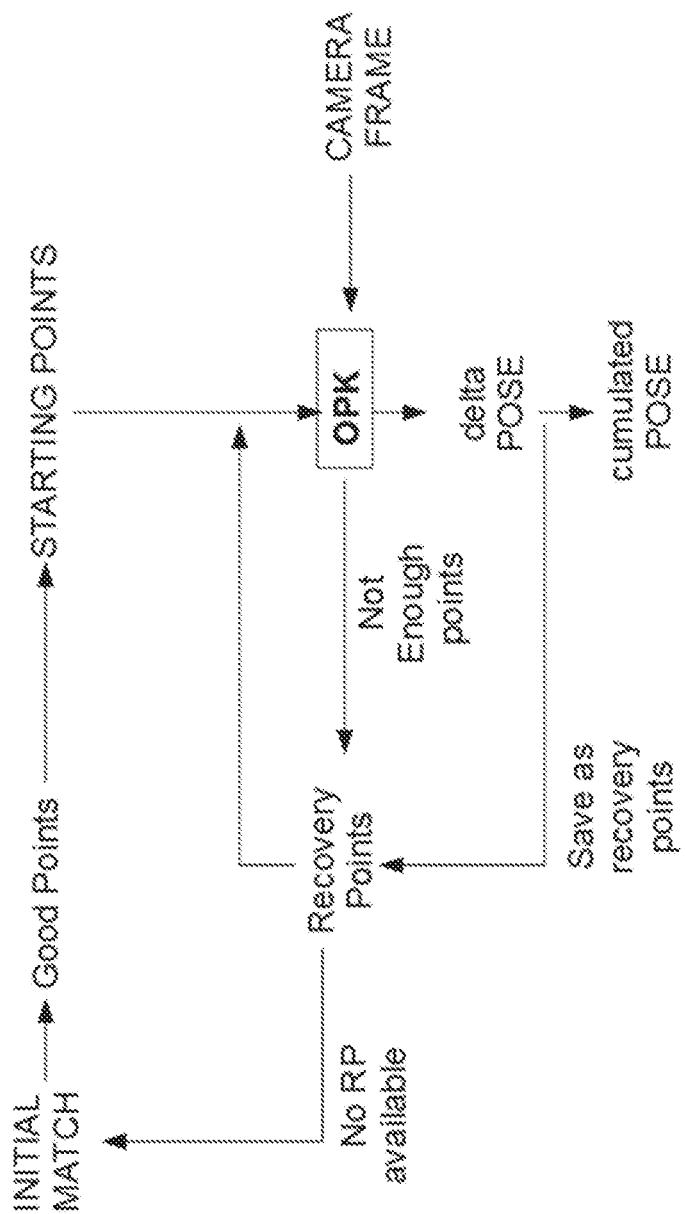
FIG. 24 is diagram of the process for an embodiment using optical flow tracking.

Referring generally to FIGS. 23 and 24, optical flow theory may be used within the utilization system 1 to provide continued tracking of the smartglasses about a single target. For example, in one embodiment, optical flow theory is used to provide continued tracking of a marker (once the marker is matched the first time), by selecting specific points within a camera image and then following those points in the subsequent frames instead of continuing to match the original marker. This method provides additional tracking of a selected marker and allows users, that are walking around but still viewing the marker, to continue to see the corresponding geometries (media content) projected on the art object. This extended tracking of a user with glasses allows the system to confirm a user is still in view of a detected art object even though the user is walking around, perhaps circling the object. For example, once the user is determined to be in front of or viewing a particular art object, after the marker is initially detected, optical flow theory is used to provide tracking (extended tracking) to determine whether the user is still located near or in sight of the art object. More particularly, once the visual markers (or fingerprints) are found to be above a threshold level and an art object is detected as being viewed by the user (matched), then optical flow theory is used to select specific points within the current camera image and then those selected points are compared with points in the next image frame to determine whether the user has looked away from the located art object or is still viewing the art object (for example, at different angle). By comparing images using optical flow theory, pixels or points in an image are tracked frame to frame and the system can determine whether the user is still in view of a particular art object or has moved/looked away. By comparing certain pixels or points from past viewed images of the detected object with pixels or points of a current viewed image, the system can look for a match and determine whether the viewer has looked away or is still looking at the detected object. In some embodiments, the points from the initial frame that will be compared to the next frame are some or all of the original marker data points found in the initial image. The optical flow methodology increases system efficiency and allows for extended tracking of a viewer beyond viewing positions identified during the learning phase.

A primary difference between the first tracking system and the various optical flow tracking methodologies is that there is no need to compare the camera image with the original markers during each camera frame. There is also no need for using the more complex matching algorithms and threshold determinations of the first tracking system. The tracking software compares the original marker as before, but, once the marker is detected, the extended tracking software starts selecting magic points within the image and then comparing those points instead of the original markers.

In this way the extended tracking software is only looking for the delta change between two images.

The extended tracking achieves better tracking results than the first tracking system because it is only comparing a previous frame to current frame instead of an original marker to current frame. If the user is on the other side of a target object, the difference in the original marker versus current view could be great, while the incremental differences frame to frame from walking around the object will likely be small. One example of extended tracking consists of:

1. When finished with the current Stop, the Plugin module asks the visitor to proceed to the next Stop.
2. the Plugin module loads the next Stop and the associated TS and waits until the visitor approaches a POI and the corresponding T is generated.
3. The triggering consists of the Match of camera frame and TS as described before.
4. When the match happens, the name of the trigger is returned to the software with the initial visitor's pose P and a set of Good Points. Then the corresponding scene S is rendered with the initial pose P.
5. The Good Points of the Match are used as starting points of an optical flow analysis (this optical flow analysis may conducted with commercially available software (e.g., open source algorithm like OpenCV). However, in this embodiment the system is programmed to track using the Good Points coming from the previous match.
6. An optical flow algorithm analyzes the camera frames in sequence finding the initial set of points (our Good Points) and calculating how they move within the sequence of camera frames.
7. For each camera interaction, the tracking engine calculates the delta Pose (DP) between the last 2 frames. The general expectation is that this delta is relatively small since the points should not move too much within 2 frames taken within a short time sequence.
8. This DP is then cumulated with the initial pose P generating a cumulated P creating the new position and orientation of the visitor.
9. Some points are lost during the transition from one frame to another.
10. While the number of points is over a certain threshold the tracking continues for each camera interaction generating the DP and the cumulated P.
11. The advantage of optical flow is that it is fast and effective because the systems considers the frames as sequential and the Match analysis happens only for the continued areas and only for few points (the good points are only a selected subset of the original points of the initial Match).
12. In another embodiment, the starting points for Optical Flow are determined using a dedicated algorithm identifying new points to track (in openCV for example goodFeatureToTrack may be used) rather than Good Points. Good Points provide the following advantages:
    a. The matching algorithms used (e.g., ORB), are much more effective in returning enough Good Points and consequently we can calculate a more reliable initial pose P than the other dedicated algorithms (cited before e.g., goodFeatureToTrack).
    b. The DP in the Optical Flow are calculated using the original Good Points instead of detecting new points with other dedicated algorithm (e.g., goodFeaturesToTrack). This provides a more accurate cumulation process instead of using 2 different sources of points one for the initial phase match and one for optical flow phase.
    c. Use of the Good Points also avoids the problem that the initial phase match is completed successfully (e.g., with ORB) but the subsequent phase (e.g., with goodFeaturesToTrack) does not return enough points and so the system is not able to start the Optical Flow. The algorithm for locating Good Points are in fact is more efficient in finding useful points and provide a greater likelihood of tracking.

Referring to FIG. 23, in another embodiment, the following steps are used for extended tracking. An initial match is found. The Initial Match, is the best result of the comparison of the camera frame and the Markers M in the Tracking Set TS. The match process is:
   a) analyze the camera frame extracting the marker Mc,
   b) compare Mc with each M registered in the TS. The result of comparison is a list of 2 elements (point Pc in Mc, corresponding to point P in M)
   c) for each comparison retain only the Good Points and discard the Points that could be a false positive:
      Pc and P have a distance that is higher than a threshold
      Same point Pc is reported multiple times for different matches
      The distance Pc-P is high relative to other distances for the other points
   d) verify if number of good matches is greater than a threshold;
   e) get the best result in terms of number of good points; and
   f) calculate the initial pose P.

Referring now to FIG. 24, a trigger set associated with a Stop are used to make an initial match and then next matches are located. Next Matches occur after the initial match. After the initial match, the system will generally have acquired a set of good points to start the second phase of the tracking, the extended tracking. The good points are used from the initial match for the optical flow (OPK) analysis:
   a. Set the good points as starting point (SP) of the analysis.
   b. Get the next camera frame and look for the SP using an OPK algorithm (e.g., openCV).
   c. Consider the result R of OPK as a list of correspondences (Original Points, Current Points),
   d. suppose the number of elements in the list> threshold (otherwise try the recovery procedure as defined in the step j and continue).
   e. Calculate the delta Pose using the elements in the result.
   f. Cumulate the delta pose into the pose P.
   g. Set SP=Current Points and repeat the comparing.
   h. Set Recovery Points (RP)=SP.
   i. Continue the OPK with the next available camera frame.
   j. Recovery Procedure is a restart of the OPK using SP=RP (if RP are available)

Below an embodiment using the system described for a guided tour is described. The following definitions are used in this embodiment:

Guided Tour (GT), is a tour with a tour leader that can decide the sequence of the stops based on the specific touristic needs, like weather conditions, duration of the tour, avoid particular crowded areas, etc. Within the system platform, the guided tour has the same structure as a traditional tour with the difference that a stop can be binded to a regular TS or to a BS.

Unit (U), is the smartglasses that is worn by a visitor during the guided tour and receives the command C from the TAB.

Tablet (TAB), is the master units that is equipped the application A and can transmit the command C to the U.

Application (A). This is an application installed on the tablet TAB, the applications is able to analyze the tour GT and select one of the options available for the specific stops based on the associated BS.

Beacon Set (BS). This special trigger set contains a list of virtual beacon identifiers instead of visual triggers. The virtual beacon identifier is a code structured. In one embodiment the code is structured as a traditional beacon:
    <beacon header><manufacturer data><UUID><major><minor><power>
    <beacon header> set to a fixed value
    <manufactured data> set to a fixed value
    <UUID> set to a fixed value
    <major> set to a numeric value indicating the TAB id (unique within AG platform)
    <minor> set to a numeric value indicating the next stop id (unique within AG platform)
    <power> set to the max value.

Command (C), is the specific command transmitted by TAB using, for example, bluetooth LE Advertising service available on android modern tablets and that simulates the beacons transmission. The guide can select the specific C using the list of virtual beacons available in the BS associated to the Stop.

Figure 25:
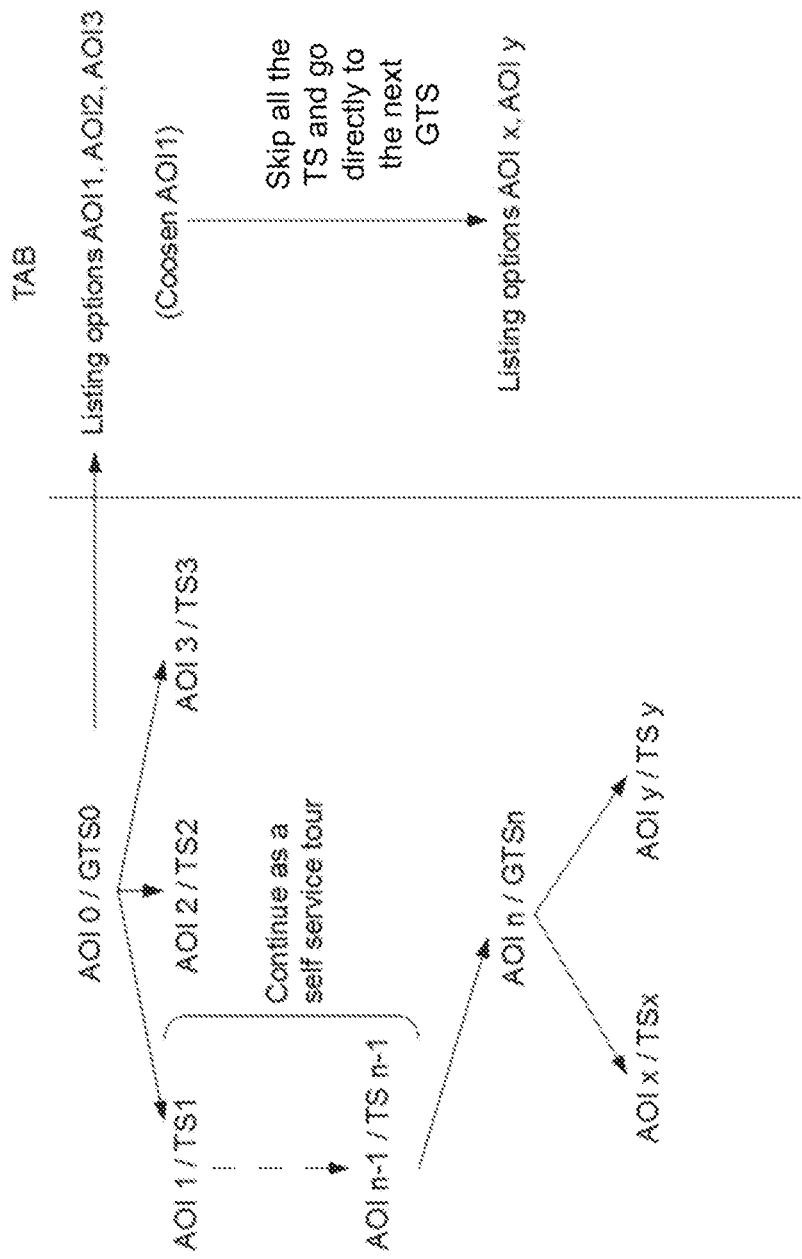
FIG. 25 is a schematic showing the flow of an embodiment of the system for use with a mixed guided tour and self-service tour.

Referring to FIG. 25, the Group Tour (GT) function allows touristic guides to do the traditional groups guided tour with the advantage of using AR to better explain to the group specific details of a Stop. The following is detailed method or process for a Guided Tour using the system. Both self-service tours and guided tours may be conducted with the system. Angles of interest (AOI) and Guided Tour Stops (GTS) are used in the guided tour method below:

At the GTS design time, for each stop of the tour the possible options for that stop are defined. For example, if the tour begins at the east entrance of the archaeological park then tour guide can choose only the paths related to this entrance and not all the possible path. The possible options are defined in the BS associated with the stop.

Before the tour starts, the guide chooses a tablet TAB and collects the number of units (U) needed.

For each U, the tour guide selects the language, the tour and a set TAB ids. This way all the U will only accept the command C from the tablet TAB allowing multiple tours at the same time in the same area.

At a specific Stop, the TAB will show the list of the available options in the BS and the guide can press the corresponding item of the list stating transmission of the command C. The guide can then ask the group to push the central button on the U to restart the unit from the pause. (generally, in the guided tour, at the end of each stop the U will go in pause mode to save energy until the next stop).

The U wakes up and loads the next stop with the corresponding BS and starts listening for one of the beacons in the BS.

The U will receive then the command C from TAB related to the selected beacon.

The U will then trigger the corresponding scene.

After the guide has selected the option, the TAB follows the specific branch of the tour looking for the next BS option and marking the current STOP as already executed.

The guided tour is a mix of traditional tour and guided tour and within the same tour are present beacon sets (BS) and Trigger sets (TS).

In this manner, part of the tour can be self-service and part guided.

Typically, the guide will make an introduction of the Stop and then ask the group to go in a specific position and use the TAB to start the self-service part of the Stop. At the end of the Stop the U ask the visitor to return the viewer's attention to the guide to continue the tour.

There are a number of novel and non-obvious aspects of the system software platform and of the associated technology. This disclosure is not intended to be limiting and variations beyond what is disclosed are intended. The present invention covers embodiments not described in the detailed description and equivalent embodiments that fall within the scope of protection of the accompanying claims.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for using smartglasses to view augmented reality content located in multiple rooms or multiple geographic locations in a site, wherein the multiple rooms or the multiple geographic locations have a plurality of augmented reality scenes, the method comprising:
    a) receiving, using a smartglass device, a geolocation signal;
    b) processing, using the smartglass device, the geolocation signal;
    c) determining a room or a geographic location of the smartglass device;
    d) loading onto the smartglass device, after the room or the geographic location has been determined, data on the plurality of augmented reality scenes associated with the determined room or the determined geographic location including a plurality of markers;
    e) capturing, using the smartglass device, an image;
    f) extracting markers from within an actual image frame of the captured image;
    g) comparing, using the smartglass device, the extracted marker to one or more of the plurality of loaded markers; and
    h) determining, using a similarity and threshold analysis, a loaded augmented reality scene to display on the smartglass device that corresponds to the compared markers,
    wherein the similarity and threshold analysis comprises:
    (i) considering a value of n matching on a total of m features of an actual image frame;
    (ii) calculating the score of that matching as $x=n/m(\%)$, and
    (i) wherein the similarity and threshold analysis is based on the score of matching and a target value associated with the extracted marker and the one or more of the plurality of loaded markers.

2. The method of claim 1 wherein the geolocation signal is received by the smartglass device from a geo localization device located at a stop place with which to associate the scene to be shown.

3. The method of claim 1 wherein the received geolocation signal is one of a WiFi, Bluetooth, Beacon and GPS signal.

4. The method of claim 1 wherein the determining step comprises:
determining if the extracted marker is equal to or has a degree of similarity greater than a given threshold with one of the plurality of loaded markers,
selecting the loaded marker for production of the scene associated with the loaded marker.

5. The method of claim 1 wherein the similarity and threshold analysis comprises:
i) considering a value of n matching on a total of m features of an actual image frame;
ii) calculating the score of that matching as x=n/m(%),
iii) compute the target value wherein a threshold value t is predetermined, each frame has an x value, and each x value is averaged with previous values coming from the previous frames (a=(x+a)/2 with x>t, otherwise a=0);
iv) determine whether target value or greater is reached wherein a>/=t indicates that the target value is reached; and
v) finding a match, wherein, when the target value is reached and the smartglass device has captured an image for a certain number of frames in order to have a match; otherwise the target value is not reached and a match is not found.

6. The method of claim 1 further comprising tracking the smartglass device movement using optical flow and displaying an augmented reality scene coupled to a scene after tracking.

7. The method of claim 1 further comprising registering points of interest during a learning phase wherein at least one marker for each point of interest is identified.

8. The method of claim 1 wherein:
more than one point of interests exists in the room or the geographic location and each of the plurality of markers are associated with a point of interest, and
the markers associated with a point of interest are created from multiple images taken from different angles and conditions of interest related with the point of interest.

9. The method of claim 1 wherein the plurality of markers are associated with points of interest, the method further comprising:
obtaining multiple image captures of points of interest with different angles or conditions, and using the image captures to produce the plurality of markers associated with a point of interest.

10. A method to display augmented reality media content at a site using wearable devices, the method comprising:
a) acquiring, using a first user wearable device, a plurality of images of points of interest from different angles and in different light conditions;
b) processing the plurality of images to obtain markers from the plurality of images for each point of interest, wherein the obtained markers are each for an angle and condition of interest and wherein there are multiple markers for each point of interest;
c) storing the obtained markers in a memory of the first user wearable device;
d) storing a plurality of scenes and a plurality of obtained markers associated with a plurality of points of interest in a memory of a second user wearable device;
e) capturing an image using the second user wearable device;
f) processing the image to extract marker data from within an actual image frame of the captured image;
g) comparing, using the second user wearable device and a similarity and threshold analysis, the extracted marker data with the stored plurality of obtained markers, wherein the similarity and threshold analysis comprises
(i) considering a value of n matching on a total of m features of an actual image frame;
(ii) calculating a score of that matching as x=n/m(%), and
wherein the similarity and threshold analysis is based on the score of matching and a target value associated with the extracted marker data and one or more of the plurality of obtained markers;
h) detecting, using the second user wearable device, a position of a user at the site, by detecting one of the points of interest from the plurality of points of interest stored in the memory of the second user wearable device; and
i) generating a scene associated with the detected point of interest with at least one visual element or one audio element stored in the memory of the second user wearable device.

11. The method of claim 10, wherein the detecting step further comprises analyzing the obtained marker with the extracted marker for a degree of similarity greater than a given threshold.

12. The method of claim 10 further comprises the step of optical flow tracking of the second user wearable device in relation to a detected point of interest and generating another scene based on optical flow tracking position.

13. The method of claim 10 wherein the comparing step comprises determining if the extracted marker is equal to or has a degree of similarity greater than a given threshold with one of the stored plurality of obtained markers.

14. An apparatus to view augmented reality content located in multiple rooms or multiple geographic locations in a site, wherein the multiple rooms or the multiple geographic locations are associated with a plurality of augmented reality scenes, the apparatus comprising a smartglass device having a display, an audio unit, a camera, memory, and a processor wherein the smartglass device is adapted to:
a) receive a geolocation signal;
b) process the geolocation signal;
c) determine a room or a geographic location of the smartglass device;
d) load onto the smartglass device memory, after the room or the geographic location has been determined, data on the plurality of augmented reality scenes associated with the determined room or the determined geographic location including a plurality of markers;
e) capture an image in the determined room or the determined geographic location;
f) extract markers from within an actual image frame of the captured image;
g) compare, using the processor, the extracted marker to one or more of the plurality of loaded markers;
j) determine, using a similarity and threshold analysis, a loaded augmented reality scene to display on the smartglass device that corresponds to the compared markers, wherein the similarity and threshold analysis comprises
(i) considering a value of n matching on a total of m features of an actual image frame;

(ii) calculating a score of that matching as x=n/m(%), and h) wherein the similarity and threshold analysis is based on the score of matching and a target value associated with the extracted marker and the one or more of the plurality of loaded markers; and i) display the determined augmented reality scene and play audio for the scene.

15. The apparatus of claim 14 wherein:

more than one point of interests exists in the room or the geographic location and each of the plurality of markers are associated with a point of interest, and the plurality of markers associated with a point of interest are created from multiple images taken from different angles and light conditions related with the point of interest.

16. The apparatus of claim 14 wherein the plurality of markers are associated with points of interest, the apparatus further comprising:

a learning machine module application, which is adapted to obtain multiple image captures of points of interest with different angles or conditions, and use the image captures to produce the plurality of markers associated with a point of interest.

17. The apparatus of claim 14 wherein the smartglass device is further adapted to load the plurality of markers onto the smartglass device based upon the geolocation of the smartglass device prior to the first image capture in the determined room or the determined geographic location.

18. The apparatus of claim 14 wherein the smartglass device is further adapted to receive a geolocation signal from a geo localization device located at a stop place with which to determine the room or the geographic location of the smart device.

19. The apparatus of claim 14 wherein the smartglass device is further adapted to receive a geolocation signal which is one of a Wi-Fi, Bluetooth and GPS signal.

20. The apparatus of claim 14 wherein the processor is configured to perform the compare which comprises the processor determining whether the subset of data points have a degree of similarity greater than a given threshold, and wherein the processor is further configured to perform the similarity and threshold analysis.

21. The apparatus of claim 14 wherein the smartglass device is further adapted to: determine if the extracted marker is equal to or has a degree of similarity greater than a given threshold with one or more of the plurality of loaded markers; and select the scene associated with the loaded marker determined to have the greatest similarity.

22. The apparatus of claim 14 wherein the similarity and threshold analysis comprises:

i) considering a value of n matching on a total of m features of an actual image frame;

ii) calculating the score of that matching as x=n/m(%);

iii) compute the target value wherein a threshold value t is predetermined, each frame has an x value, and each x value is averaged with previous values coming from the previous frames (a=(x+a)/2 with x>t, otherwise a=0);

iv) determine whether target value or greater is reached wherein a>/=t indicates that the target value is reached; and v) finding a match, wherein, when the target value is reached and the smartglass device has captured an image for a certain number of frames in order to have a match; otherwise, the target value is not reached and a match is not found.

23. The apparatus of claim 14 wherein the smartglass device is further adapted to track the smartglass device movement using optical flow and display an augmented reality scene coupled to another scene after tracking.

24. The apparatus of claim 14 wherein the smartglass device is further adapted to register points of interest during a learning phase wherein at least one marker for each point of interest is identified during the learning phase.

* * * * *